US012054934B2

(12) United States Patent
Power

(10) Patent No.: US 12,054,934 B2
(45) Date of Patent: Aug. 6, 2024

(54) BUILDING AND A METHOD OF CONSTRUCTING A BUILDING

(71) Applicant: Martin Power, Rosslare (IE)

(72) Inventor: Martin Power, Rosslare (IE)

( * ) Notice: Subject to any disclaimer, the term of this patent is extended or adjusted under 35 U.S.C. 154(b) by 304 days.

(21) Appl. No.: 17/292,565

(22) PCT Filed: Nov. 11, 2019

(86) PCT No.: PCT/EP2019/080896

§ 371 (c)(1),
(2) Date: May 10, 2021

(87) PCT Pub. No.: WO2020/094887

PCT Pub. Date: May 14, 2020

(65) Prior Publication Data

US 2022/0002988 A1 Jan. 6, 2022

(30) Foreign Application Priority Data

Nov. 9, 2018 (IE) .................................. S2018/0386

(51) Int. Cl.

| | |
|---|---|
| ***E04D 13/18*** | (2018.01) |
| ***E04B 1/00*** | (2006.01) |
| ***E04B 1/26*** | (2006.01) |
| ***E04B 1/343*** | (2006.01) |
| ***E04B 1/61*** | (2006.01) |
| ***E04B 5/48*** | (2006.01) |
| ***E04D 13/04*** | (2006.01) |
| ***E06B 1/04*** | (2006.01) |

(52) U.S. Cl.

CPC .......... *E04B 1/0023* (2013.01); *E04B 1/2612* (2013.01); *E04B 1/34321* (2013.01); *E04B 1/6137* (2013.01); *E04B 5/48* (2013.01); *E04D 13/04* (2013.01); *E06B 1/04* (2013.01)

(58) Field of Classification Search

CPC ......... E04B 1/0023; E04B 1/6137; E06B 1/04

See application file for complete search history.

(56) References Cited

U.S. PATENT DOCUMENTS

| | | | |
|---|---|---|---|
| 2,104,550 A * | 1/1938 | Bates .................... | E04B 1/6137 52/586.1 |
| 2,303,332 A * | 12/1942 | Dauphinee .............. | F24F 8/158 416/93 R |
| 2,559,868 A * | 7/1951 | Gay .......................... | F24D 5/10 165/45 |

(Continued)

FOREIGN PATENT DOCUMENTS

FR 2979363 A1 3/2013

OTHER PUBLICATIONS

International Search Report and Written Opinion dated Mar. 16, 2020 in related PCT Application No. PCT/EP2019/080896.

*Primary Examiner* — Basil S Katcheves

(74) *Attorney, Agent, or Firm* — Vitale, Vickrey, Niro, Solon & Gasey LLP

(57) ABSTRACT

A building structure comprising a main steel frame structure 3 and roof 41, wall 74, window and door portions 137, 166, 142, 152 directly or indirectly attachable to the main structural support and are configured, in use, to combine to form a thermally insulative barrier 34, 37, 21 between the interior of the building and the external atmosphere, the barrier also acting to at least partially inhibit travel of air therebetween.

35 Claims, 73 Drawing Sheets

(56) References Cited

U.S. PATENT DOCUMENTS

| | | | | | |
|---|---|---|---|---|---|
| 2,559,871 | A * | 7/1951 | Gay | F24F 7/04 | 126/633 |
| 3,054,151 | A * | 9/1962 | Shankland | E04B 1/343 | 52/146 |
| 3,162,277 | A * | 12/1964 | Lafayette | E04B 1/0023 | 52/261 |
| 3,303,616 | A * | 2/1967 | Brown | E04B 1/0023 | 52/28 |
| 3,415,024 | A * | 12/1968 | Kotlarz | E04B 2/92 | 165/53 |
| 3,499,251 | A * | 3/1970 | Votteler | E04B 1/348 | 52/481.1 |
| 4,314,430 | A * | 2/1982 | Farrington | E04B 1/0023 | 52/378 |
| 4,545,159 | A * | 10/1985 | Rizk | E04B 1/3483 | 52/79.9 |
| 4,580,487 | A * | 4/1986 | Sosnowski | F24F 5/0075 | 165/56 |
| 5,906,677 | A * | 5/1999 | Dudley | B03C 3/28 | 55/DIG. 35 |
| 6,519,904 | B1 * | 2/2003 | Phillips | E04B 2/847 | 52/344 |
| 8,381,454 | B1 * | 2/2013 | Robinson | E04H 3/10 | 52/63 |
| 8,727,759 | B1 * | 5/2014 | Wolfe | E04B 7/22 | 52/293.3 |
| 9,200,447 | B1 * | 12/2015 | Bargh | E04C 5/08 | |
| 2004/0060245 | A1 * | 4/2004 | Loblick | E04C 2/20 | 52/592.1 |
| 2009/0000211 | A1 * | 1/2009 | Lozier | E04H 9/14 | 52/741.3 |
| 2010/0058688 | A1 * | 3/2010 | Goddard | E04H 12/2261 | 52/270 |
| 2010/0263299 | A1 * | 10/2010 | Ohnishi | E04B 1/344 | 52/745.02 |
| 2010/0293868 | A1 * | 11/2010 | Holzworth | F41J 11/00 | 52/79.5 |
| 2014/0155182 | A1 * | 6/2014 | DeBlanco | A63H 33/008 | 472/136 |
| 2014/0283464 | A1 * | 9/2014 | Vogler | E04H 5/00 | 52/79.5 |
| 2017/0305034 | A1 * | 10/2017 | Grivetti | B28B 1/002 | |
| 2018/0328019 | A1 * | 11/2018 | Collins | E04B 5/12 | |

* cited by examiner

BUILDING AND A METHOD OF CONSTRUCTING A BUILDING

FIELD OF THE INVENTION

This invention relates to a building and a method of constructing a building, and in particular to a building having improved thermal and airtight performance and a method of constructing the same.

BACKGROUND OF THE INVENTION

The introduction of new sustainable building regulations seeks to increase the thermal efficiency of dwellings in general and reduce carbon footprint. Thermal quality is a term which refers to maintaining heat inside the building and keeping cold air to the outside, or in warm climates, keeping cool air inside and keeping warm air outside. Traditionally temperature preference inside a building were achieved by using different conventional methods to raise the temperature inside a building, or in warm climates, air conditioning units are used to reduce the temperature inside the building. Warming or cooling the temperature in a building requires and uses different forms of energy and the underpinning principle of modern sustainable building regulations is to greatly reduce dependence on traditional energy using systems in a building and, where energy is required, generating that energy from solar energy, wind turbines and other known renewable energy sources. In essence, sustainable building regulations have two distinct elements, firstly the objective to create a thermally efficient building, and secondly ensuring that the required temperature and other energy requirements in the building are obtained by using renewable energy systems.

In relation to increasing thermal efficiency in a building, this can be achieved by increasing the thickness of insulation in the floor, walls and roof of a building with the overriding objective of creating a thermal enclosure encompassing the habitable area of the building. The creation of a standalone thermal enclosure is restricted by various obstacles, most notably that conventional insulation systems themselves cannot provide sufficient structural stability for a building.

In order to achieve maximum thermal efficiency, the thermal components in a dwelling are ideally joined together in a totally connected and continuous loop embracing the floors, walls and ceilings of a dwelling. Known systems do not formally create a continuous thermal enclosure in a dwelling and usually the thermal loop is staggered at floor level, particularly with external insulation systems, where there is a big dependency on overlapping joints at ground floor level. The difficulty with present informal systems for creating an internal thermal enclosure is that they give rise to inconsistencies and achieving the required standard is totally dependent on the skill level of the person carrying out the work, where any deficiency in the required quality can give rise to thermal bridging.

The thermal enclosure in a dwelling must be completely airtight to prevent hot or cold air from escaping the habitable area of the house. One known system for achieving airtightness is the taping of joints on internal surfaces of the thermal enclosure where these walls meet the floors and ceilings, and around the internal reveals of doors and windows. This process of taping joints is labour intensive, time consuming and expensive and the proper application of the airtightness tape on the joints is prone to inconsistencies as the proper application is totally dependent on the skill level of the person applying the airtightness tape. The airtightness of the thermal enclosure must also be preserved over time. Hairline and structural cracks normally caused by ground movement, wind pressure and modifications to the building lead to loss in airtightness. At present, known systems do not adequately provide for the effects of long-term wind pressure and snow weight which will inevitably cause hair-line cracks in a dwelling and which can resultantly cause air leakage. Concrete based homes provide structural stability, however, because of their weight there is a greater likelihood of ground settlement which could cause hairline cracks which again result in air leakage.

In a similar manner, air leakage often occurs around service ducting that protrudes from the inside of the building to the outside atmosphere. Known systems for providing service ducting into a building typically involves service pipes being installed in an informal manner, leading to a greater risk of service pipes being damaged. Moreover, such ducting is often improperly insulated as traditional installation methods give rise to potential air leakage from the house.

Water ingress also greatly undermines the thermal effectiveness of a building, and causes dampness and mildew which may cause health problems for the habitants. Window and door openings are particularly prone to water ingress as there are a number of different joints exposed to prevailing weather conditions. One known method to prevent water ingress is the placing of a damp proof course (DPC) in the cavity around window and door openings which aim is to stop water entering the building. As a further measure a (DPC) is placed under the window and door sills to collect any water that may enter the building. This process is time consuming and prone to inconsistencies in that the fitting of the DPC is dependent on a skilled operative carrying out the process in a diligent manner. Various other processes and methods are used for preventing water ingress in and around door and window openings, however these processes are dependent on the use of pumped mastics or other such sealants to seal the various external joints. Again, this process is time consuming and expensive and the proper application of the mastic is prone to inconsistencies and is dependent on the skill level of the installation operative. Furthermore, there is a heightened risk that the mastic will become loose in the various joints as a result of weathering and natural movement of the joints, which would allow water ingress into the building through the unsealed joints.

Should a building benefit from increased thermal efficiency, resulting in the consistent retention of warm or cold air in the habitable area there is a higher risk of condensation within the structure of the external walls, especially close to the dew point, for example where the boundaries of the regulated temperature in the habitable area meets the opposing temperature on the outside. Retention of condensation in the structure of a dwelling will consequently give rise to the emergence of mould and mildew, which would create serious health problems for the occupants. The build-up of mould and mildew behind built in furniture could go undetected for years. Mould spores can create a range of health problems, the source of which are often not easily identifiable. Known systems do not have a focus on the necessity to prevent mould and mildew and therefore do not take the essential steps to ensure that there is no condensation build up in the fabric of the building.

The poor quality of the natural air, through windows and doors etc., is causing further health problems for house occupants and the use of a mechanical ventilation heat recovery system further helps to ensure that clean air is always available in the house.

Typically, most modern houses are formed by a series of fixed composite components that cannot be easily separated and thus it is difficult to inspect and maintain any one particular component. Known systems do not have a building process that provides for the easy removal of various components for the purpose of inspecting the components in the dwelling which may need to be repaired or replaced. The absence of any formal method of inspection means that various components have to be pneumatically removed to gain access for inspection and repair. This process invariably damages the structural integrity and air tightness of the building and creates unnecessary noise and disturbance to the occupants and adjoining property owners.

Typically, existing properties provide no ability to upgrade or extend the property without interfering with the structural stability of the dwelling, which in turn often causes hairline cracks resulting in air leakage and water ingress. Known systems do not make provision for the easy upgrade or extension to a building and as a result significant disturbance is caused to the structure of the building. In order to locate the structural supports to add an extension, significant structural movement can take place in a building which will cause hairline cracks thus resulting in air leakage and water ingress. Furthermore, when houses are upgraded or extended it is likely that the original structural stability and sealed joints around the building will be disturbed thus creating hairline cracks. New sustainable building regulations introduced in many jurisdictions have added to the cost of building the traditional house and coupled with a skilled labour shortage the cost of building a house will continue to increase as the demand for housing rises.

It is desirable to provide a building which may be easily constructed, provides a thermally efficient habitable space, reduces or prevents water and air leakage, and is easily at least partially disassembled to facilitate modification or inspection.

SUMMARY OF THE INVENTION

According to the invention there is provided a building structure comprising a main structural support portion, a base portion, and roof, wall, window and door portions which are directly or indirectly attachable to the main structural support and are configured, in use, to combine to form a thermally insulative barrier between the interior of the building and the external atmosphere, the barrier also acting to at least partially inhibit travel of air therebetween.

Ideally, the main structural support portion is a main steel frame.

Preferably, the thermally insulative and airtight barrier is an unbroken thermally insulative and airtight barrier.

Ideally the thermally insulative and airtight barrier is a continuous thermally insulative and airtight barrier.

Preferably, the unbroken thermally insulative and airtight barrier may be intentionally broken to provide for ventilation, services, or the like.

Preferably, the roof, wall, window and door portions are removably attachable directly or indirectly to the main structural support portion.

Ideally, the thermally insulative and airtight barrier is a thermal enclosure.

Advantageously, the main steel frame structure provides an instant support for the thermally insulative and airtight barrier and because of its structural strength provides ongoing structural stability thus reducing the risk of hairline cracks therefore avoiding potential air leakage and water ingress.

Preferably, service ducting for the building is arranged in a manner to provide easy access and yet reduce the risk of air leakage.

Ideally, the window and door portions are configured to prevent air leakage from inside of the building to the outside atmosphere, and prevent water ingress from the outside entering the building.

Preferably, the building comprises a mechanical means of removing condensation build-up within and/or on the structure of the building.

Ideally, the building comprises external wall sections.

Preferably, the external wall sections, roof portions and window/door portions are removably attachable to each other or to the main structural support portion allowing for inspection of the internal thermal enclosure and other components of the building, or modification thereof, without interfering with the structural stability of the building.

Further advantageously, removal of the external wall portions, windows/doors and roof portions allows these items to be upgraded in the future, without interfering with the structural stability of the dwelling thus avoiding hairline cracks and inevitable air leakage.

Ideally, the external wall sections, roof portions and window/door portions are removably attachable to each other or to the main structural support portion in a manner which causes no damage to the external wall sections, roof portions and window/door portions such that they may be reattached to each other or to the main structural support portion.

Further advantageously the ability to easily remove the external wall sections, windows/doors and roof portions to access the structural main steel frame allows for the easy extension of the building, without interfering with the structural stability of the building thus avoiding hairline cracks and inevitable air leakage.

Ideally, the thermal enclosure is designed and arranged so as to provide a continuous unbroken, integrated thermally insulative and airtight enclosure around the habitable area of the building.

Ideally, internal walls are designed in a manner that permits easy removal

Advantageously, the internal layout of the building may be easily rearranged if required.

Preferably, the internal electrical cables and mechanical services are readily accessible and can be easily adapted to facilitate a rearrangement of the internal walls.

Ideally, all the equipment required to operate the mechanical and electrical services for the building are centralised in a dedicated plant room.

Preferably, the plant room can be located inside or outside the house.

Advantageously, the centralised services provides for easy access for maintenance and repairs to serviceable equipment.

Further advantageously, the use of a main steel frame structure brings much more flexibility and structural stability when creating modern design by comparison with existing building systems. Modern architecture has moved away from a traditional bungalow, or two-story dwelling, and tends to place more focus on open spaces, larger windows and sometimes places emphasis on angled or circular walls. The present invention facilitates such design features.

Further advantageously, the use of traditional features like fascia's, sills and reveals which cannot be easily reproduced with known systems is facilitated.

Further advantageously, the present invention removes the necessity for skills that are presently in short supply.

Further advantageously, the present invention is easy and quick to assemble and thereby reduces the risk of onsite accidents, noise and emissions, which are all associated with known construction systems.

Ideally, the building structure comprises one or more concrete support pads upon which the main steel structure is supported.

Preferably, the building structure also comprises a base pad for supporting conduit, the conduit configured to carry the ducting and services into the building structure.

Ideally, the conduit terminates at one end at the plant room.

Alternatively, there is provided a ducting support means comprising a ground engaging spike which is insertable into the ground at a first end and a ducting support bracket at or about a second end, the ducting support means further comprising a mesh profile movably mountable to the ground engaging spike.

Preferably, the ducting support bracket is also movably mountable to the ground engaging spike.

Ideally, the ducting support means comprises means for securing the mesh profile and/or the ducting support bracket at a chosen location on the ground engaging spike.

Preferably, the mesh profile is a semi-circular mesh profile.

Advantageously, when concrete is poured around the service ducting and sets, the service ducting is fixed permanently into the correct position, is supported by the ground via the spike, and yet cannot be punctured by hardcore or other such surfaces formed on the ground. Furthermore, the concrete encased service ducting reduces the risk of air leakage from the thermal enclosure around the service ducting.

Ideally, the main steel frame comprises a plurality of vertical uprights held in a pre-defined spaced apart relationship by a plurality of horizontal beams.

Preferably, the building comprises insulated base sections.

Ideally, the insulated base sections comprise vertical upstand portions formed for engagement with a portion of the external wall sections.

Preferably, the vertical upstand portions comprise a recess formed therein.

Ideally, the lowermost portion of the external wall sections comprises a protrusion thereon formed for insertion into the recess of the vertical upstand portions.

Advantageously, the interlocking nature of the protrusion of the wall sections and the recess of the vertical upstand portions prevent the travel of air through the joints between these two components.

Ideally, roof panels are fixable to the main steel frame via roof panel brackets.

Preferably, the roof panel brackets comprise a flange configured to support the roof panels in a manner which prevents spreading of the roof and/or downwards slippage of the roof panels.

Ideally, the building comprises a soffit feature.

Preferably, a soffit spacing means is provided between the external walls of the building and the soffit feature.

Ideally, the soffit spacing means is removable such that the external walls may be removed without disturbance of the roof and/or the soffit feature.

Preferably, the roof panels comprise roofing element attachment means for attaching roofing elements thereto.

Ideally, the roofing element attachment means are roofing element brackets formed for attachment of various roofing elements such as but not limited to roofing tiles, slates, metallic roofing systems, green roof systems, and/or solar panels.

Preferably, the roofing bracket elements may comprise a main connecting bracket attachable to the roof panels and a secondary bracket attachable to the main connecting bracket, the secondary bracket being formed for engagement with a roofing element.

Ideally, roofing elements may be slidably engageable with, and selectably fixable to, the roofing element brackets.

Preferably, the building comprises at least one condensation management means comprising means for encouraging condensation from internally of the building, or a cavity thereof, to externally of the building, the condensation management means comprising at least one condensation urging feature for urging condensation from the main steel structure or a component thereof, or from a surface of the walls of the building, towards an outlet.

Ideally, a condensation channeling means is locatable between the urging means and the outlet and comprises channel features formed therein for channeling the condensation towards the outlet.

Preferably, the channel features and an internal surface of the external wall of the building cooperate to form enclosed channels running from condensation urging feature to the outlet.

Ideally, one or more flanges of the main steel structure comprise apertures therein for allowing condensation to pass therethrough such that it may be encouraged by the condensation management means towards the outlet.

Ideally, the external wall sections comprise means for engagement with at least one flange of the main steel frame.

Preferably, the external wall sections comprise grooves in the inner facing surfaces thereof formed for receiving at least one flange of the main steel frame.

Ideally, the grooves of the external wall sections comprise thermally efficient lining means which are engageable between the grooves of the external wall sections and the at least one flange of the main steel frame to reduce thermal bridging therebetween.

Preferably, the external wall sections comprise upper and lower grooves formed for receiving a flange of upper and lower horizontal beams of the main steel frame respectively.

Preferably, the external wall sections are alternatively or additionally securable to the main steel frame via thermal break bracket means.

Ideally, the thermal break bracket means comprise a thermally insulative material forming the portion thereof which contacts the external wall sections.

Preferably, the building comprises window/door arrangements comprising a subframe mountable in an external wall section of the building, and an external reveal portion having a first engagement portion in engagement with the subframe and a second engagement portion in engagement with the external wall section of the building.

Ideally, the subframe of the window/door arrangements is mountable on the profiles behind an external wall section of the building.

Ideally, the external reveal portion forms an airtight and/or thermally insulative connection between the subframe and the external wall section.

Preferably, the first engagement portion of the external reveal portion forms a compression fit with the subframe.

Ideally, the second engagement portion of the external reveal portion forms a compression fit with the external wall section.

Preferably, the window arrangements further comprise internal reveal portions which extend internally of the subframe.

Ideally, the internal reveal portions comprise a quadrangular frame extending internally of the subframe.

Preferably, the internal reveal portions comprise mitred lower corners.

Ideally, the mitred lower corners comprise correspondingly formed interlocking engagement features.

Preferably, the building comprises an internal wall apparatus for a building, the internal wall apparatus comprising at least one internal wall panel retainable at an upper end by an associated first internal wall bracket and at a lower end by a second internal wall bracket, the first or second internal wall bracket being an adjustable bracket comprising means for raising and/or lowering the internal wall panel.

Preferably, the first internal wall bracket is at ceiling level.

Ideally, the second internal wall bracket is at floor level.

Ideally, the second internal wall bracket is an adjustable bracket.

Preferably, the internal wall panel may be raised to a height such that it is receivable by the first internal wall bracket.

Ideally, the building comprises skirting elements attachable to the internal wall panels, the skirting elements comprising an upper engagement feature for engagement with a corresponding feature of the internal wall panel and a lower engagement feature for engagement with a corresponding feature of the internal wall panel, or with the second internal wall bracket of the internal wall panel.

Preferably, the upper engagement feature of the skirting elements comprises a recess formed in the rear portion of the skirting elements, the recess being formed for receiving a protruding engagement element formed in or attachable to the inner wall panel.

Ideally, the protruding engagement element formed in or attachable to the inner wall panel is a spring clip formed for insertion into the recess of the skirting elements and configured to draw the skirting elements towards the inner wall panel.

Ideally, the lower engagement feature of the skirting elements and the second bracket of the internal wall panels comprises corresponding engagement elements configured to permit slidable engagement therebetween.

According to a second aspect of the invention there is provided a ducting support means comprising a ground engaging spike which is insertable into the ground at a first end and a ducting support bracket at or about a second end, the ducting support means further comprising a mesh profile movably mountable to the ground engaging spike.

According to a third aspect of the invention there is provided roof panel brackets which are fixable at a first end to a main steel frame of a building and at a second end to a roof panel of a building, the roof panel brackets comprising a flange configured to support the roof panels in a manner which prevents spreading of the roof and/or downwards slippage of the roof panels.

According to a fourth aspect of the invention there is provided a soffit spacing means locatable between the external walls of a building and a soffit feature, the soffit spacing means being removable such that the external walls may be removed without disturbance of the roof and/or the soffit feature.

According to a fifth aspect of the invention there is provided a condensation management means comprising means for encouraging condensation from internally of a building, or a cavity thereof, to externally of the building, the condensation management means comprising at least one condensation urging feature for urging condensation from the main steel structure or a component thereof or from a surface of the walls of the building towards an outlet.

According to a sixth aspect of the invention there is provided a main steel frame and external wall section arrangement for a building, the external wall sections comprising grooves in the inner facing surfaces thereof formed for receiving at least one flange of the main steel frame.

According to a seventh aspect of the invention there is provided a window/door arrangement for a building comprising a subframe mountable in an external wall section of the building, and an external reveal portion having a first engagement portion in engagement with the subframe and a second engagement portion in engagement with the external wall section of the building, the external reveal portion forming an airtight and/or thermally insulative connection between the subframe and the external wall section.

According to a eighth aspect of the invention there is provided an internal wall apparatus for a building, the internal wall apparatus comprising at least one internal wall panel retainable at an upper end by an associated first internal wall bracket and at a lower end by an associated second internal wall bracket, the first and/or second internal wall bracket being an adjustable bracket comprising means for raising and/or lowering the internal wall panel.

According to a ninth aspect of the invention there is provided skirting elements attachable to internal wall panels of the building, the skirting elements comprising an upper engagement feature for engagement with a corresponding feature of the internal wall panel and a lower engagement feature for engagement with a corresponding feature of the internal wall panel or a bracket for retaining the lower portion of the internal wall panel.

According to a tenth aspect of the invention there is provided a method of constructing a generally thermally insulative and airtight building comprising the steps of: installing concrete pads, erecting a main steel frame structure upon the concrete pads, installing an insulated base section, installing removable external wall sections such that they are attachable to the main steel frame structure, installing roof panels such that they are attachable to the main steel frame structure and attaching roofing elements to the roof panels, installing window and/or door subframes in the external wall sections and attaching associated reveal portions thereto, and installing mechanical and electrical services to the building.

According to an eleventh aspect of the invention there is provided a superduct arrangement configured to house one or more building service elements, the superduct carrying the one or more building service elements from a first location within the building to a second location within the building and/or from a location within the building to a location external of the building.

DETAILED DESCRIPTION OF THE DRAWINGS

The present teaching will now be described with reference to an exemplary building and method. It will be understood that the exemplary building and method is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 16:
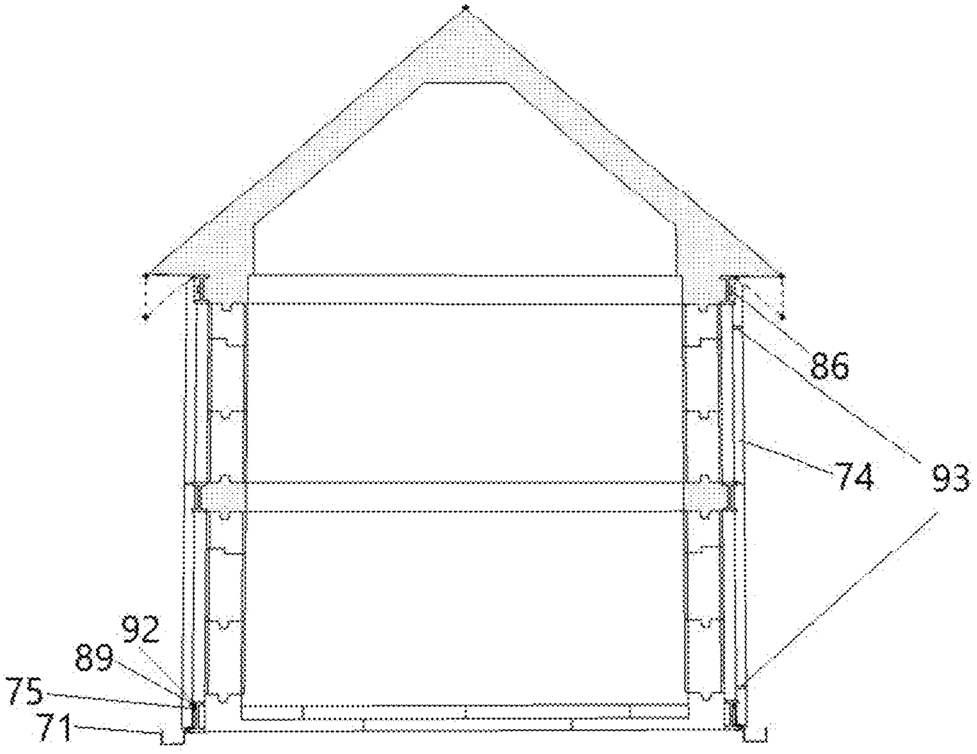
FIG. 16 is a cross-sectional view through the building.

Referring now to the Figures there is illustrated a building structure comprising a main steel frame structure 3 and removably attachable roof 41, wall 37, window and door portions 137, 166, 142, 152 which are configured, in use, to form a stand alone unbroken thermally insulative and air-tight enclosure. The roof, wall, window and door portions form a continuous shell creating an unbroken, integrated thermally insulative and airtight envelope around all cross-sections of the building, as can be seen in FIG. 16. Advantageously, the main steel frame structure 3 not only provides an instant support for the thermal enclosure but because of its structural strength will provide ongoing structural stability thus reducing the risk of hairline cracks therefore avoiding potential air leakage and water ingress. Service pipes 20 for the building are arranged in a manner to provide easy access and yet reduce the risk of air leakage. The window and door portions 137, 166, 142, 152 are configured to prevent air leakage from inside of the building to the outside atmosphere, and prevent water ingress from the outside entering the building. The building also comprises a mechanical arrangement for removing condensation build-up within and/or on the structure of the building.

The wall portions are external wall sections 37 which, along with the roof portions 41 and window/door portions 137, 166, 142, 152 can be easily removed allowing for the inspection of the internal thermal enclosure and other components of the building, without interfering with the structural stability of the building, thus avoiding hairline cracks and inevitable air leakage. Additionally, removal of the external wall sections 37, windows/doors 137, 166, 142, 152 and roof portions 41 allows these items to be upgraded in the future, without interfering with the structural stability of the dwelling thus again avoiding hairline cracks and inevitable air leakage. Advantageously the ability to easily remove the external wall sections, windows/doors and roof portions to access the structural main steel frame allows for the easy extension of the building. As is best viewed in FIG. 16, the inner thermal enclosure is designed and arranged so as to provide a continuous, unbroken, integrated thermally insulative and airtight enclosure around the habitable area of the building.

Figure 47:
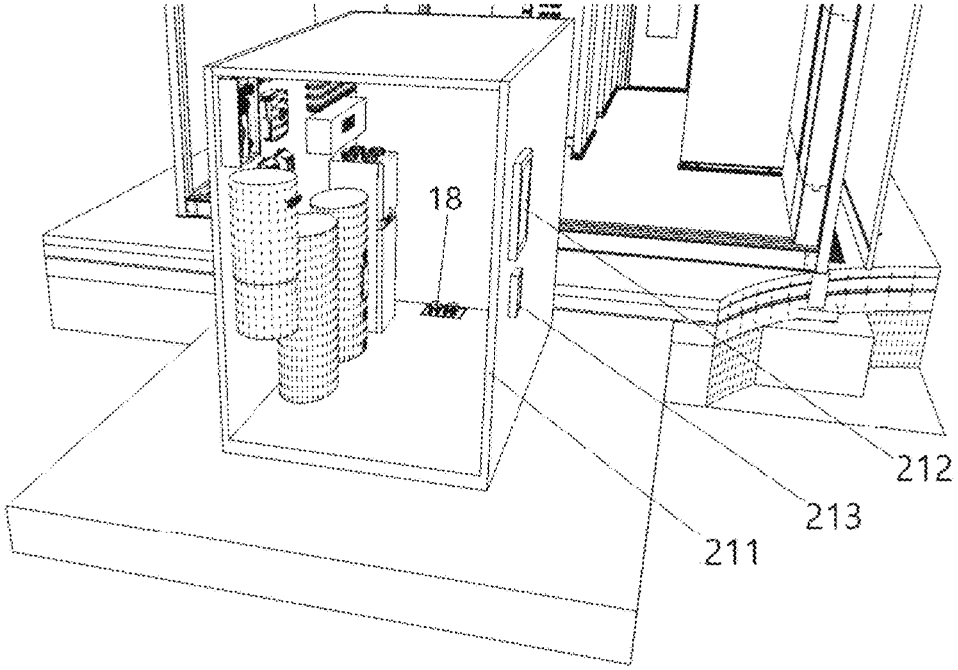
FIG. 47 is a detail perspective view of a plant room.

Internal walls 190 are designed in a manner that permits easy removal. Advantageously, the internal layout of the building may be easily rearranged if required. In addition, the internal electrical cables and mechanical services are readily accessible and can be easily adopted to facilitate a rearrangement of the internal walls 190. All of the equipment required to operate the mechanical and electrical services for the building are centralised in a dedicated plant room 211 located inside or outside the house, FIG. 47 shows an external plant room 211. Advantageously, the centralised services provide for easy access for maintenance and repairs to serviceable equipment. The use of a main steel frame structure 3 brings much more flexibility and structural stability when creating modern design by comparison with existing building systems. Modern architecture has moved away from a traditional bungalow, or two-story dwelling, and tends to place more focus on open plan living, larger windows and sometimes places emphasis on angled or circular walls. The present invention facilitates such design features in addition to the use of traditional features such as fascia's, sills and reveals which cannot be easily reproduced with known systems. This also removes the requirement for certain skills which are presently in short supply. The building described herein is easy and quick to assemble and thereby reduces the risk of onsite accidents, noise and emissions, which are all associated with known construction systems.

Figure 2:
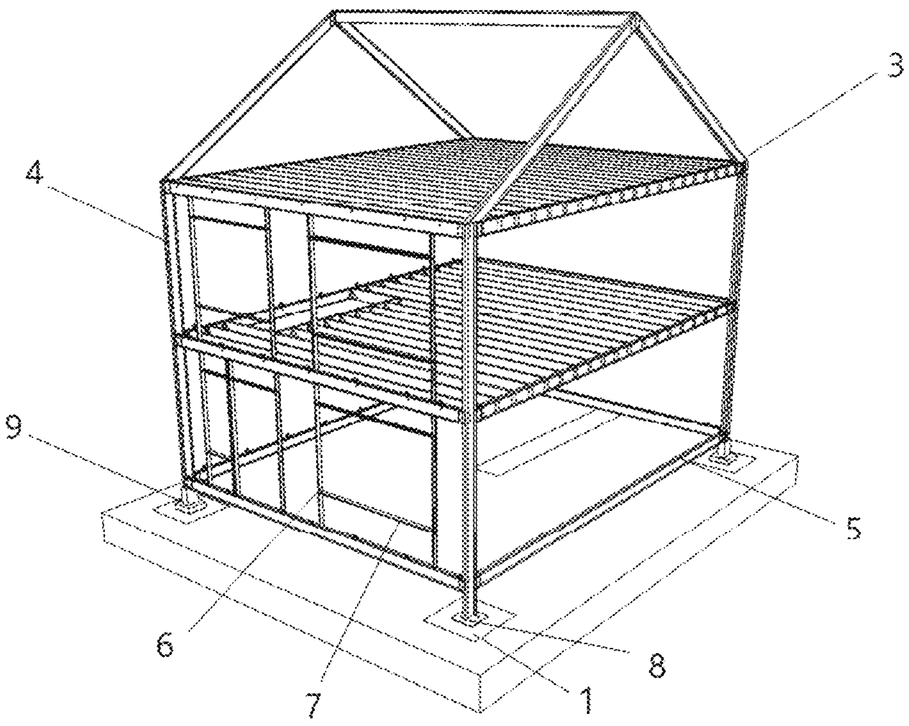
FIG. 2 is a perspective view of a main steel frame of a building.

In the embodiment shown in the drawings the building is a residential house, however the system may be adapted to construct any form of residential or commercial building. FIG. 2 shows how the main steel frame 3 forms the shell of the house and consists of a series of vertical uprights 4 which support a ring of horizontal beams 5 at the ground floor level, joist level and roof level of the house.

In some embodiments, steel profiles 6 are fitted in the main steel frame structure 3 in order to form the window and door openings that facilitate unique window and door sub-frames and suitable fixings hold the steel profiles 6 in place. A fire blanket 7 is fixed to the face of the steel profiles 6 to prevent fire from escaping from the window and door subframes into the cavities of the house. The main steel frame structure 3 acts as a complete structural support for the entire house shell and facilitates a range of brackets and systems that along with the steel frame itself 3 facilitate the efficient assembly and disassembly of the house. The vertical uprights 4 on the corners of the steel frame 3 are fixed by bolts 8 to the concrete pads 1 and the vertical uprights 4 below ground level are encased in concrete 9 or other suitable material to seal the uprights 4 from water penetration. Advantageously, the steel frame structure 3 is quick and easy to erect and provides optimal structural stability for the house.

Figure 3:
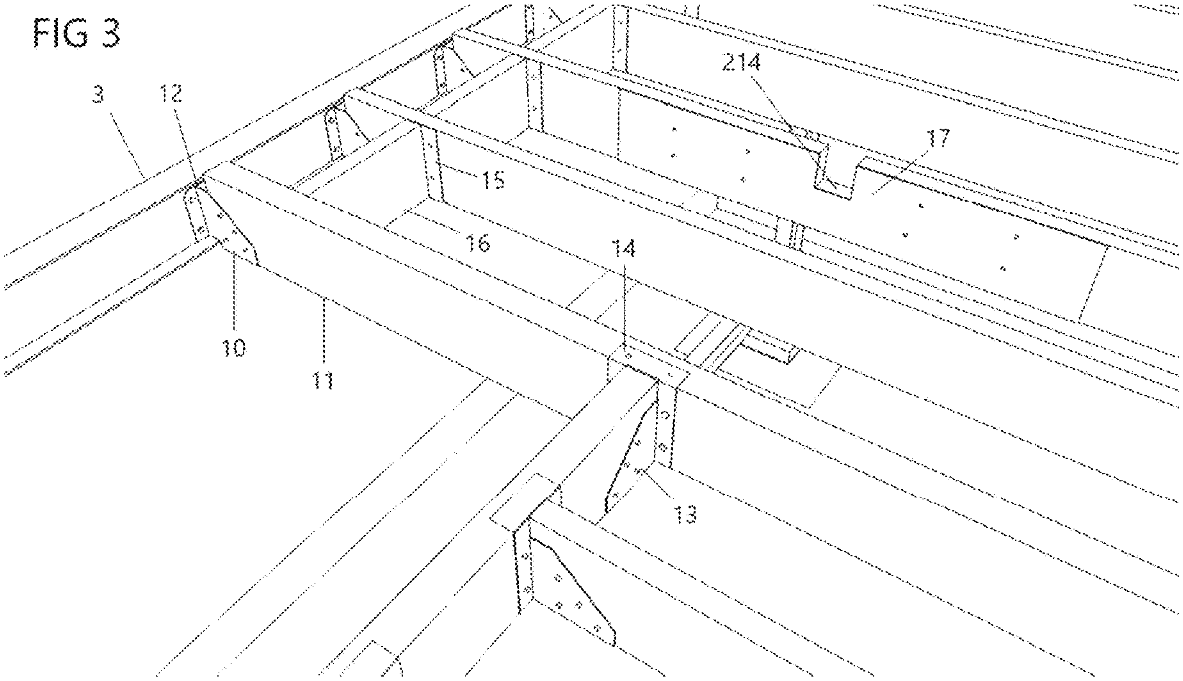
FIG. 3 is a detail perspective view of a bracketing system for a floor joist system.

Referring to FIG. 3, the process provides that the middle and upper beams on the main steel frame 3 consist of brackets 10, 13, 15, and 17 that support a flooring system that will prevent any structural movement in the building, advantageously reducing the risk of hairline cracks which would inevitably cause air leakage in the future. In the embodiment shown in the drawings, a joist bracket 10 is designed to facilitate pre-cut joists 11. The joist bracket 10 comprises a space 12 between the bracket itself and the end of the pre-cut joists, the space 12 is later filled with closed cell expanding foam which preserves the thermal enclosure of the overall building at joist level. As part of the process the joist layout is locked together using a Special locking bracket 13 which is bolted to the joists and an advantage of this locking bracket 13 is that it overlaps 14 on to the support joist thus ensuring that the joist cannot drop below the level of the support joist, which again advantageously prevents any structural movement in the flooring system. A noggin bracket 15 supports a series of noggins 16 that form and define the location of the inner thermal enclosure at the joist levels. Advantageously, these noggins 16 give further structural support to the floor system. The process provides a support bracket 17 which is fitted on both sides of a joist with a notch 214 formed therein to facilitate service pipes. Advantageously, the support bracket 17 prevents any sagging in the joists, which again prevents the risk of hairline cracks in the building. The joist brackets 10 set out one method of fitting joists in a house, however other joisting systems or arrangements may also be used. Known methods of fitting floor joists typically involve the joists being loose laid on the inner leaf of a cavity wall and a row of blocks laid between the joists. The gap between the joists and block is then sealed with mortar. The disadvantage of this method of construction is that all the weight of the floors over base rest solely on the inner leaf of the cavity wall thus increasing the risk of structural cracking of the inner walls. A further disadvantage of the traditional method is that the joists are not mechanically connected to the external walls which allow the external walls to move outward creating structural or hairline cracks resulting in air leakage. Furthermore, the mortar around the joist will invariably dry out invariably creating a gap around the joist which again will give rise to air leakage in the future.

Figure 1:
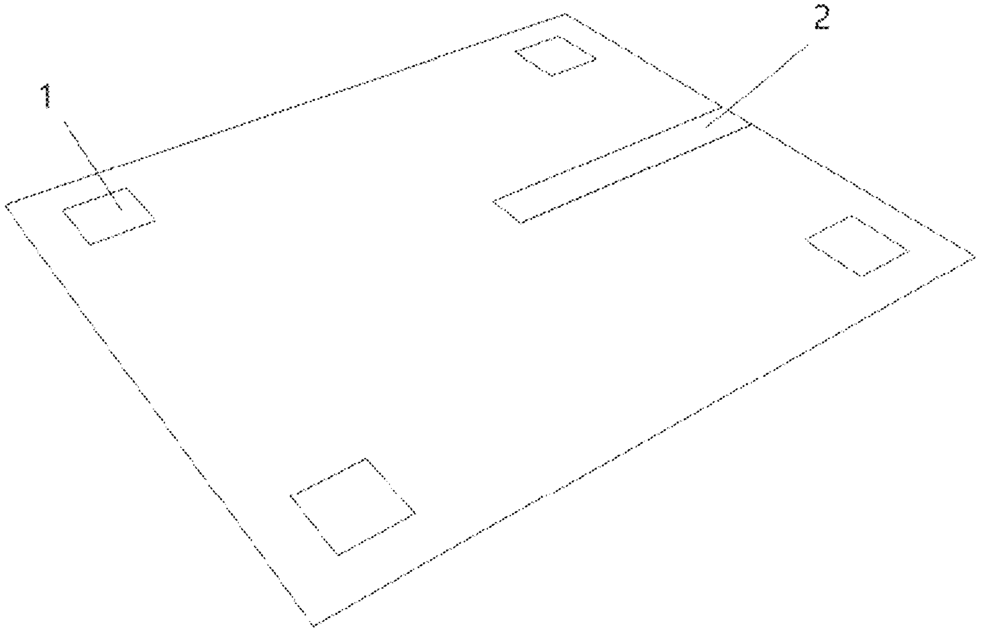
FIG. 1 is a perspective view of a base portion of a building according to the invention.

As is best viewed in FIG. 1, the building comprises one or more concrete support pads 1 upon which the main steel structure 3 is supported. The building structure also comprises a base pad 2 for supporting a superduct, the superduct configured to carry the ducting and services 20 into the building structure and terminates at one end of the plant room 211. The concrete used to form the concrete support pads 1 comprises a thermally insulative concrete, or a concrete having a thermally insulative additive. The resulting concrete support pads 1 stop cold bridging taking place through the concrete support pads 1 to the main steel structure 3. The concrete support pads 1 may also comprise waterproof or water-resistant concrete material or concrete having a waterproof or water-resistant additive, the concrete support pads 1 therefore also may act to stop or limit any moisture from reaching or penetrating the main steel structure 3 encased in the concrete pads 1.

Figure 4:
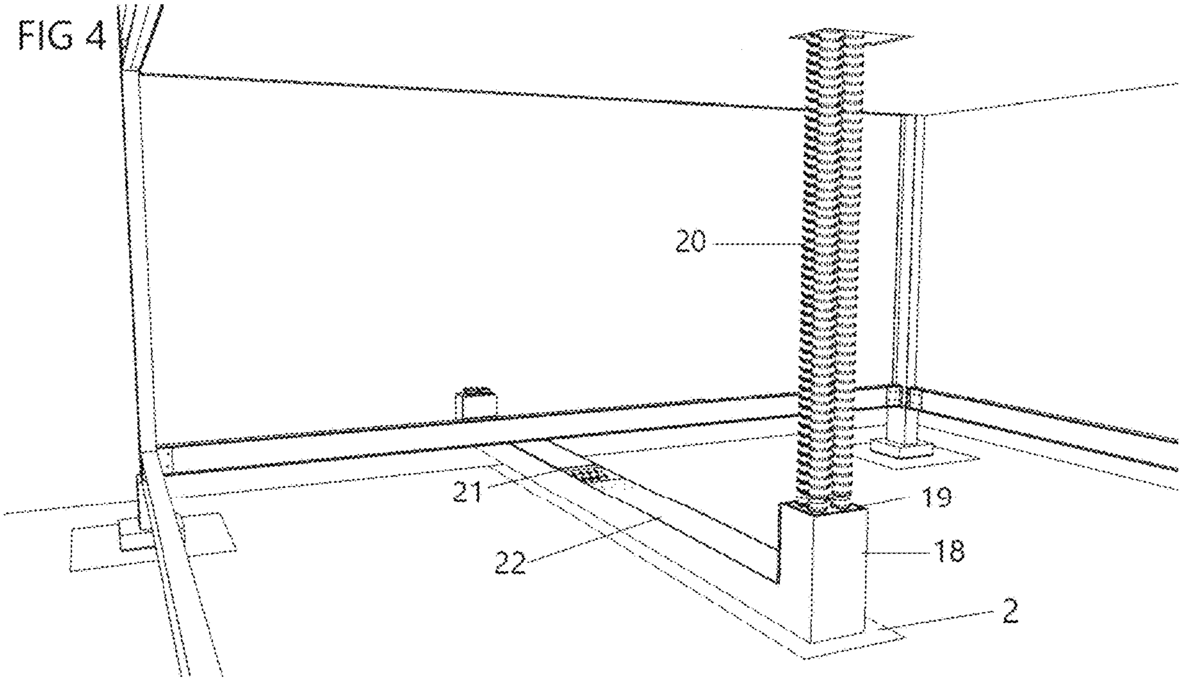
FIG. 4 is a perspective view of a superduct according to the invention.
Figure 5A:
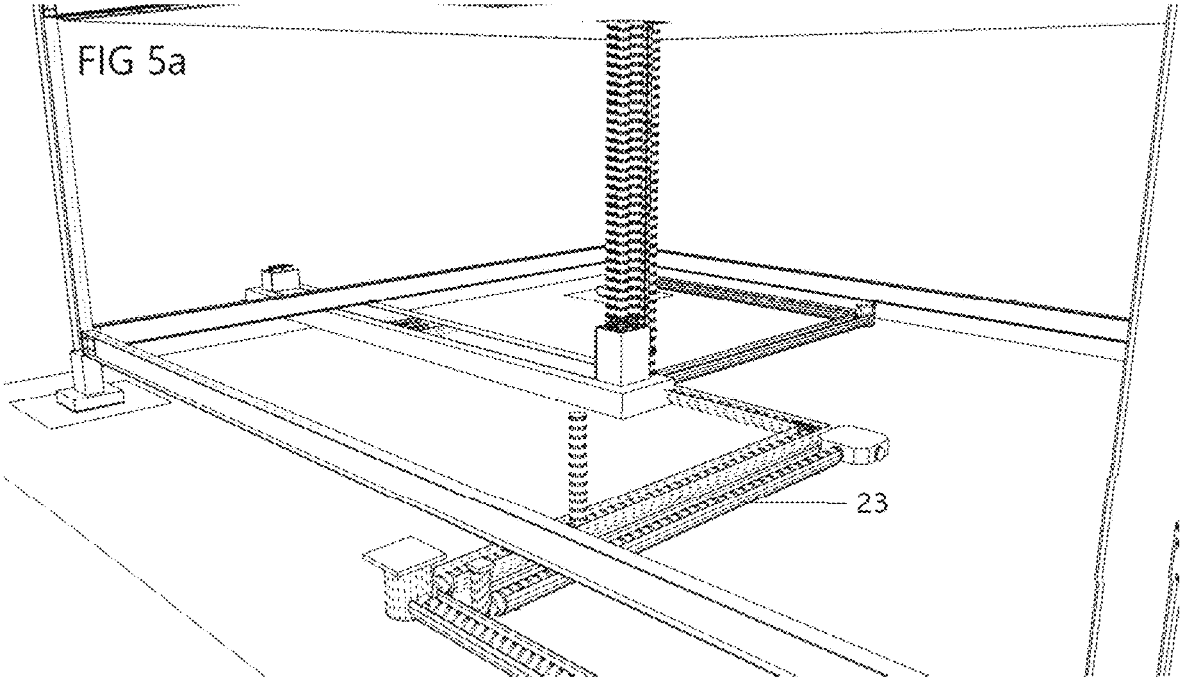
FIG. 5*a* is a perspective view of the superduct and ducting support system according to the invention.

FIG. 4 illustrates that, in some embodiments, a superduct 18 may fitted at subsoil level on concrete pad 2 which extends from a central point in the floor base of the house to the plant room 211 located either inside the house or outside the house. The superduct 18 extends upwards at each end to the floor level of the house and the floor level of the plant room 211. A recess 19 is formed to facilitate a vertical duct shaft that extends up through the various floors of the house terminating in the attic. The superduct 18 contains all the inward and outward service pipes required to service the house, excluding foul drainage and grey water which are installed separately. Advantageously the various service pipes 20 are installed in the superduct 18 which terminate approximately 100 mm above the floor level of the house and plant room 211. When the service pipes are fitted in the superduct 18, the superduct 20 is filled with closed cell expanding foam 21 which provides insulation around the service pipes, and a cover 22 is placed on the superduct. Advantageously the superduct 18 provides a single encasement where the vast majority of the service pipes can be strategically placed and tested prior to being insulated. In addition, the superduct arrangement prevents air leakage around service pipes 20. Known systems for providing service ducting into the house typically involve service pipes being installed in an informal manner leading to a greater risk of service pipes being damaged, and not being properly insulated thus giving rise to potential air leakage from the house. FIG. 5*a* also shows a ducting support system 23 underneath the ground floor slab for foul and grey water outlets which support system advantageously helps to eliminate the possibility of air leakage around the service ducting.

Figure 5B:
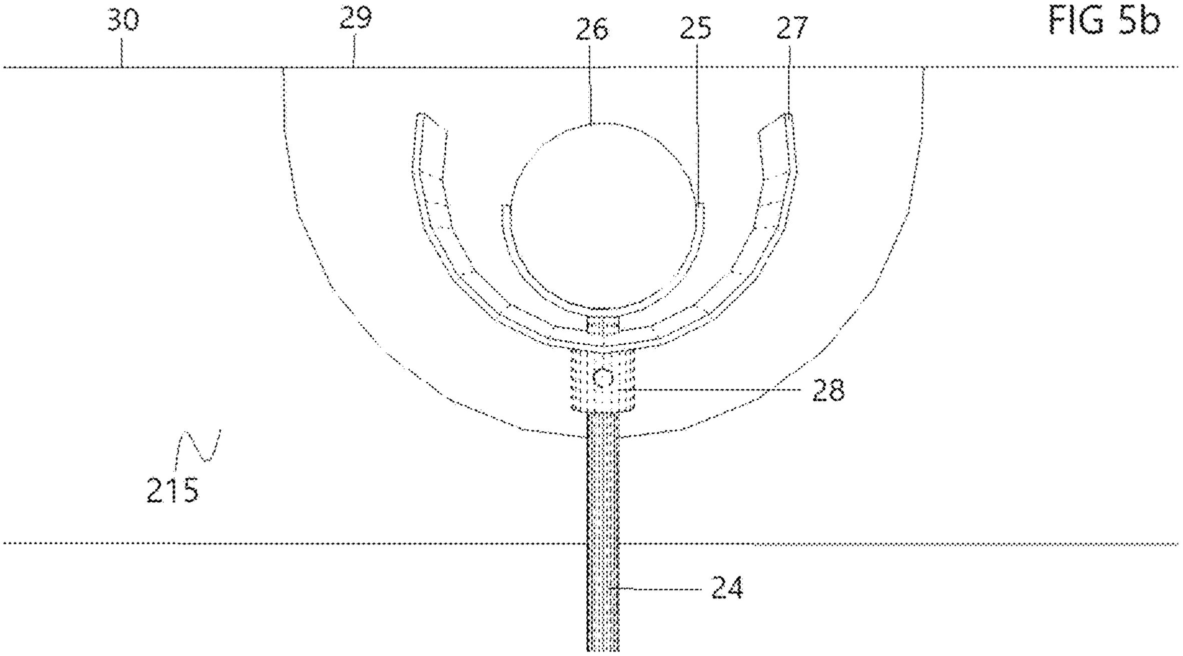
FIG. 5*b* is a cross-sectional view of the ducting support system of FIG. 5*a;*

Alternatively, ducting support elements 215 comprise a ground engaging spike 24 which is insertable into the ground at a first end and a ducting support bracket 25 at or about a second end, the ducting support elements further comprising a mesh profile 27 movably mountable to the ground engaging spike 24. The ducting support element comprises a fixing 28 for securing the mesh profile 27 at a chosen location on the ground engaging spike 24. The mesh profile 27 is a semi-circular portion of mesh and when concrete 29 is poured around the service ducting 26 and sets, the service ducting 26 is fixed permanently into the correct position, is supported by the ground via the spike 24, and yet cannot be punctured by hardcore 30 or other such surfaces formed on the ground. Furthermore, the concrete encased service ducting 26 reduces the risk of air leakage from the thermal enclosure around the service ducting 26. FIG. 5B Shows the preferred embodiment of the alternative ducting support elements 215. A spike 24 with a semi-circular ducting support bracket 25 holds the relevant service ducting 26. The spikes 24 are driven into the ground until the semi-circular bracket 25 reaches the correct level for the ducting 26. The semi-circular mesh profile 27 slides up the spike until it is approximately 50 mm away from the service ducting and a locking nut 28 holds the mesh 27 in the correct location. Hardcore screenings 30 can be placed up to and around the mesh 27 leaving an approximately 50 mm gap from the ducting 26 which advantageously prevents the sharp corners of the hardcore stone from puncturing the service ducting 26. The service ducting 26 sits into the correct location and a concrete mix 29 is poured around the service ducting which passes through the mesh 27 to grip the hardcore stone 30. At present, known methods do not adequately prevent air leakage around the various service ductings that are required for a dwelling. The known methods provide that the service ductings are generally loose laid in the hardcore base and informally embedded and surrounded with fine sand or other material where in time the fine sand or other material will move, resulting in air leakage from the dwelling.

Figure 6:
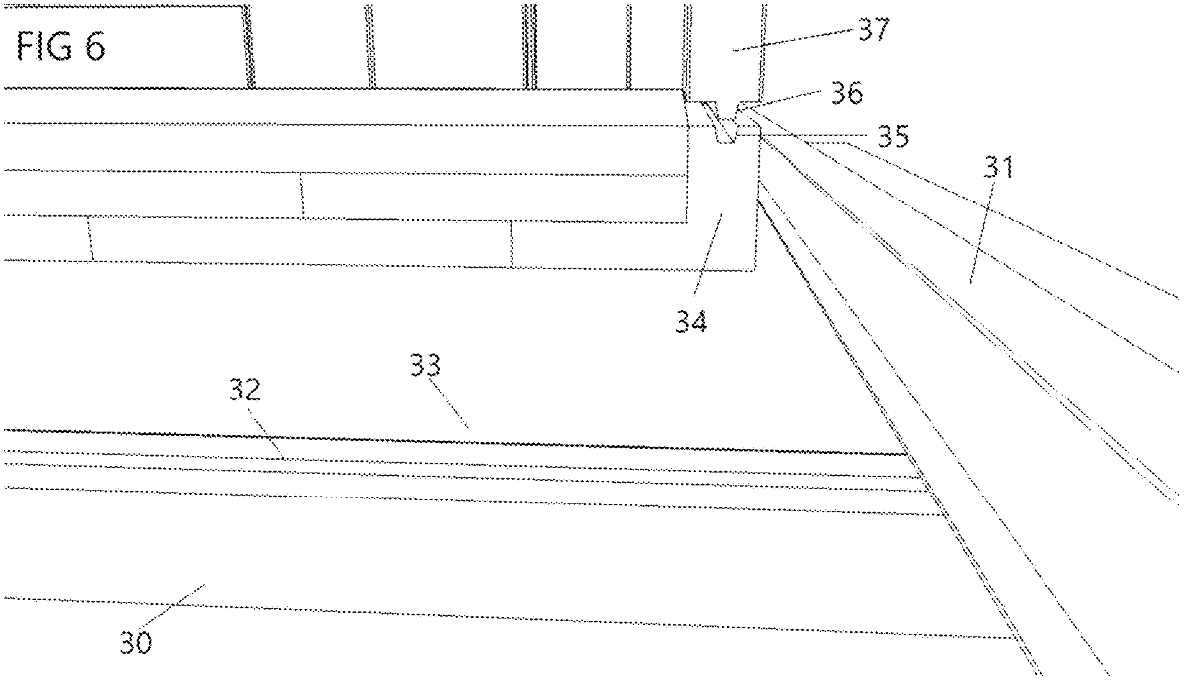
FIG. 6 is a detail perspective view of the base level of a building according to the invention.

As can be viewed in FIG. 6, the house comprises insulated base sections 34. The insulated base sections 34 comprise vertical upstand portions formed for engagement with a portion of the external wall sections 37. The vertical upstand portions comprise a recess 35 formed therein and the lowermost portion of the external wall sections 37 comprise a protrusion 36 thereon formed for insertion into the recess 35 of the vertical upstand portions. Advantageously, the interlocking nature of the protrusion 36 of the wall sections and the recess 35 of the vertical upstand portions prevents the travel of air through the joint between these two components.

FIG. 6 shows that horizontal lower beams 31 of the main steel frame 3 act as a structural support for the base of the house. The process of installing the base consists of installing hardcore 30, screenings 32 and a radon barrier 33. Other known methods of containing the house base are the use of rising walls, which are constructed with two rows of typically 100 mm block work with a cavity inbetween. The disadvantage of using concrete rising walls as a means of containing the house base is that the rising walls could be forced outwards with the weight of the floor slab giving rise to structural or hairline cracks, which in turn would give rise to air leakage. The insulated base sections 34 are preformed insulation sections of approximately 150 mm thickness and are placed on the radon barrier 33 of the base. The circumference of the preformed insulation sections 34 comprise of vertical upstand portions which comprises of approximately 230 mm wide vertical up-stand. The recess 35 is a semi-hexagonal recess 35 which receives the corresponding protrusion 36 of the ground floor thermal wall panel 37. The joint formed by the recess 35 and the protrusion 36 may be sealed with polymer adhesive to eliminate the prospect of air leakage at that point of the overall thermal enclosure. The protrusion 36 and recess 35, when joined together, provide a continuous unbroken layer of insulation. This joint further prevents any air leakage between the floor slab and the walls of the house and from the thermal enclosure. Additionally, the vertical upstand portion cannot move outwards as it is supported by the horizontal steel beam 31. Known systems tend to have the base constructed independently of the walls, resulting in a joint at floor level that will give rise to potential air leakage and which will not provide a continuous thermal loop between the floor slab and wall system. In addition, known systems tend to place the wall system on the floor slab and where the lower part of the wall system has a structural base, this base invariably creates thermal bridges in the wall system, thus breaking the objective of a continuous thermal loop around the habitable area of the house. The process then provides that a layer of approximately 150 mm rigid polystyrene sections of insulation are placed on the screenings and in turn a further layer of 150 mm polystyrene insulation is placed on top of that layer in a manner that breaks the joints. Various suitable ground floor systems can be installed within the confines of the vertical upstand portions of the insulated base sections 34, for example concrete or timber floors may be employed.

Figure 7:
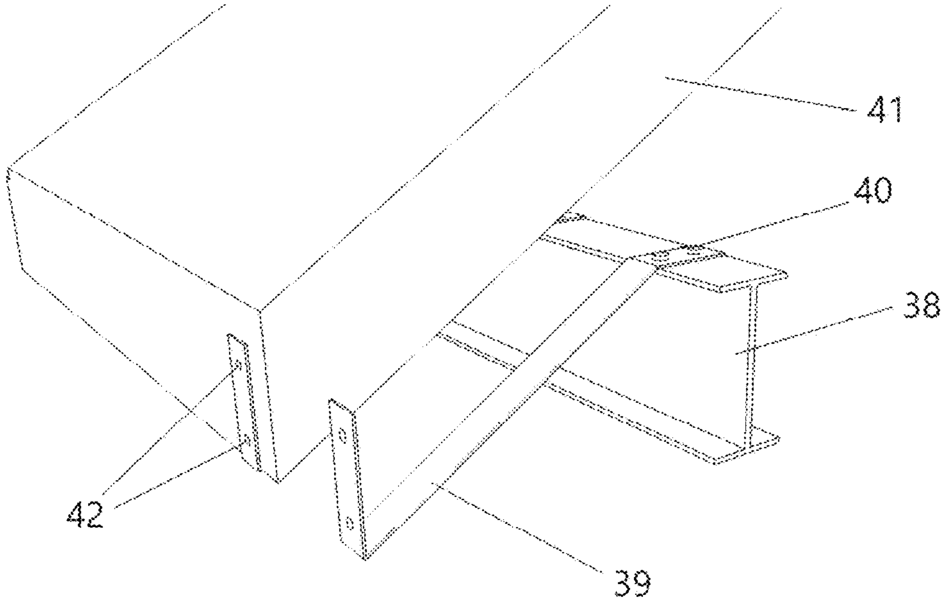
FIG. 7 is detail perspective view of an anti-slide roof bracket.
Figure 10:
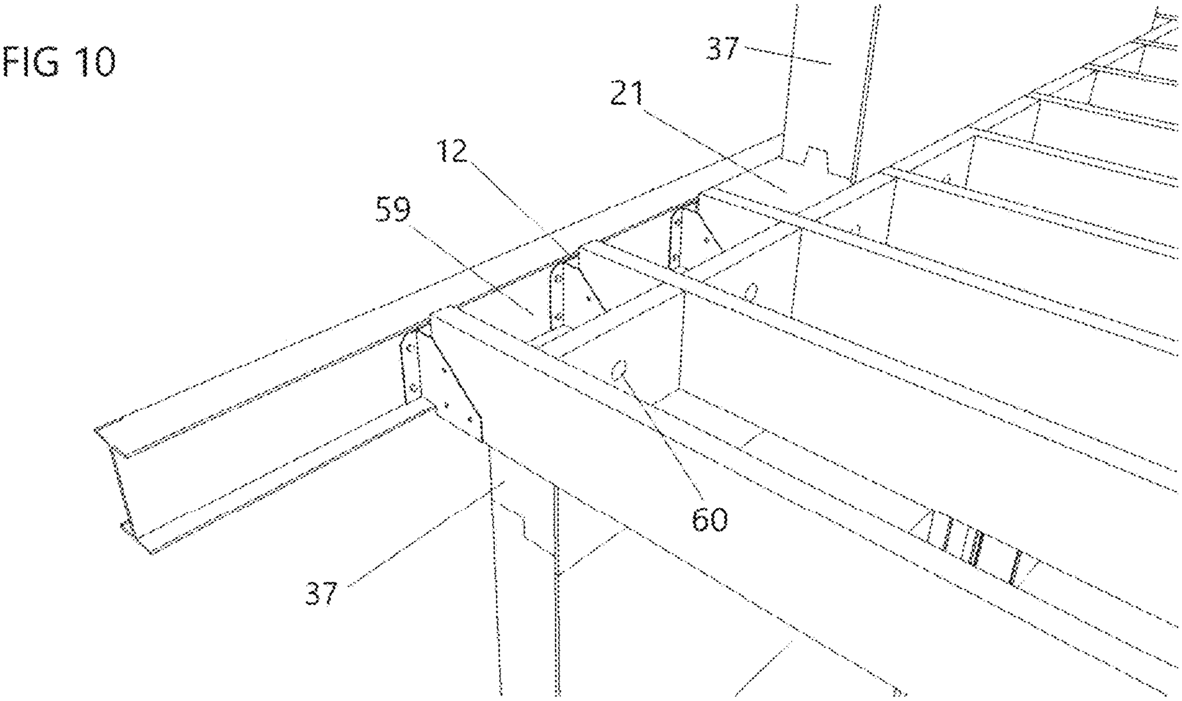
FIG. 10 is a detail perspective view of the building at joist level.
Figure 11:
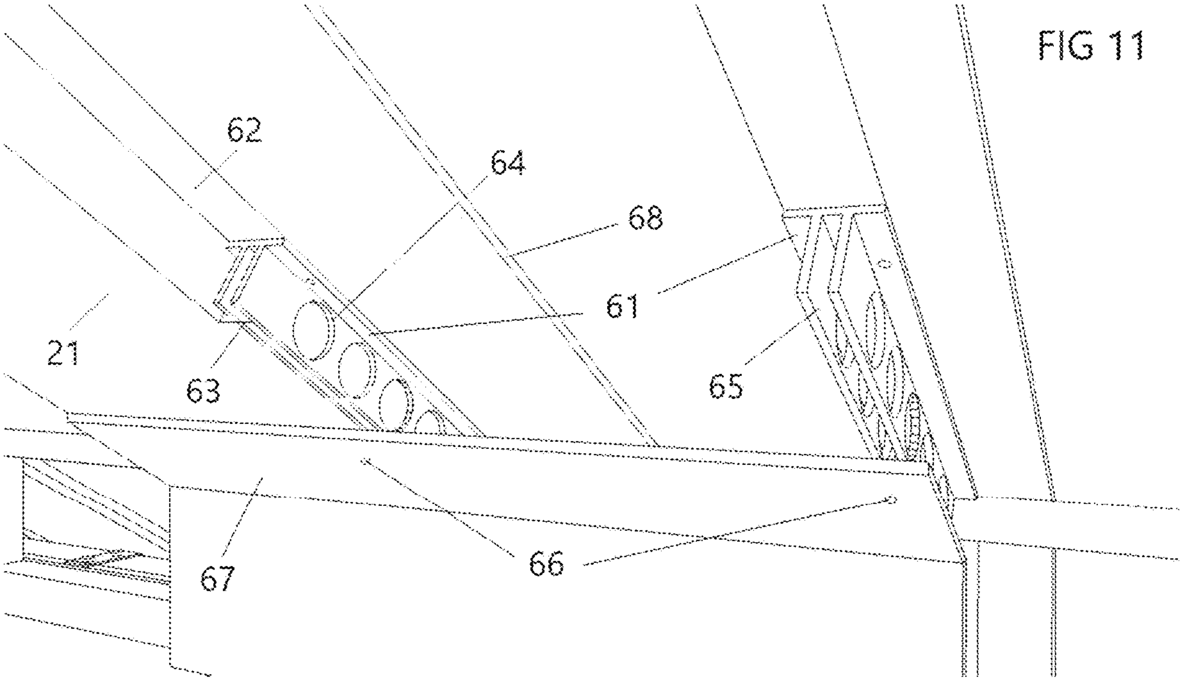
FIG. 11 is a detail perspective view of a bracketing system in the attic space.
Figure 12:
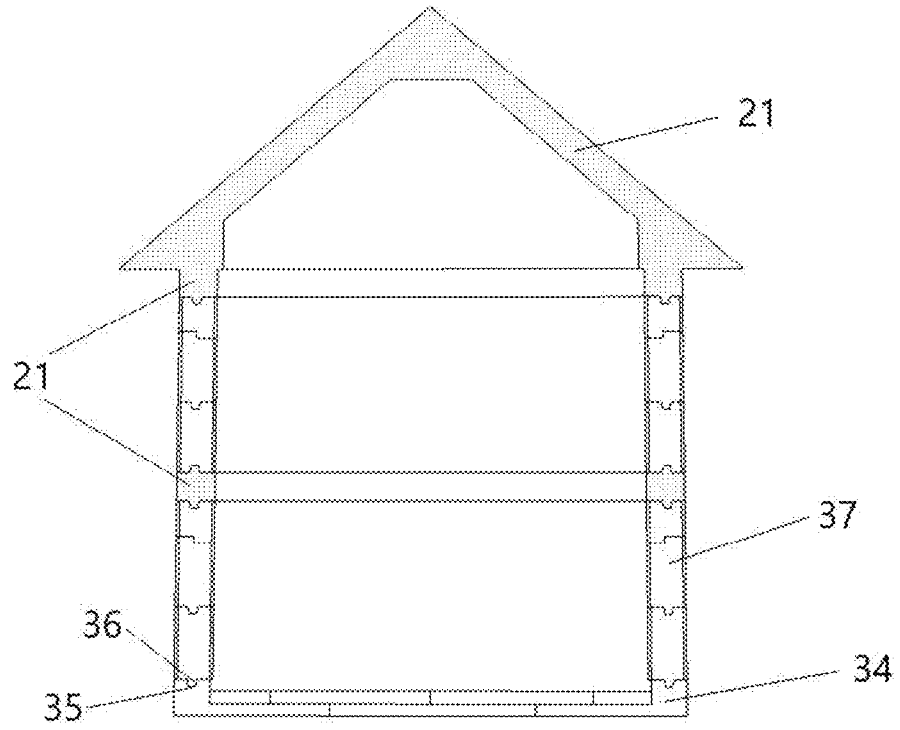
FIG. 12 is a cross-sectional view of the internal enclosure of the building according to the invention.
Figure 17A:
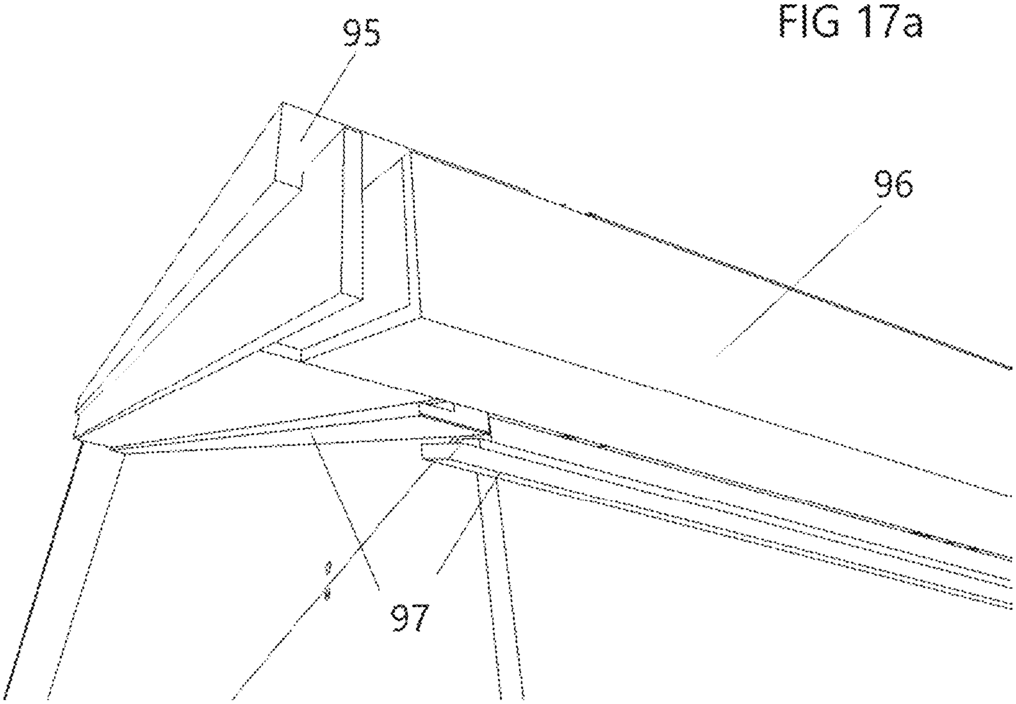
FIG. 17*a* is a detail perspective view of the barge system.
Figure 17B:
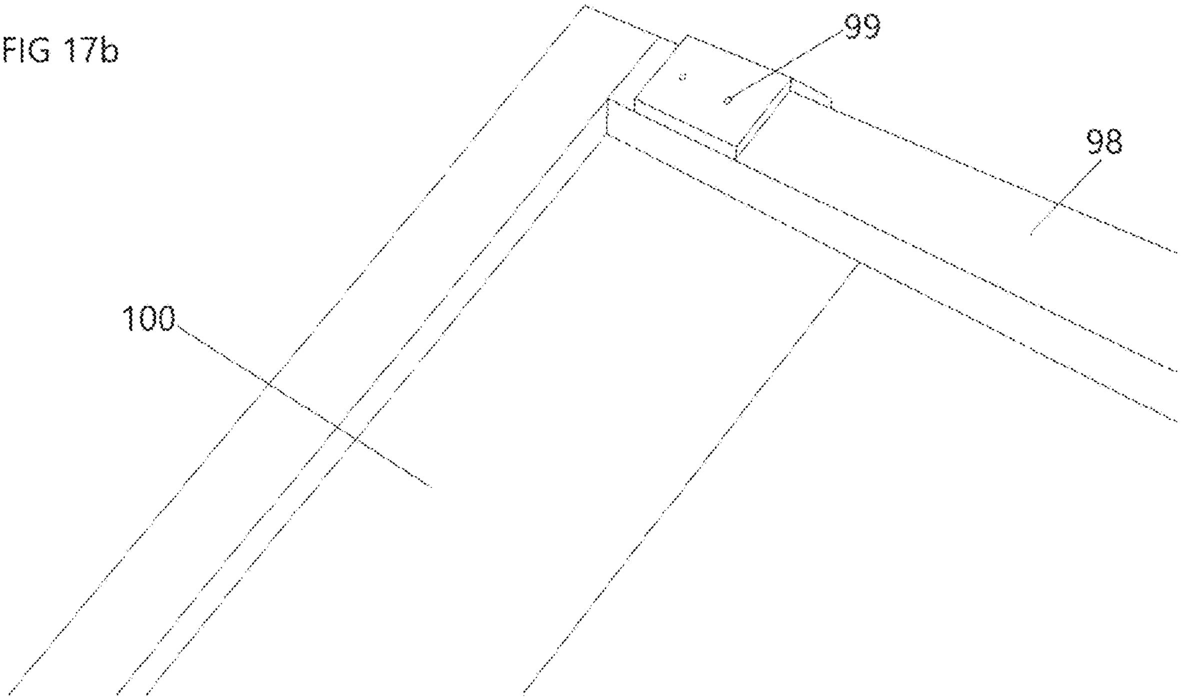
FIG. 17*b* is a detail perspective view of a ventilation outlet at ridge level.

Roof panels 41 are fixable to the main steel frame 3 via roof panel brackets 39. The roof panel brackets 39 comprise a flange configured to support the roof panels in a manner which prevents spreading of the roof and/or downwards slippage of the roof panels 41. The roof brackets are anti-slide roof brackets and FIG. 7 shows the upper beam 38 on the main steel frame 3 facilitates the anti-slide roof brackets 39 that hold the roof panels 41 in place. The anti-slide roof brackets 39 are designed in a manner that when bolted 40 to the upper beam 38, the roof panels 41 sit into the anti-slide brackets 39. Screws 42 are inserted into the roof panels which ensures that the roof panels cannot slide downwards or rise upwards as a result of wind pressure, snow weight or similar external forces. Advantageously, the anti-slide brackets also prevent any spread on the lower part of the roof as these brackets are fitted to the upper beams of the steel frame structure 3. The anti-slide roof brackets prevent the roof panel from any downward slippage as a result of wind pressure and snow weight or the like, which would compromise the structural integrity of the roof as whole and lead to potential air leakage. Known systems do not provide such brackets, the typical arrangement secures the roof by inserting screws or nails through the roof timbers into the outer wall. FIG. *8a* shows that the roof panels 41 have a bevelled joint 43 to prevent water ingress and the roof panels are secured at ridge level by a horizontal bolt 44. FIG. *8b* shows an overlapping joint 45 on the side of the roof panel 41 which is sealed with an adhesive compound 46 and when the bolt 44 is tightened the overlapping joint 45 is squeezed tight preventing air leakage and water ingress. FIG. *9a* shows how the internal thermal enclosure is formed by a series of interlocking wall sections, which are thermal wall panels 37. The thermal wall panels 37 may be made of rigid Ultra High Density (UHD) polystyrene/polyisocyanurate 47 with Oriental Strand Board (OSB) 48 on the outside and magnesium board 49 on the inside which provides one-hour fire protection. Other combinations are employable which provide the requisite thermal, structural and/or fire suppression properties. A wall is created by installing 3 layers of thermal wall panels 37. The lower layer of thermal wall panels contains the protrusion 36 on the bottom which sits into the corresponding recess 35 on the upstand of the base sections. The second layer of wall panels, when installed, are secured with a similar protrusion and recess joint. The third layer of thermal wall panels have a joggled or halving joint 50 to allow the panel to slide in under the ceiling joist during installation or removal of the third layer panels. Construction of the wall by installing three horizontal layers is only an example of one approach to constructing the wall, the wall may be constructed or configured in layers either vertically or horizontally, from a single wall panel or a plurality thereof. FIG. *9b* shows the OSB board 48 on the outside of the wall panel may also have a horizontal tongue and groove joint 51 to provide stability and prevent against air leakage. FIG. *9c* shows the OSB board 48 on the outside of the wall panel may also have a horizontal halving joint 52 to provide stability and prevent against air leakage. FIG. *9d* shows the OSB 48 is vertically overlapped 53 by approximately 100 mm to meet a corresponding recess 54 on the adjacent wall panel which also provides stability for the wall panel and prevents air leakage. The magnesium board 49 is vertically overlapped 55 by 20 mm to meet a corresponding recess 56 on the adjacent wall panel and when sealed prevents air leakage. FIG. *9e* shows the horizontal overlap on the magnesium board 49 where overlap 57 meets a corresponding recess 58 on the adjacent wall panel and when sealed prevents air leakage. The magnesium board is further recessed around the window and door openings to facilitate an overlap on the internal reveal and when sealed prevents air leakage. This same process of fitting the thermal wall panels is repeated on the first floor and gable ends in the case of a two-storey dwelling. FIG. 10 shows that a void 59 exists above the ground floor thermal wall panels 37 at joist level where the thermal enclosure must be extended up through the joists to meet the bottom of the upper thermal wall panel 37. In some embodiments, the thermal enclosure is maintained and formed at joist level by filling the void 59 area with closed cell expanding foam 21 which is pumped in through an access point 60 and advantageously fills the void 59 and forms the thermal enclosure at this point. Advantageously, this creates an airtight seal around the joists. In some embodiments, the closed cell expanding foam completely fills up the void 59, including the space 12 at the end of the pre-cut joist thus creating a further element of the internal thermal enclosure which advantageously becomes automatically airtight as the closed cell expanding foam not only fills the void 59, but due to it's expanding and chemical composition creates a continuation of the airtight thermal enclosure at joist level. FIG. 11 shows how the closed cell expanding foam is used to form the thermal enclosure in the attic space above joist level. To avoid a thermal bridge through the rafters of the roof panel the closed cell expanding foam must extend past the lower surface of the rafters in order to form a continues layer of air tight insulation. To assist this process a special rail 61 is fitted to the underneath of the roof panel rafter 62 which provides the finish line 63 for the closed cell expanding foam 21. Circular apertures 64 are created in the special rail 61 to allow the closed cell expanding foam 21 to merge at either side of the rail. The special rail 61 also provides a channel 65 in which a fixing screw 66 can be used to fix a wall/ceiling panel 67 that can be fitted later if an attic conversion is commenced. A rubber element 68 is placed on the top of the roof panel rafter 62 in order to prevent thermal bridging through the roof panel rafter. Advantageously the use of closed cell expanding foam at joist level and in the attic space ensures a continuous thermal loop around the habitable area of the house. In addition, the use of closed cell expanding foam in the attic space not only makes this area thermally efficient but also provides air tightness in this area allowing for an efficient attic conversion at a later date. The jointing system in the walls ensures that there will be no air leakage from the habitable area of the house and eliminates the need for fitting air tightness tape at the various joints. Furthermore, the use of expanding foam at joist level also prevents air leakage and eliminates the need for fitting air tightness tape around the joists. Known systems make an attic conversion costly and cumbersome as the cold attic would have to be insulated to the required standard and furthermore the attic space would have to be fitted with air tightness materials to prevent air leakage in the attic. Known systems place a huge reliance on the use of airtightness tape to seal the habitable area of the house which is time consuming and costly and dependent on good quality workmanship to ensure that the airtightness tape is properly fitted. FIG. 12 refers to the airtight thermal enclosure as a whole which by its design creates a continuous airtight thermal loop around the habitable area of the house. The design of the house is such that it firstly insures that there is a continuous unbroken thermal loop around the habitable area which is achieved by ensuring that the base insulation 34 is connected to the wall system 37 by the recess 35 and the tongue 36. The thermal loop is maintained at joist level by using Closed Cell Pump in insulation 21. Furthermore, the thermal loop is maintained in the attic space by pumping closed cell expanding foam 21 into the underneath of the roof panels. The use of closed cell expanding foam at joist level and in the attic space also provides air tightness at those points. The thermal walls 37 are internally faced with a magnesium board 49 which has overlapping joints which when sealed provide air tightness around the habitable area of the house. The thermal wall panels 37 are externally faced externally with OSB which protects the thermal wall panels and provides structural support. As best viewed in FIG. 17*a*, the roof also comprises a soffit feature an integrated barge system 95 and fascia and soffit system 96 fitted to the roof panels. A Soffit spacer 97 is fitted to the barge system 95 and a fascia and soffit system 96. The soffit spacer 97 is removable and the external wall sections 74 may thereafter be removed without disturbance of the roof and/or the soffit. The roof panels 41 comprise roofing element attachment portions of various types, examples of which may be viewed in FIGS. 18, 19, 21, 22, 23, and 24, for attaching roofing elements thereto. FIG. 17*b* shows the ridge system 98 in place which contains a ventilation outlet 99. A suitable water proof sealant 100, made up from nanotechnology, is applied to the roof panel, barge and ridge systems to prevent water ingress. Advantageously, the ridge, fascia and soffit and barge system provide that these items arrive on site as four separate units which can be easily and quickly fitted to the roof panel. Other known methods have these components made and fitted on site using varying different methods which are cumbersome and time consuming and these other methods are prone to water ingress and air leakage.

As shown in FIG. 13 *a*, when constructing the house and prior to the fitting of the walls, a special paint 69 is applied to the outside of the main steel frame 3 to protect the internal thermal enclosure from the risk of thermal bridging. An angled rubber mat 70 is placed on the upper inner flange of the main steel beams in order to divert light condensation to the outside of the house. A footpath gully tray 71 is installed on the outer flange 72 of the lower steel beam at the base level of the house. The footpath gully tray is formed from light-weight steel or other durable material. The footpath gully tray 71 slides on to the lower flange of the steel beam and is secured by a spring clip 73. The advantage of the footpath gully tray is that it provides a support for the external wall panels 74 and further provides a continuous rainwater gully at the bottom of the walls, which will take all rainwater that runs off the external walls. The footpath gully tray 71 also provides a solid and secure hold for the continuous rainwater grill 77 around the perimeter of the house and also provides a guide level for a finished level of a hardcore base that supports the external footpath as this hardcore base is fitted after the footpath gully tray 71 is fitted. The upper part of the footpath gully tray 79 is level with the continuous gully which provides a guide for a finished footpath. Advantageously the footpath gully tray insures that rain water runoff from the outer facade of the wall panel is diverted into the footpath gully tray avoiding a build-up of water on the footpath and this water may also be diverted to a rainwater harvesting system.

Figure 13A:
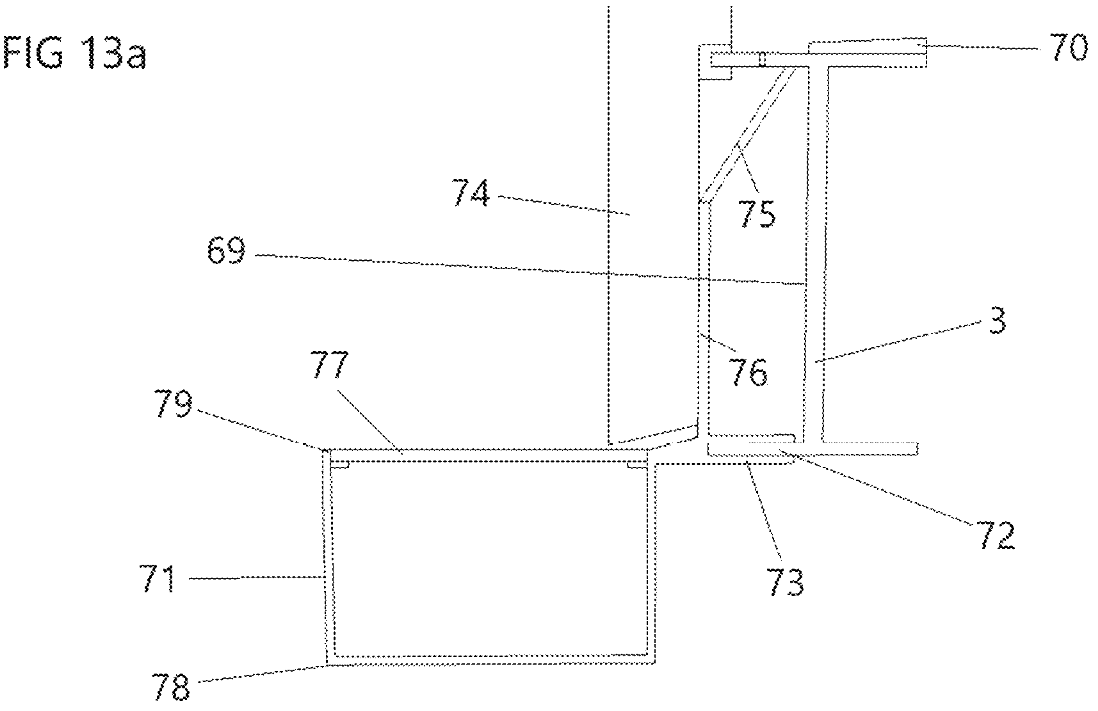
FIG. 13*a* is a cross-sectional view of a footpath gully tray.
Figure 13B:
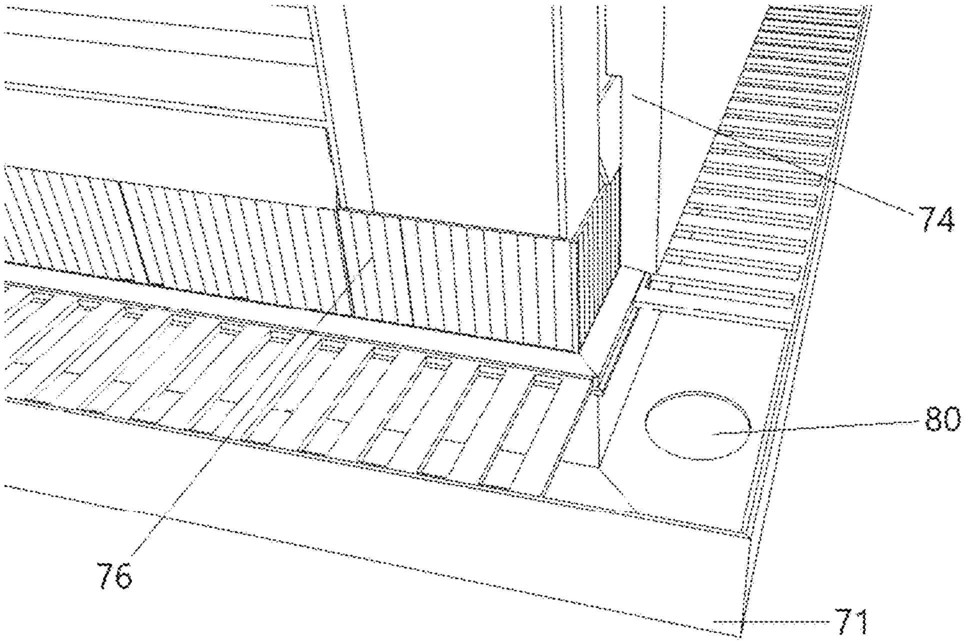
FIG. 13*b* is a detail perspective view of the footpath gully tray.

The house comprises a condensation management system, as is best viewed in FIG. 13*a*, comprising means for encouraging condensation from internally of the house, or a cavity thereof, to externally of the house. The condensation management system comprises condensation urging features in the form of the angled rubber mat 70, an angled flange 75, and a condensation channeling element comprising a ridged upstand 76. The footpath gully tray 71 will therefore collect any light condensation that may drop down through the ventilated cavity and divert any such condensation onto the angled flange 75 on the upper part of the footpath gully tray, where the condensation runs down the ridged upstand 76 and into the continuous footpath gully tray. FIG. 13*b* shows a 3D view of the footpath gully tray 71 and the ridged upstand 76, and illustrates how light condensation can run down the back of the external wall section 74 and into the footpath gully tray 71, and the water from the footpath gully tray 71 is discharged through an outlet 80. Advantageously the footpath gully tray 71 insures that no rain water can get access to the base of the house through the joint where the footpath meets the plinth of the house. Known building methods do not have a formal solution for ensuring that accumulated condensation is directed into an outlet and therefore collected condensation could be unknowingly diverted back in to the house. Known systems also do not provide a formal method for ensuring that rain water does not enter the base of the house where the footpath meets the plinth of the house. The disadvantage of water ingress in block work below ground level is that water will penetrate the block work and when this water freezes and expands it will cause deterioration to the block, reducing the strength thereof and undermining the structural stability of the house.

The external wall sections 74 comprise recesses 81 or recesses in the inner facing surfaces thereof formed for receiving at least one flange of the main steel frame 3. The recesses 81 of the external wall sections comprise thermally efficient lining in the form of rubber sleeves 82 which are engageable between the recesses 81 of the external wall sections 74 and the at least one flange of the main steel frame 3 to reduce thermal bridging therebetween. The external wall sections 74 comprise upper and lower recesses 81 formed for receiving a flange of the upper and lower horizontal beams of the main steel frame 3 respectively. The external wall sections 74 are alternatively or additionally securable to the main steel frame via thermal break brackets 83 and comprise a thermally efficient rubber pad 84 forming the portion thereof which contacts the external wall sections.

Figure 14A:
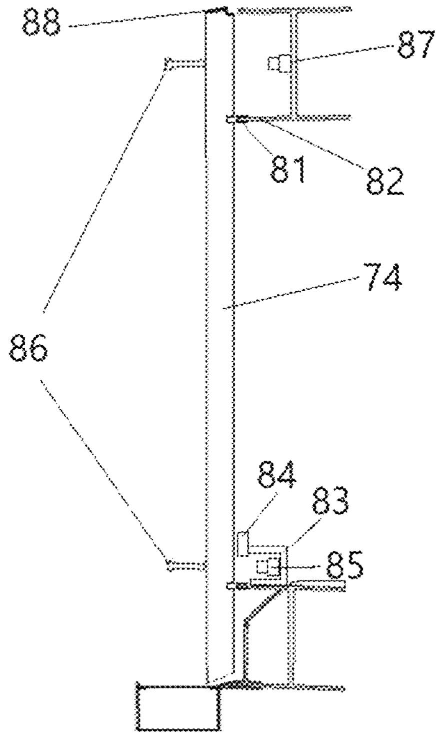
FIG. 14*a* is a cross-sectional view of an external wall system.

FIG. 14*a* shows the fitting of the external wall system 74. The external wall system is designed in a manner that it may be easily removed on a storey by storey basis to A) allow for the inspection of the inner thermal enclosure B) to allow the building to be extended without disturbing the main structure and C) to allow for external walls to be changed or upgraded without disturbing the main structure. The external wall system can be formed from various materials, but generally the wall panel is 50 mm in thickness with a selection of different finishes. As described above, the inside of the wall panel has a recess 81 which contains a rubber sleeve 82 which fits onto the flanges on the outer steel beams which prevent the risk of thermal bridging through the external wall sections 74 onto the main steel frame. The lower section of the external wall sections 74 are fixed to a series of thermal break brackets 83 on the lower beam of the main steel frame 3. The thermal break brackets 83 consist of a rubber pad 84, which pad serves to prevent any thermal bridging from the outside of the wall system through the thermal break bracket onto the beams on the main steel frame 3. Additionally, this thermal break bracket 83 consists of a strong thermally efficient nut 85 to prevent any thermal bridging passing through the wall panel fixing bolts 86 and onto the beams on the main steel frame 3. Further, the top of the external wall section 74 is fixed to a mid beam portion by thermally efficient nuts 87. Advantageously, this thermally efficient nut 87 prevents any thermal bridging through the wall panel fixing bolt 86. The exact same bracketing system is repeated for the upper storey external wall sections. Additionally, rubber seals 88 are placed between the lower and upper external wall panels which advantageously prevents against water ingress and possible friction between the horizontal joints on the external wall sections.

Figure 14B:
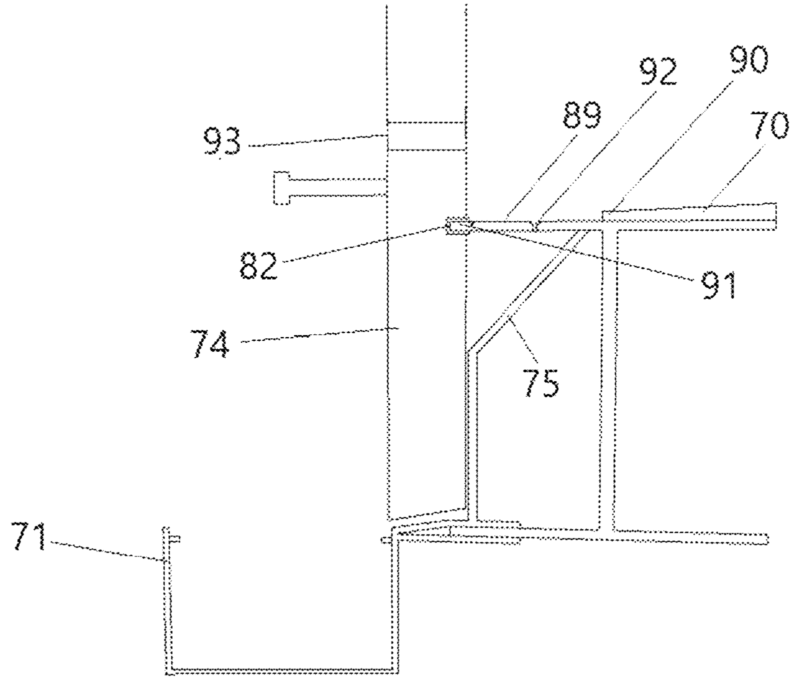
FIG. 14*b* is a cross-sectional view of the lower portion of FIG. 14*a;*

FIG. 14*b* shows how the angled rubber mat 70 collects any light condensation that might emerge in the cavity and the angled mat diverts this condensation to a channel 89 adjacent to the edge of the mat. The lower edge of the angled mat 90 and the rubber sleeve 82 sitting on the opposite flange 91 creates a channel 89 which is used to collect any light condensation that might emerge in the cavity. The horizontal beams have drip holes 92 of approximately 20 mm diameter at approximately 1 m intervals along the centre line of the channel 89 which allow any light condensation, or any possible wind driven water ingress, through the ventilation grill to drip down on to the angled flange 75 on the footpath gully tray 71. The main steel frame acts as a ventilated cavity between the internal thermal enclosure and the external wall system advantageously creating an air circulation area, which greatly reduces the risk of condensation/damp. The air circulation is provided through vents 93 in the external wall panel 74. However, the above described features ensure that any possible condensation that might arise in the cavity is safely diverted to the outside of the house. Known methods of collecting condensation in a wall system typically involves the installation of a vapour proof membrane which terminates at the plinth level, however, this method is prone to poor quality installation where there may be no proper outlet at plinth level to allow the accumulated condensation from the vapour proof membrane to run outside the house, causing a build-up of condensation within the house structure.

Figure 15:
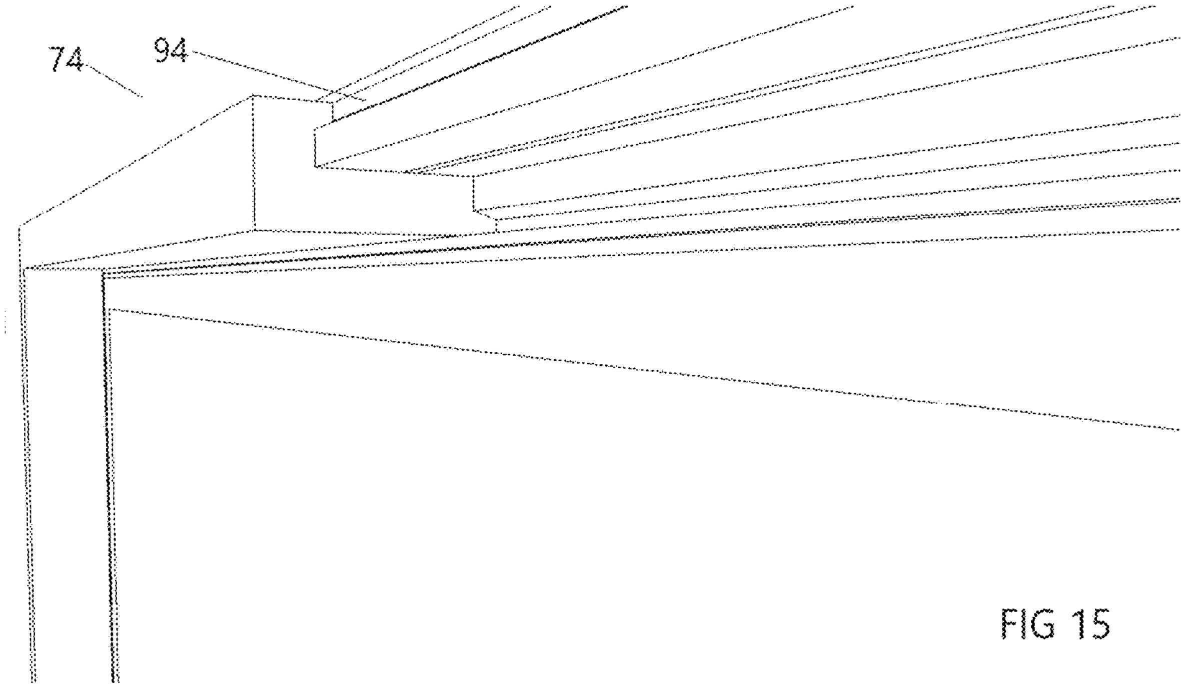
FIG. 15 is a detail perspective view of an external reveal connecting the external wall system and a subframe.

FIG. 15 shows the external wall panel 74 having a recess 94 formed around the window and door openings to receive a tongue on the sill and on the external passive reveal which is connected to the specially designed window and door subframe system hereinafter described. The strength of the external wall sections 74 allows finishing in render, Terylene, slim brick or stone cladding, solar panels or any combination of the above. Alternatively, a basic finish can be applied to the external wall sections 74 at construction stage, which allows the finish to be upgraded in the future.

The ability to remove a single storey panel without interfering with the one above or below, allows an extension to be added to the house as the wall panel is so designed that when it is removed it exposes the structural steel of the main steel frame 3 allowing the extension to be connected to the main steel frame 3, advantageously reducing any structural interference to the original house. In addition, the manner in which the external wall system may be removed allows an extension to be built without interfering with the internal thermal enclosure until the extension is completed, thus causing minimum interruption to the occupants of the house. Moreover, the external wall system can be upgraded as technologies advance, an example being the provision of a complete solar panel wall and again this can be achieved without any structural interference to the original house due to the ability to remove external wall sections 74 without disturbing other components of the building. The external wall sections 74 may also be removed to facilitate inspection and maintenance of the thermal enclosure or any component of the building typically obscured by the external wall sections 74.

Known systems for external walls consist mainly of concrete block walls, which if exposed to water ingress risk the possibility of this water freezing, causing the water in the blockwork to expand resulting in a cracking in the blockwork. Furthermore, blockwork and plaster are prone to the effects of Mica, which soaks water into the blockwork/plaster and again when the water freezes in the blockwork/plaster the expansion causes undesired cracking. FIG. 16 refers to the external wall system and furthermore shows how the external wall sections 74 provide a complete wall system for a building. The external walls 74 are attached to the main steel frame 3 by thermally efficient components 86 which prevents thermal bridging. The design of the wall system ensures that any condensation is eliminated by providing a ventilated cavity through vents 93 of the external wall panels. Furthermore, the ventilated cavity has a channel 89 in the steel beams with an outlet 92 to remove any condensation build up, which condensation drops onto angled flange 75 on the footpath gully tray 71. The angled flange directs any condensation down the back of the external wall and into the footpath gully tray.

Figure 18:
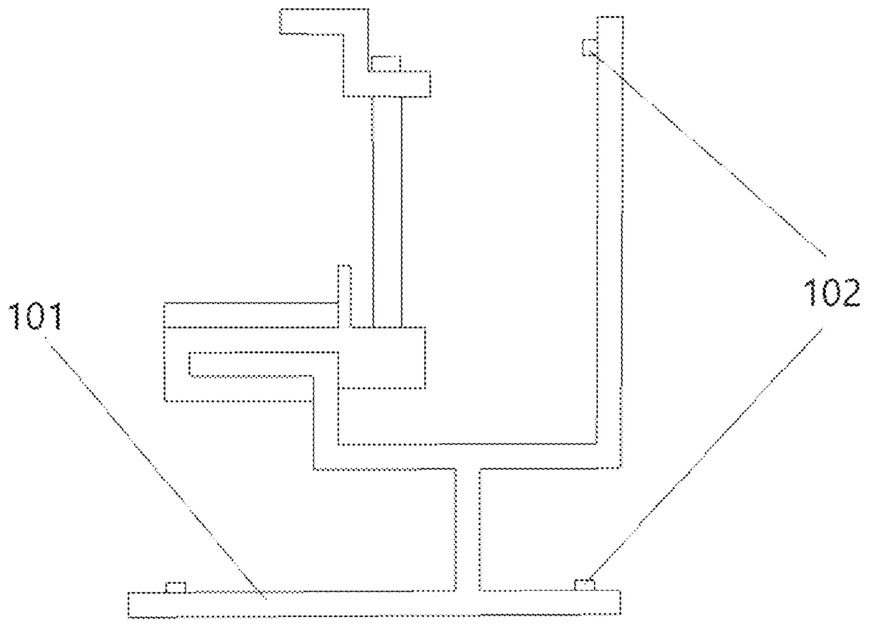
FIG. 18 is a cross-sectional view of a barge bracket.
Figure 19:
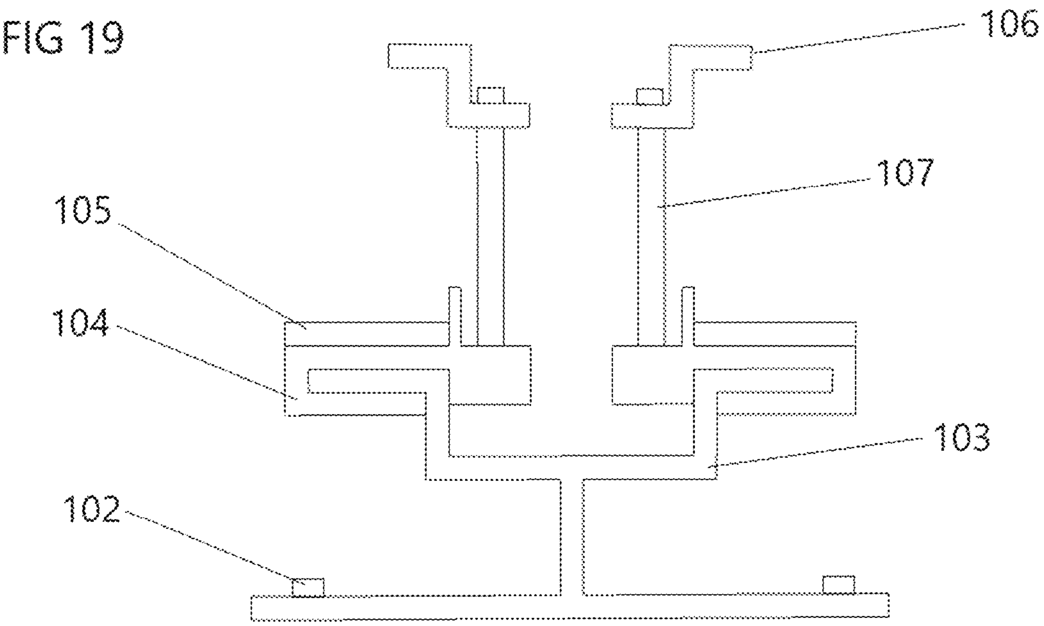
FIG. 19 is a cross-sectional view of a main connecting bracket.
Figure 20:
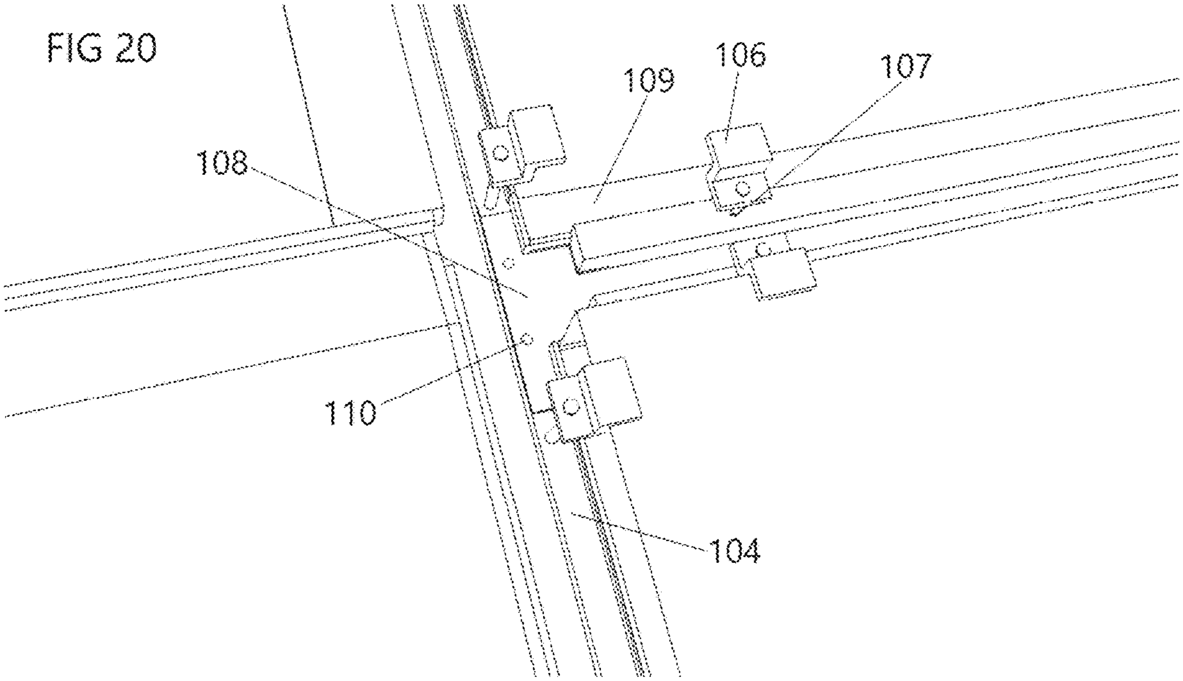
FIG. 20 is a detail perspective view of a solar panel bracket.
Figure 21:
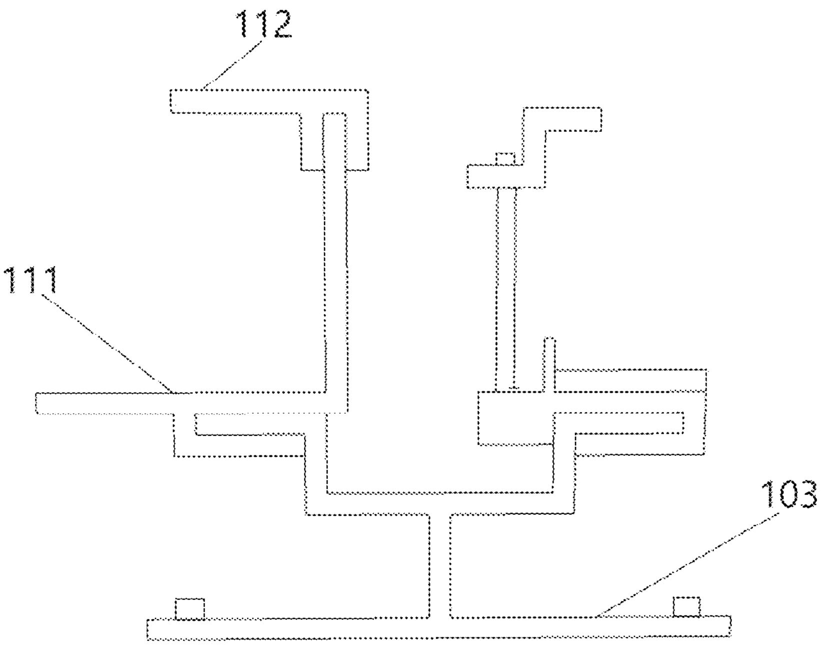
FIG. 21 is a cross-sectional view of a roof finish bracket.
Figure 22:
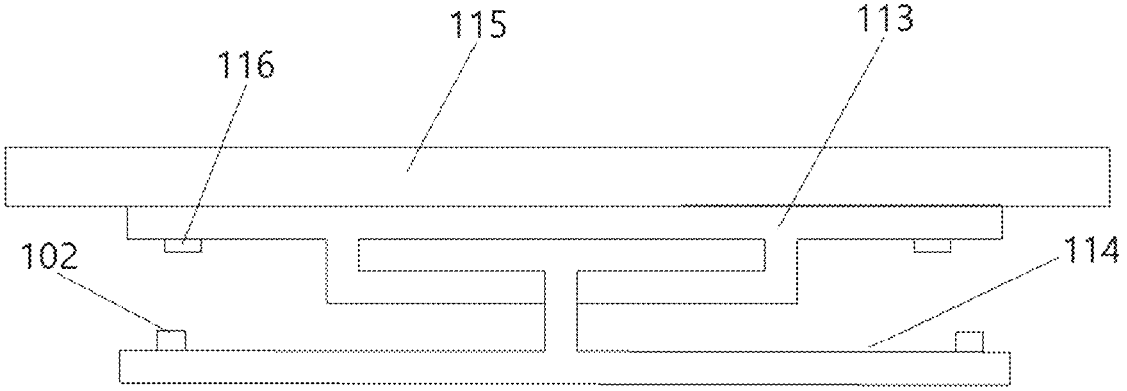
FIG. 22 is a cross-sectional view of a tile support bracket.
Figure 23:
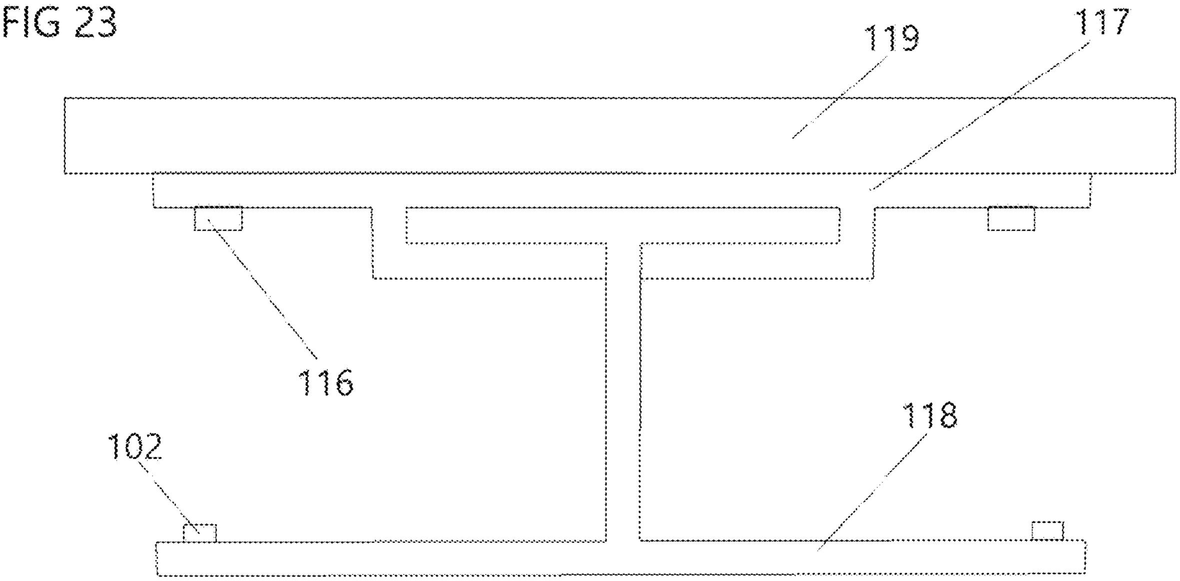
FIG. 23 is a cross-sectional view of a slate support bracket.
Figure 24:
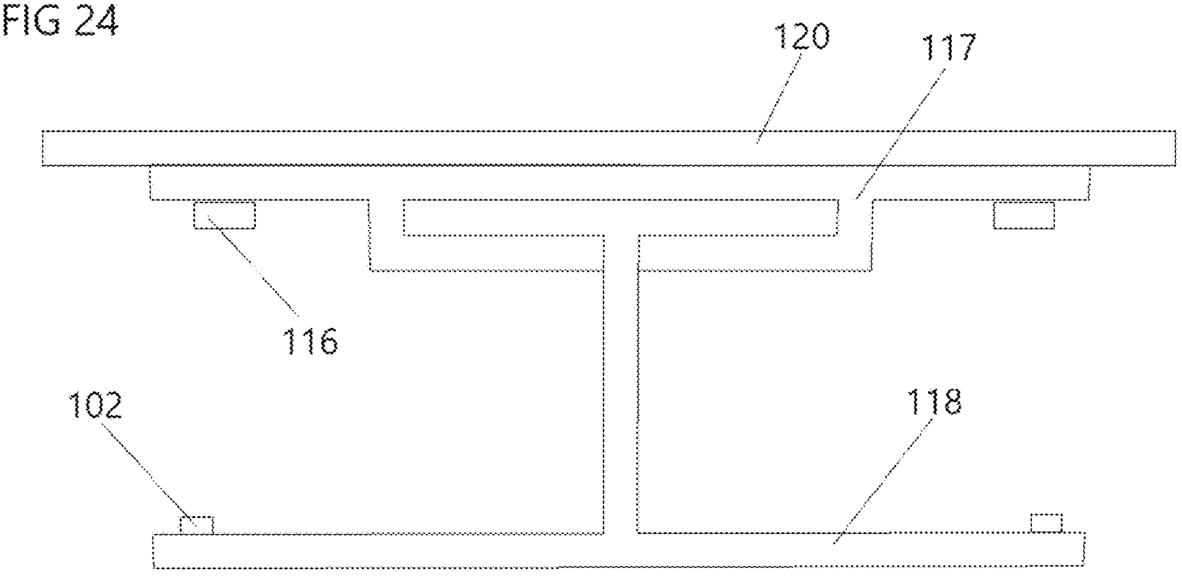
FIG. 24 is a cross-sectional view of a ply support bracket.
Figure 25A:
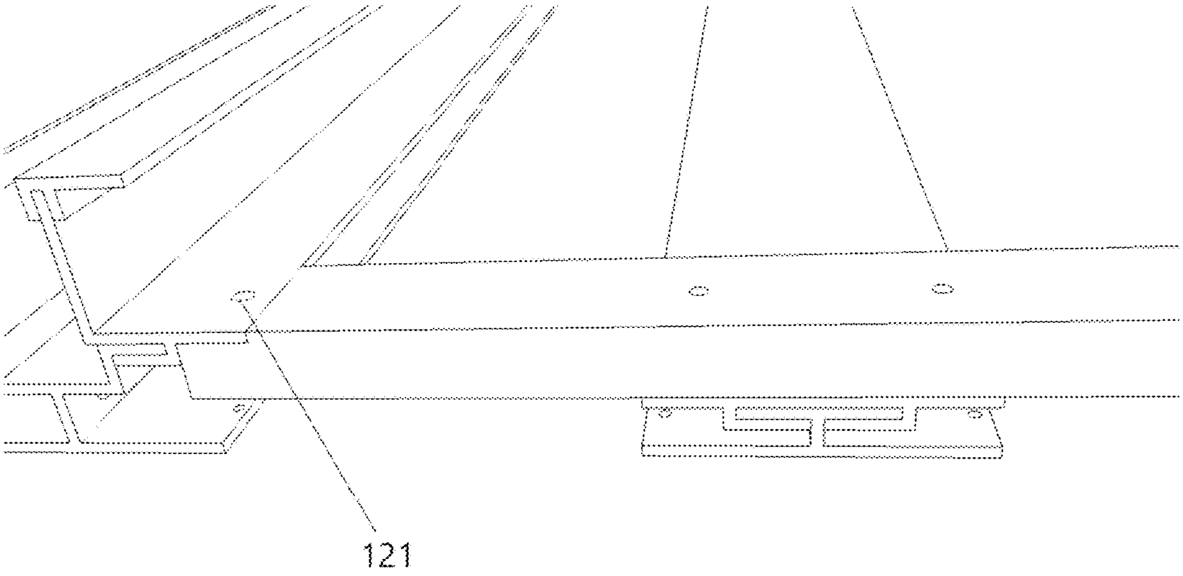
FIG. 25*a* is a perspective view of a tile batten secured to a roof finish bracket.
Figure 25B:
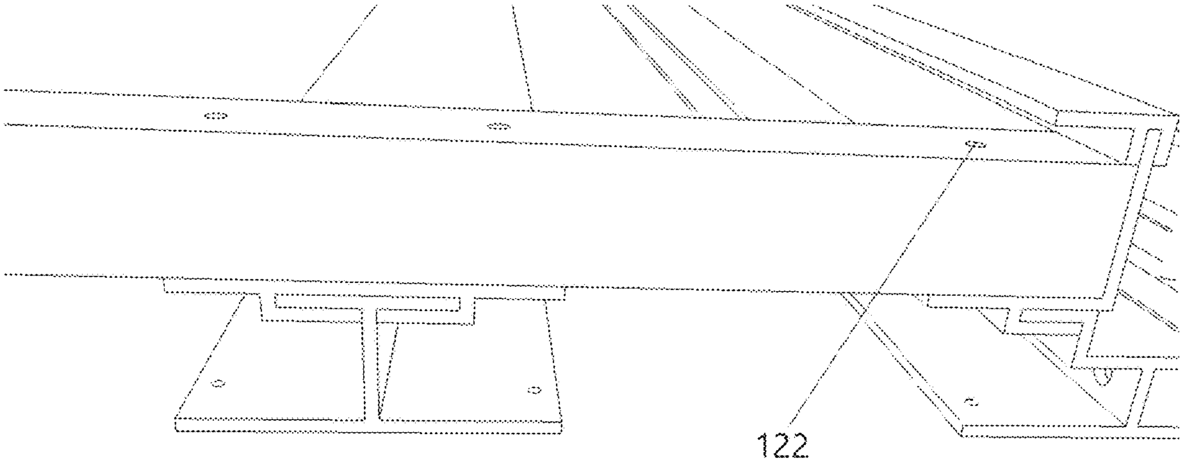
FIG. 25*b* is a perspective view of a slate batten secured to a roof finish bracket.
Figure 25C:
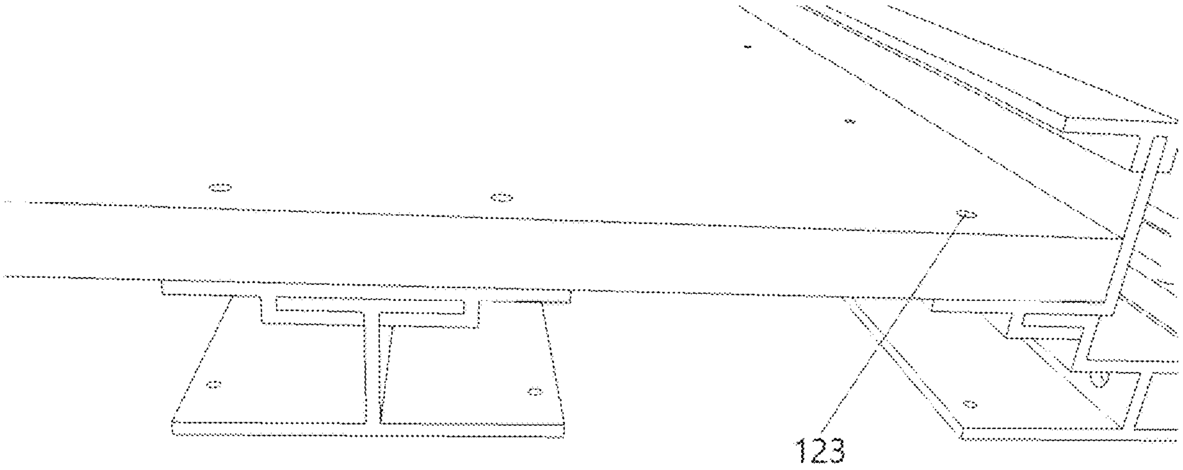
FIG. 25*c* is a perspective view of a plywood base for a living and/or standing seem roof.
Figure 26:
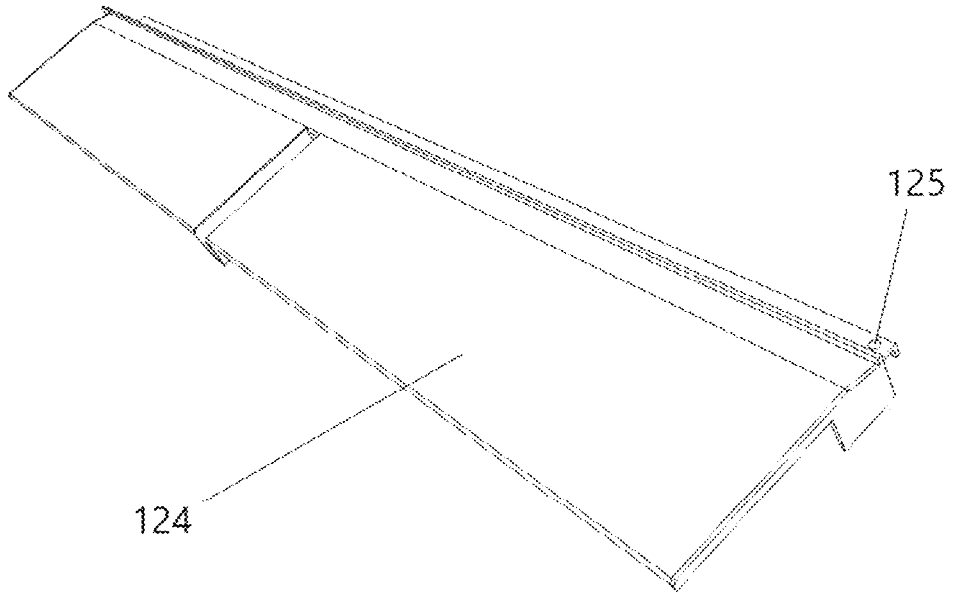
FIG. 26 is a perspective view of a seal flashing.
Figure 27:
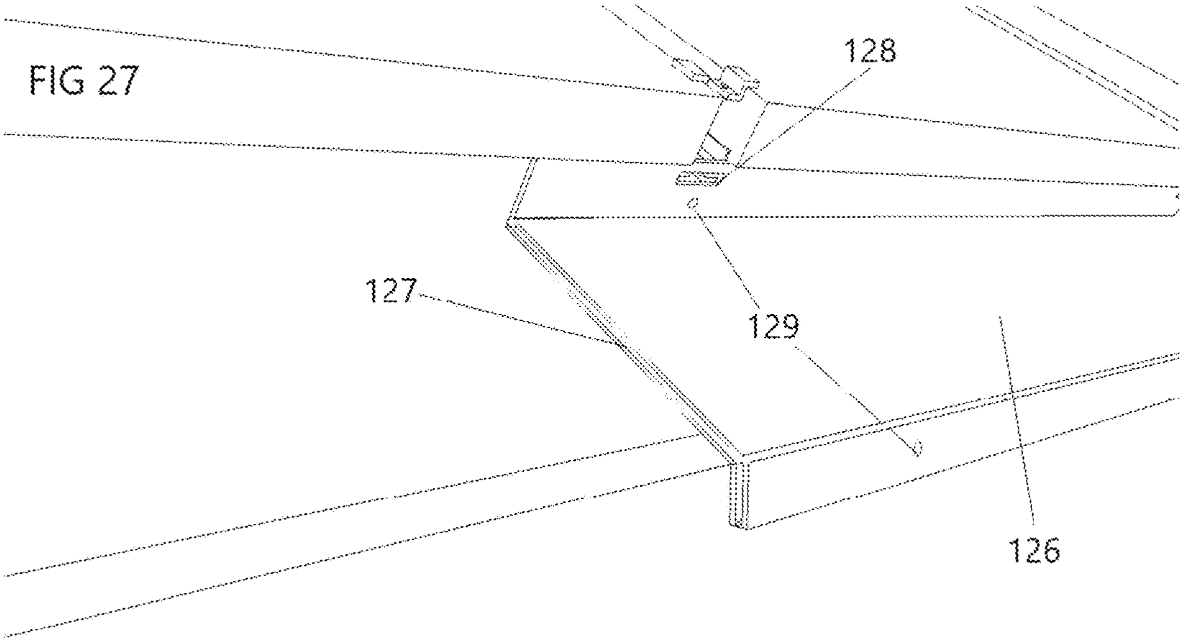
FIG. 27 is a perspective view of a fascia flashing.
Figure 28:
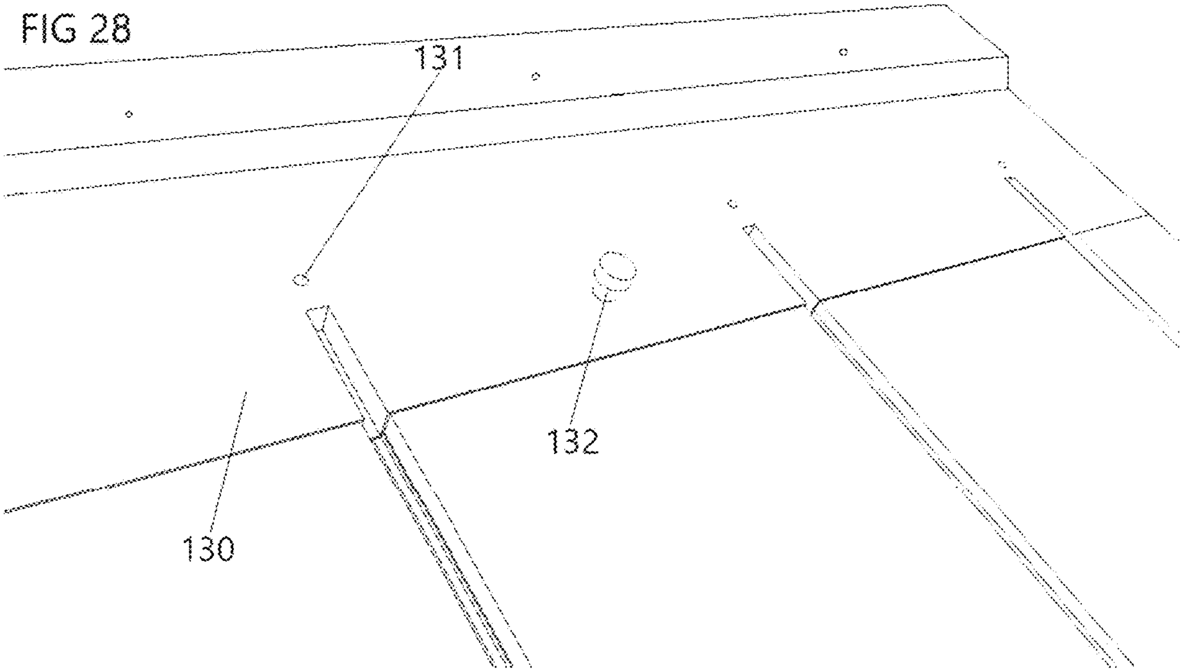
FIG. 28 is a perspective view of a ridge flashing.
Figure 29A:
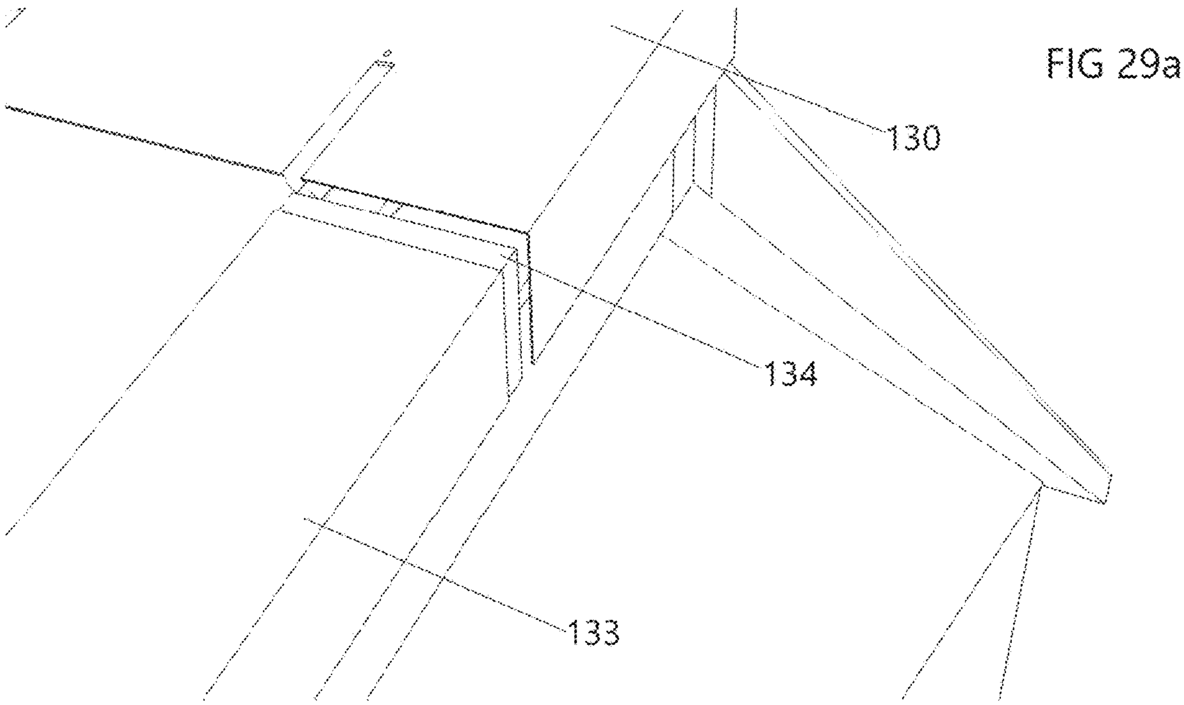
FIG. 29*a* is a perspective view of an overlap on a barge flashing slotting into the ridge flashing.
Figure 29B:
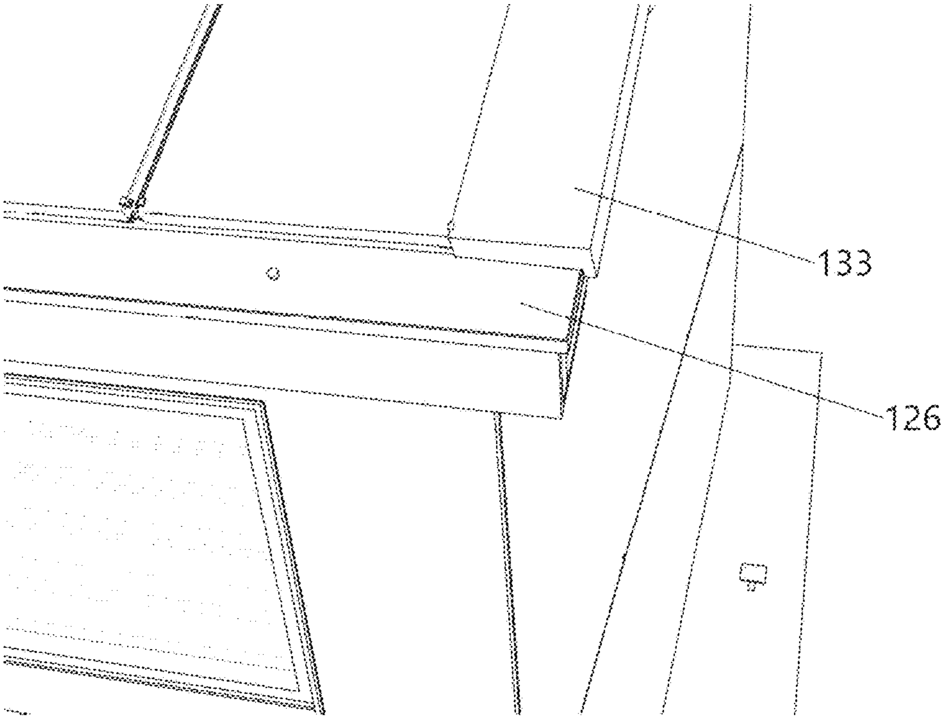
FIG. 29*b* is a perspective view of the barge flashing dropping over a front fascia flashing.
Figure 30:
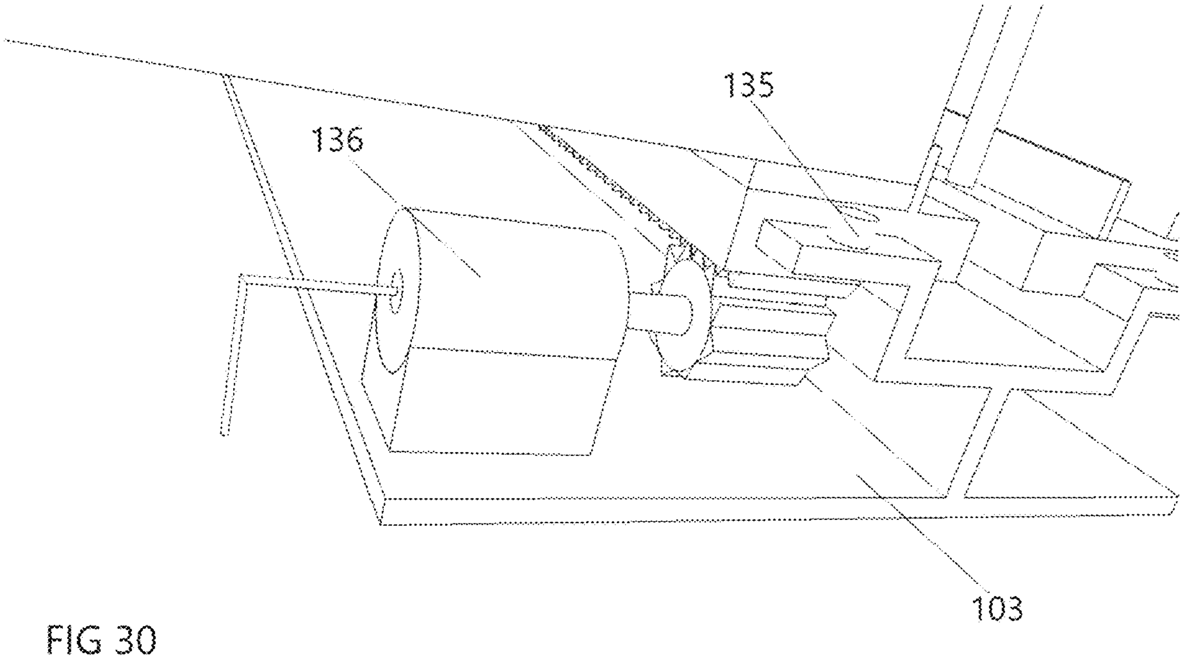
FIG. 30 is a perspective view of the compact motor unit.

An integrated roof covering system is installed on the roof panels. FIG. 18 shows a barge bracket 101 designed to fit tightly along the inside of the barge and is fixed to the roof panel and the barge by fixing screw 102. FIG. 19 shows a main connecting bracket 103 which bracket facilitates further brackets that hold the various roof sections in place. Connecting bracket 103 is secured to the roof panel by fixing screws 102. A solar panel bracket 104 may be provided which slides up and down the connecting bracket 103 and is used to fix solar panels to the roof. This bracket contains a rubber portion 105 which acts as a cushion for the solar panels. A grip plate 106 is applied to the solar panel and a fixing bolt 107 is pushed through the grip plate 106 and bolted into the solar panel bracket 104 until the solar panel is adequately secured. The same arrangement takes place on the opposite side of the solar panel. The grip plates should be applied at approximately 300 mm centres on each side of the solar panel. FIG. 20 illustrates that, in order to create space between the top of a solar panel and the bottom of the next solar panel, a spacer bracket 108 is used and this bracket has a rubber mat 109 which acts as a cushion for the solar panels. The spacer Bracket 108 is fixed to both solar panel brackets 104 by fixing screws 110 on both sides. The solar panel is held in place by placing the grip plate 106 on the solar panel and when bolted 107 to bracket 108 until sufficient tension is achieved to make the space between the solar panels watertight. FIG. 21 shows that when any other roof components are put alongside a Solar Panel a further bracket is used and this roof finish bracket 111 slides up and down the rail on the connecting bracket 103. A rubber seal 112 can be fitted on the top edge of the roof finish bracket 111 in order to provide a seal for slate or tile finishes. FIG. 22 shows a tile support bracket 113 which is supported by a short rail bracket 114 which is secured to the roof panel by fixing 102. The tile support bracket 113 is used to carry the timber battens for tiles and this tile support bracket 113 slides up and down the short rail bracket 114. The tile battens 115 can be fixed to the tile support bracket 113 by fixings 116. FIG. 23 shows a slate support bracket 117 which is supported by a tall rail bracket 118 which is secured to the roof panel by fixing 102. The slate support bracket 117 is used to carry the timber battens for slates. The slate support bracket 117 slides up and down the tall rail bracket 118. The slate battens 119 can be fixed to the slate support bracket 117 by fixings 116. FIG. 24 shows a ply support bracket 117 which is supported by a tall rail bracket 118 which is secured to the roof panel by fixing 102. The ply support bracket 117 is used to carry a plywood base 120 for a standing seam or living roof. The plywood base 120 can be fixed to the ply support bracket 117 by fixings 116. FIG. 25*a* shows the tile batten is secured to the roof finish bracket by fixing screw 121. FIG. 25*b* shows the slate batten is secured to the roof finish bracket by fixing screw 122. FIG. 25*c* shows the plywood base for living and standing seem roofs are secured by fixing screw 123. FIG. 26 shows a seal flashing 124 is provided to seal the connection between various roof finishes and the top of solar panels and this flashing is secured by fixings 125. FIG. 27 shows a fascia flashing 126 is fitted at the lower portion of the roof and facia board. The fascia flashing contains a perforated cavity 127 to allow any condensation run into the gutter. The fascia flashing 126 contains an outlet 128 which allows water to flow from the network of roofing brackets into the gutter and is fixed to the facia board by fixings 129. FIG. 28 shows a ridge flashing 130 which is fixed to the ridge by fixing 131, the ridge flashing 130 containing an air vent 132 which allows air circulation through the roof system. FIG. 29*a* shows a barge flashing 133 contains an overlap 134 which slots into the ridge flashing 130. FIG. 29*b* shows the barge flashing 133 drops over the front fascia flashing 126 providing a waterproof seal. FIG. 30 shows that the finished roof sections can be released by removing a locking bolt 135 on the connecting bracket 103 were a remotely operated compact motor unit 136 allows any particular roof finish section to slide down the connecting brackets.

The roof system as described above allows the roof finishes to be changed or upgraded in a manner that will not interfere with the structural stability of the house thus avoiding hairline cracks which advantageously will avoid long-term air leakage. The integrated barge system and complimentary ridge system and fascia and soffit system can be fitted on the roof panels. Advantageously, the barge, ridge and fascia and soffit system eliminate the risk of water ingress and air leakage in the roof area. Additionally, a waterproof sealant is applied to the roof panel, barge and ridge system which advantageously prevents water ingress. The barge, ridge and fascia system are designed to accommodate a roof finish that advantageously permits the utilisation of any one of or any combination of solar panels, slates, tiles, lead, zinc and/or a living roof. The roof materials are also not limited to the aforementioned list. Where solar panels are installed in conjunction with other roof finishes during construction, the solar panels are not installed level with rather than on top of the roof finishes as is often the case at present, which makes the solar panels look unsightly. As described above, the solar panels are attached in a manner which permits them to be flush with surrounding roof surfaces, improving the appearance of the roof and/or reducing the likelihood of damage to the solar panels by wind or other external forces. In addition, an initial number of solar panels can be installed on the roof at construction stage and the integrated system advantageously allows for extra solar panels to be easily added in the future.

At present solar panels are being used on buildings but it is envisaged that their use will dramatically increase in the future. The roof system as described facilitates the addition of more solar panels to a roof when required without substantial disturbance to the surrounding structure. Solar panels, or any chosen roof finishes, can be easily inspected for maintenance purposes by having the various sections of the roof attached to a sliding rail system which allows the roof sections slide off the main roof area to a lower level for easy reach. The entire roof system can be upgraded or extended without interfering with the structural stability of the building which advantageously avoids the risk of air leakage in the future. Known systems involve solar panels fitted on top of slates or tiles which are drilled to allow service pipes into the house, and these drill holes increase the risk of water ingress and air leakage. It can be extremely cumbersome to add extra solar panels to a roof using traditional known systems, and solar panels on slates or tiles can also be unsightly and detract from the aesthetics of the building.

Figure 31:
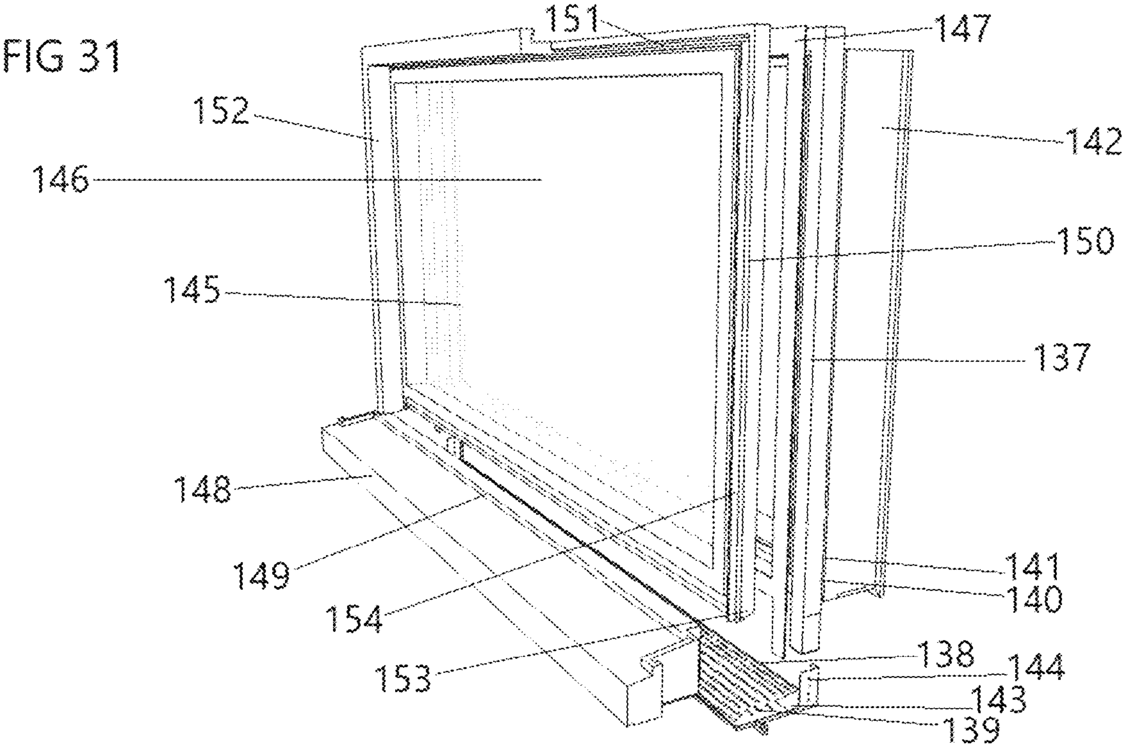
FIG. 31 is a detail perspective view of a window subframe.

The house comprises window/door arrangements comprising a subframe 137, 166 mountable in an external wall section of the building, and an external passive reveal portion 152 having a first engagement portion 158 in engagement with the subframe 137, 166 and a second engagement portion 159 in engagement with the external wall section of the house. The external passive reveal portion 152 forms an airtight and/or thermally insulative connection between the subframe 137, 166 and the external wall section. The first and second engagement portions 158, 159 of the external reveal portion form a compression fit with the subframe 137, 166. The window arrangements further comprise internal passive reveal portions 142 which comprise a generally quadrangular frame extending internally of the subframe 137. The internal reveal passive portions 142 comprise mitred lower corners further comprising correspondingly formed interlocking engagement features. The Window and Door subframe system prevents water ingress to the building from the outside and prevents air leakage from the habitable area. FIG. 31 shows that the window subframe 137 consists of a base-tray 138 which collects any condensation or water ingress that could enter the subframe and any such water is discharged through the outlets 139. The rear part of the subframe 140 has a recess 141 to facilitate an internal passive reveal 142 and this subframe sits on a rubber pad 143 in the base tray 138 and the rear part of the subframe is fixed to the base tray by bolts 144. The rear part of the subframe contains a rubber seal 145 where the window 146 is fitted, and this rubber seal prevents air leakage between the window and sub-frame. The rear part of the subframe has a rubber pad 147 fixed to its face by adhesive to prevent thermal bridging passing through the assembled subframe. A passive sill 148 comprising of rigid polystyrene coated with various surface coatings is fitted to the base tray and contains an up stand 149 which runs perpendicular at each end of the sill to prevent water ingress from the outside of the building. The front part of the subframe 150 has one horizontal and two vertical recesses 151 to facilitate the engagement portion 158 of the external passive reveal 152. The front part of the sub frame 150 is then fitted to the rear subframe 140 and the bottom profile 153 on the front subframe overlaps the upstand 149 on the passive sill 148 and therefore creates a watertight seal. The front part of the subframe 150 is fixed to the rear subframe 140 by screws 154 which are inserted into the recess 151 on the front subframe 150.

Figure 32A:
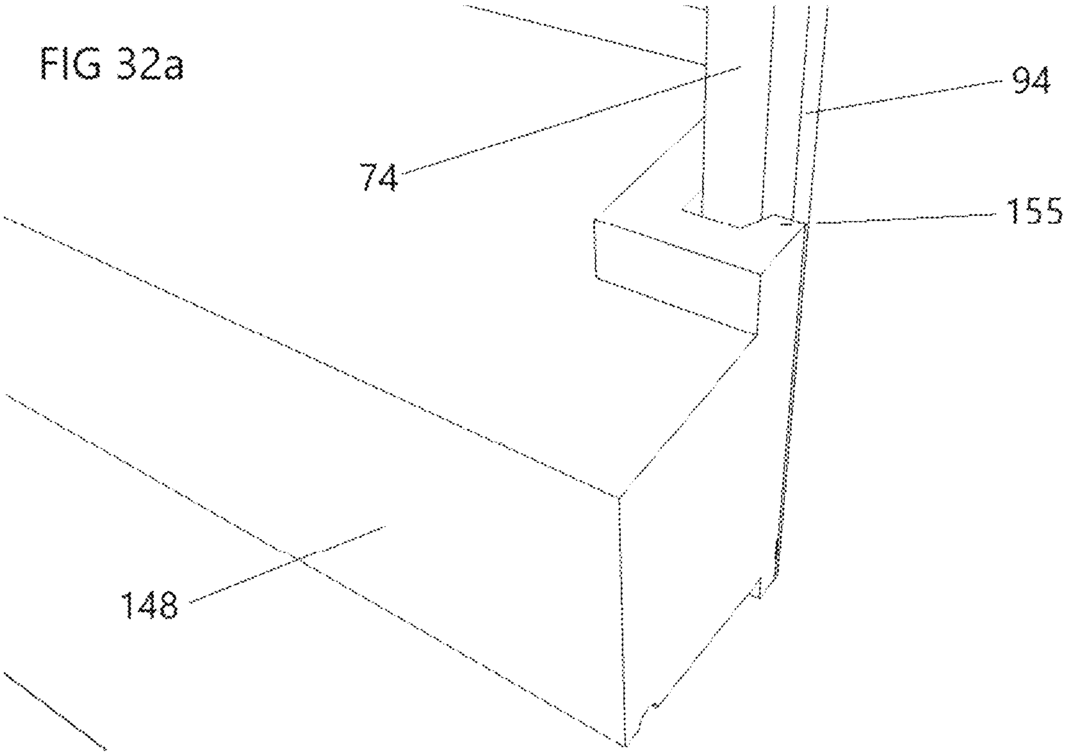
FIG. 32*a* is a detail perspective view of a vertical connection between a window sill and external wall system.
Figure 32B:
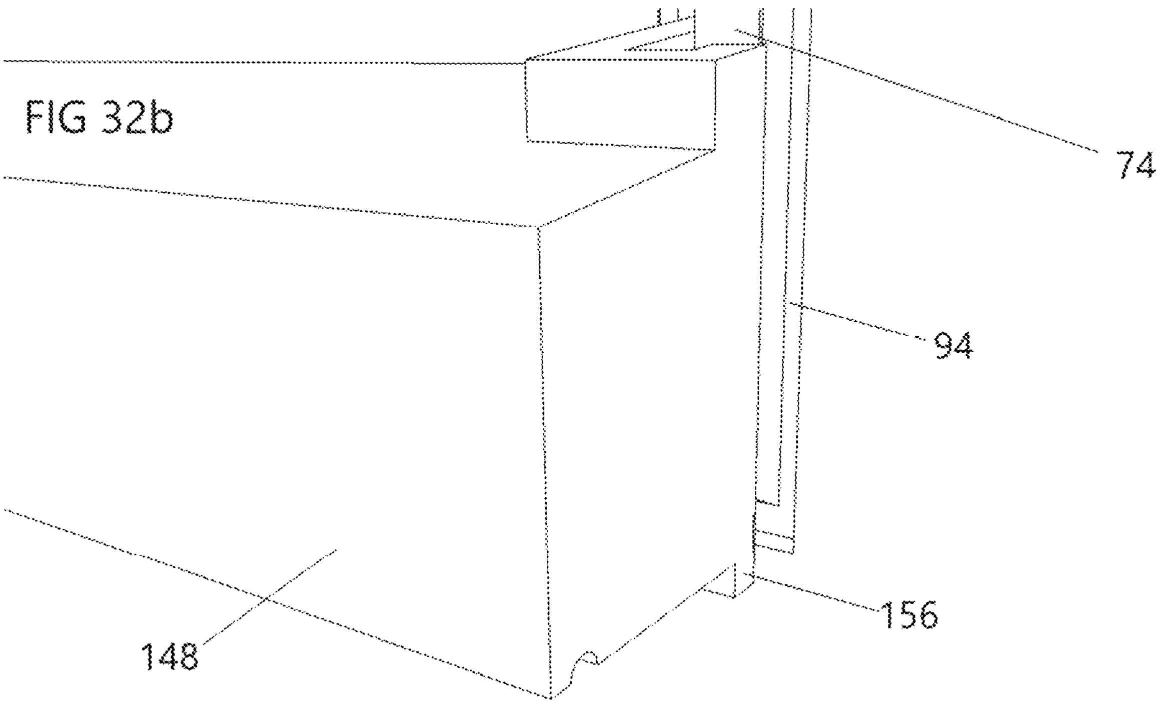
FIG. 32*b* is a detail perspective view of a horizontal connection between the window sill and external wall system.
Figure 33:
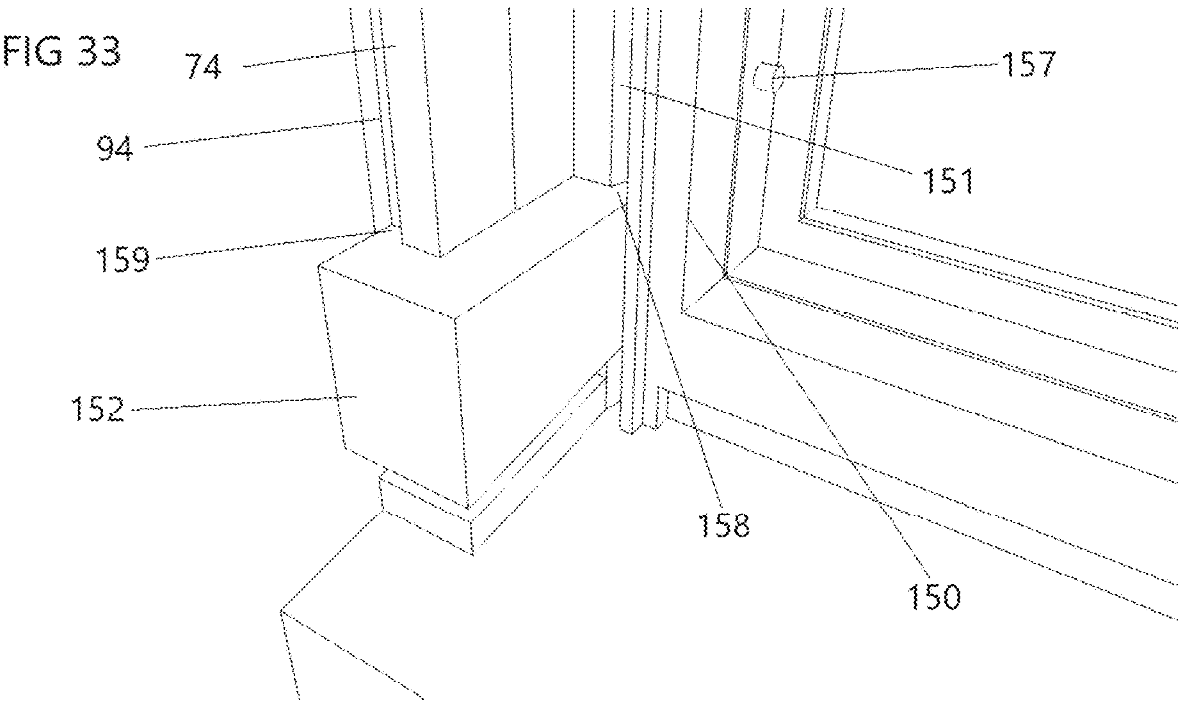
FIG. 33 is a detail perspective view of an external reveal connecting the subframe and external wall system.
Figure 34:
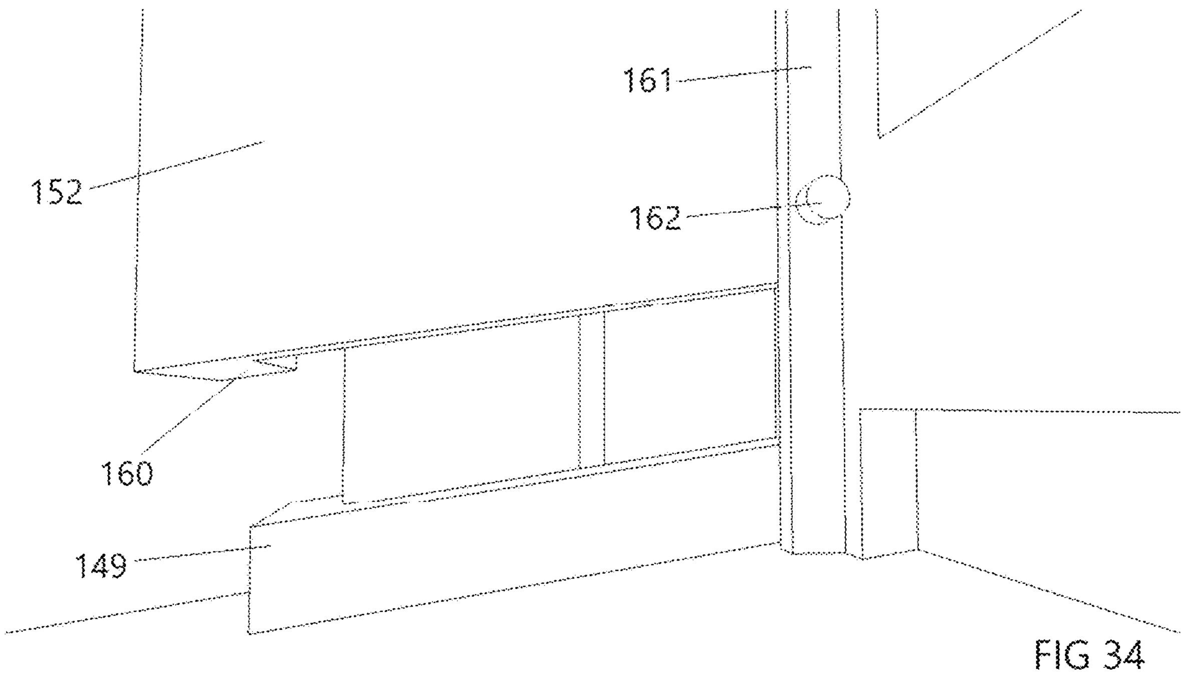
FIG. 34 is a detail perspective view of the external reveal overlapping an upstand on the window sill.

FIG. 32*a* shows how the assembled window subframe is placed in the window openings and a tongue 155 on the passive sill 148 sits into the recess 94 on the external wall panel 74 which provides a vertical seal between the passive sill and the external wall panel. FIG. 32*b* shows a tongue 156 on the lower part of the sill 148 which also sits into a recess 94 on the external wall panel 74 which provides a horizontal seal between the underneath of the passive sill and the external wall panel. FIG. 33 shows the window subframe is fixed to the steel frame profile by a fixing 157. When the window subframe is fixed in the opening, the external passive reveal 152 is fitted to the front sub-frame. The external passive reveal 152 has an engagement portion 158 which sits into the recess 151 on the front subframe 150 and the passive reveal 152 has a further engagement portion 159 which sits into the recess 94 on the external wall panel 74 creating a watertight seal therebetween. FIG. 34 shows the external passive reveal 152 has a further tongue feature 160 which sits down over the up stand 149 on the passive sill thus creating a watertight seal therebetween. The external passive reveal 152 is fixed through a ledge 161 on the subframe by fixing 162.

Figure 35:
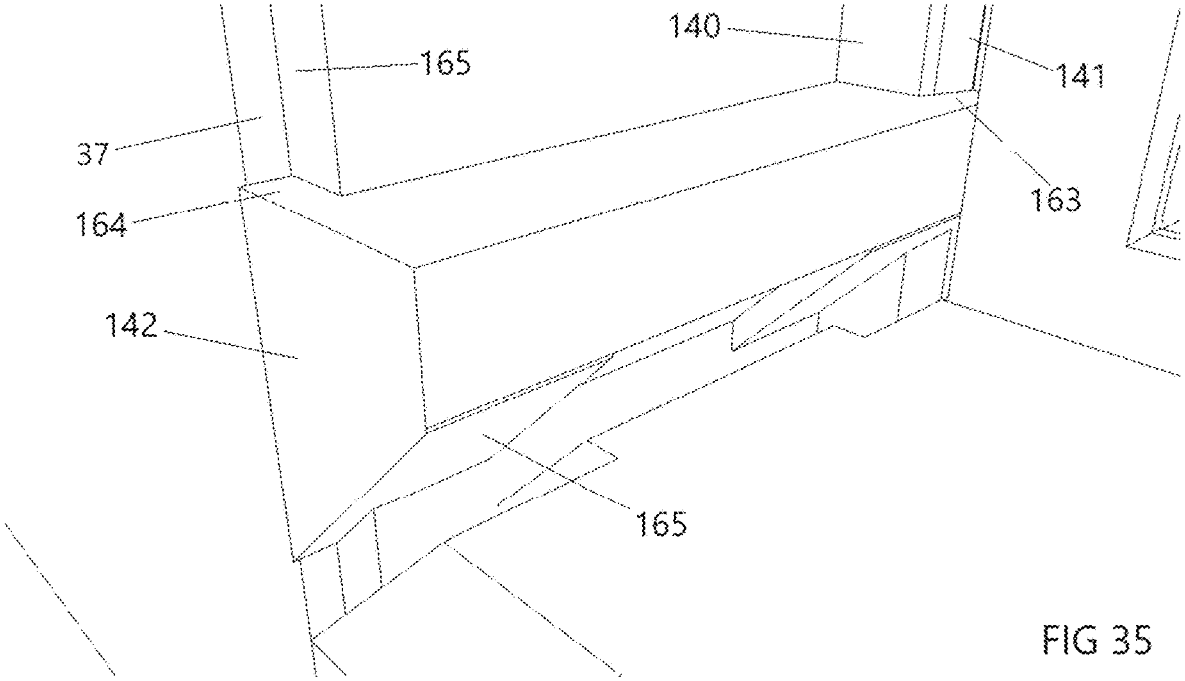
FIG. 35 is a detail perspective view of the internal reveal connecting the window subframe and internal thermal enclosure.
Figure 36:
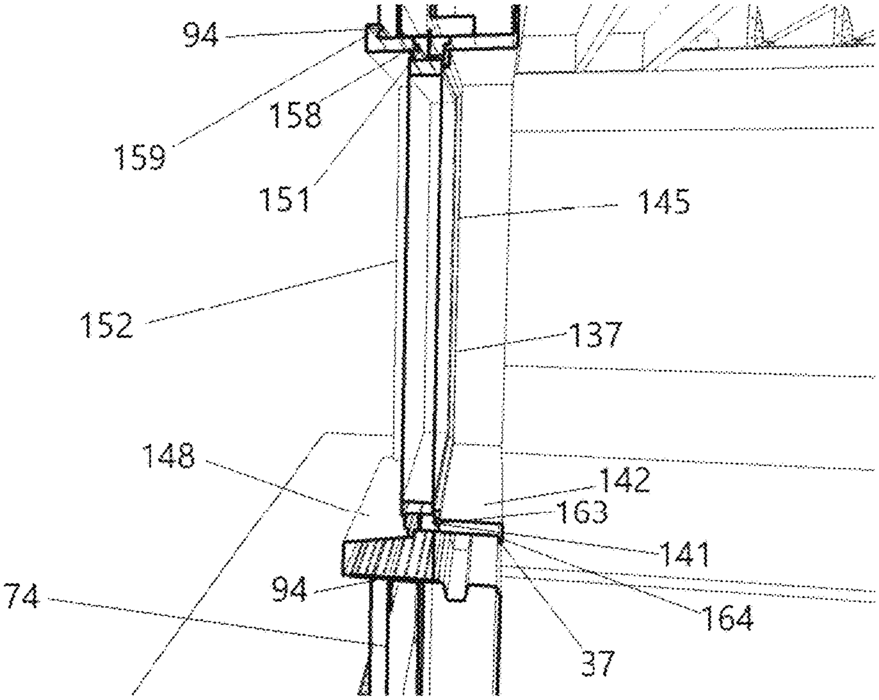
FIG. 36 is a detail perspective view of a window in the external wall system.

FIG. 35 shows the internal passive reveal 142 fitted to the rear part of the subframe 140. A tongue 163 on the internal passive reveal 142 sits into the recess 141 on the rear subframe and a further overlap on the reveal 164 sits into the recess on the thermal wall panels 37. The corners of the internal reveal are mitred in a manner that when sealed with polymer adhesive 165 assists in preventing air leakage from the house. The internal reveal system is fixed to the wall panel by polymer adhesive 165 creating an airtight seal therebetween. FIG. 36 refers to the window subframe system and shows how the subframe system ensures the airtight thermal enclosure is maintained where windows are fitted. The assembled subframes 137 are installed in the window openings and the fitting of internal reveals 142 around the perimeter of the subframe prevents air leakage from the habitable area of the house. The internal reveals have a tongue 163 that compresses tightly into a recess 141 on the rear subframe and the outer part of the reveal has an overlap 164 that sits down over a sealed recess 37 on the internal wall panels. The sill 148 attached to the subframe sits into a recess 94 on the external wall panels which prevents water ingress at sill level. The fitting of external reveals 152 to the subframe further prevents water ingress around the openings as the reveals have an engagement portion 158 that compresses tightly into a recess 151 on the front subframe and the reveal has a further engagement portion 159 that sits into a recess 94 on the external wall panel 74. The subframe 137 contains rubber seals 145 that prevent air-leakage after the window is fitted and the window itself provides a continuation of the thermal enclosure.

Figure 37:
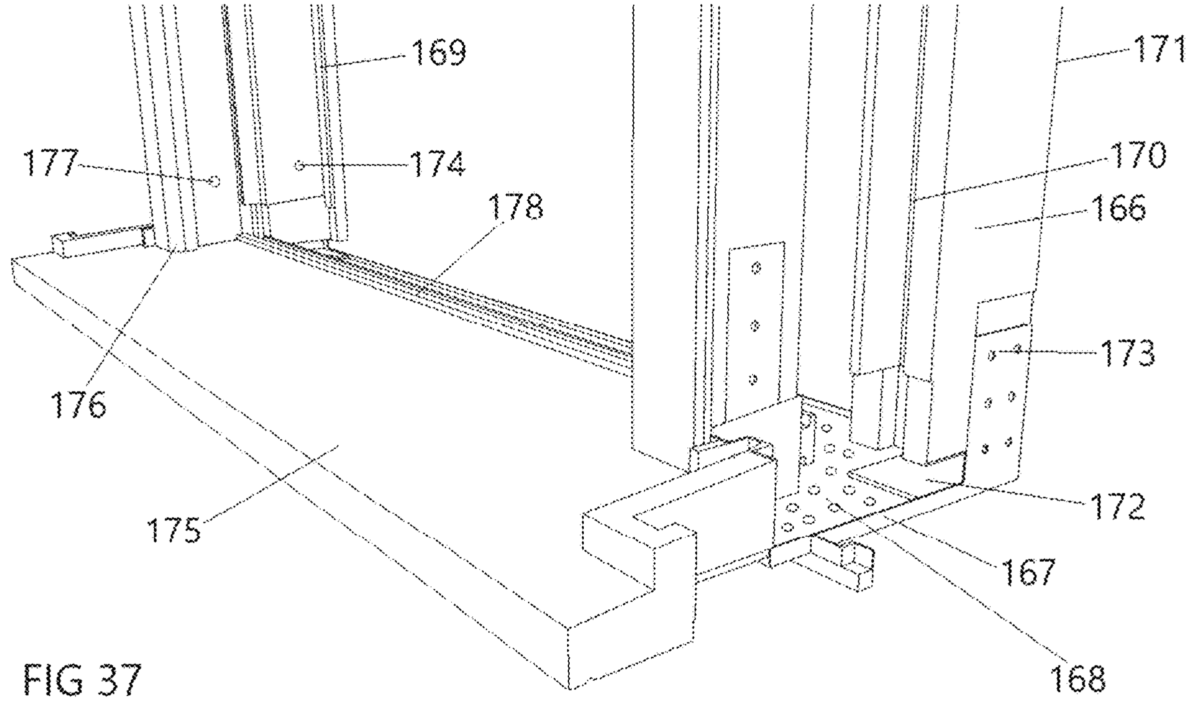
FIG. 37 is a detail perspective view of a door subframe.
Figure 38A:
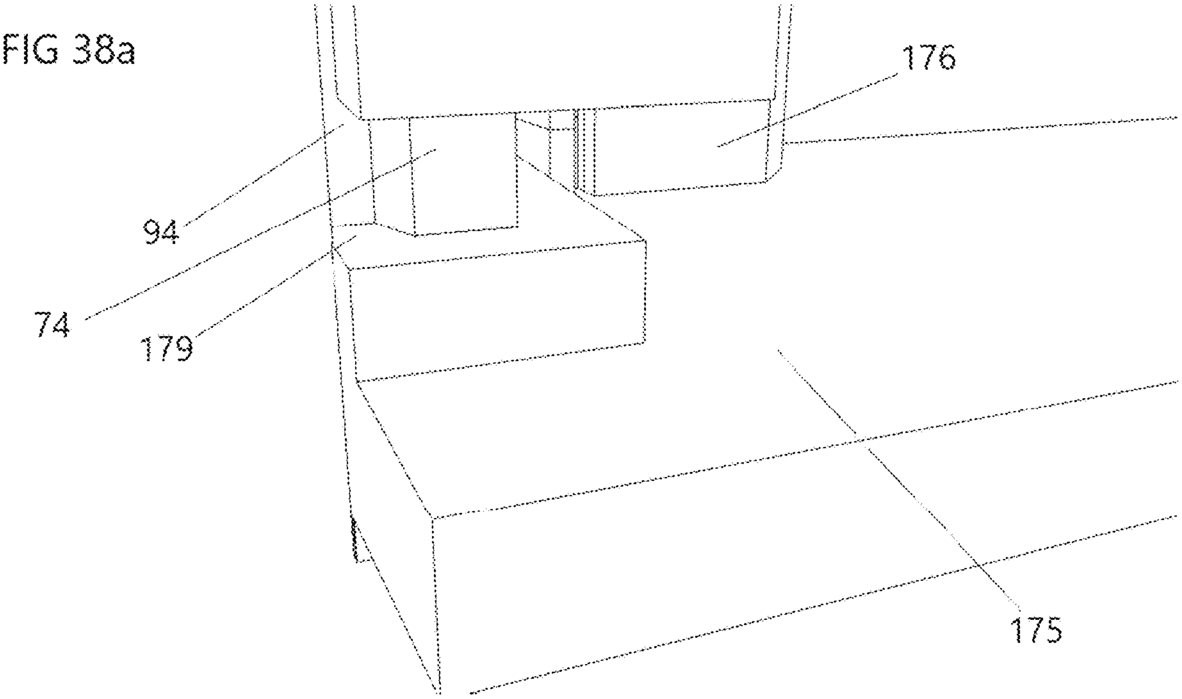
FIG. 38*a* is a detail perspective view of the vertical connection between the door sill and the external wall system according to the invention.
Figure 38B:
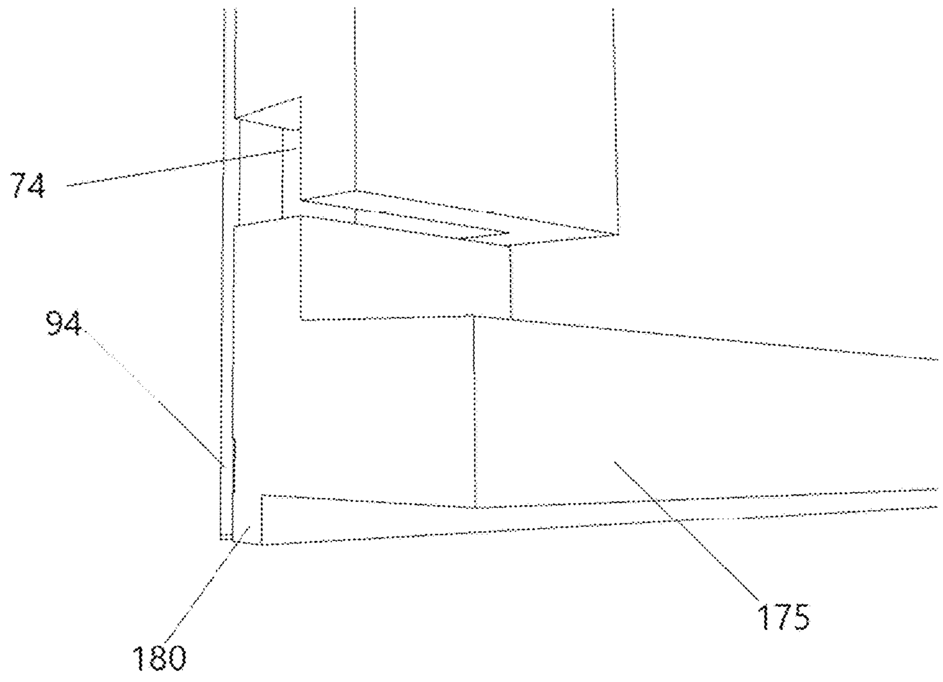
FIG. 38*b* is a detail perspective view of a horizontal connection between a door sill and the external wall system.
Figure 39A:
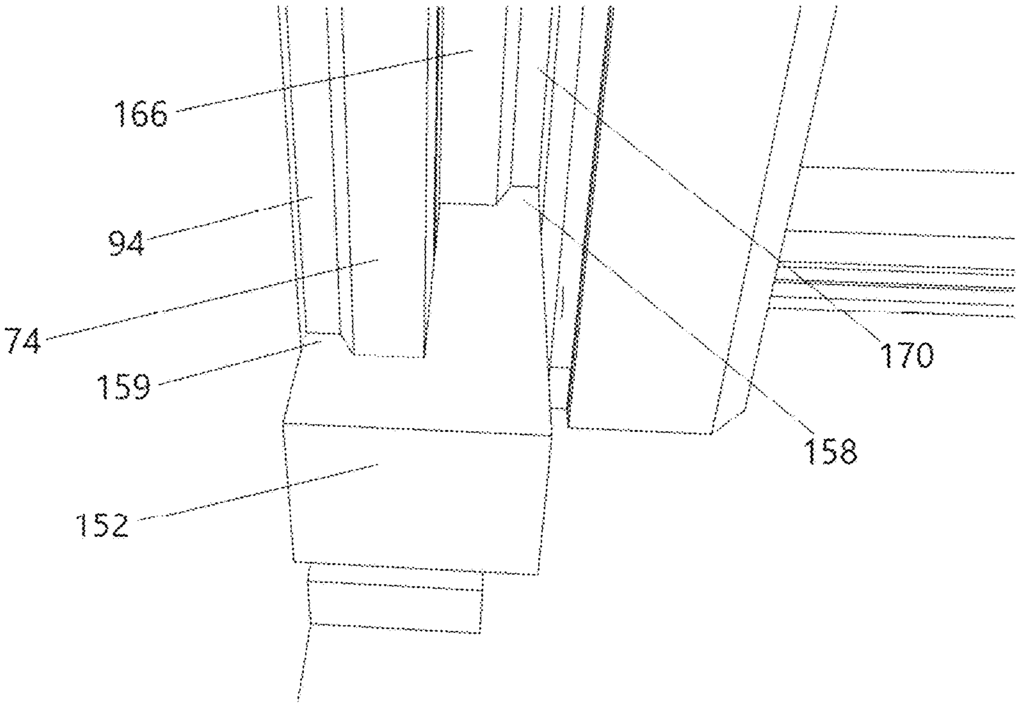
FIG. 39*a* is a detail perspective view of an external reveal connecting the door subframe and external wall system.
Figure 39B:
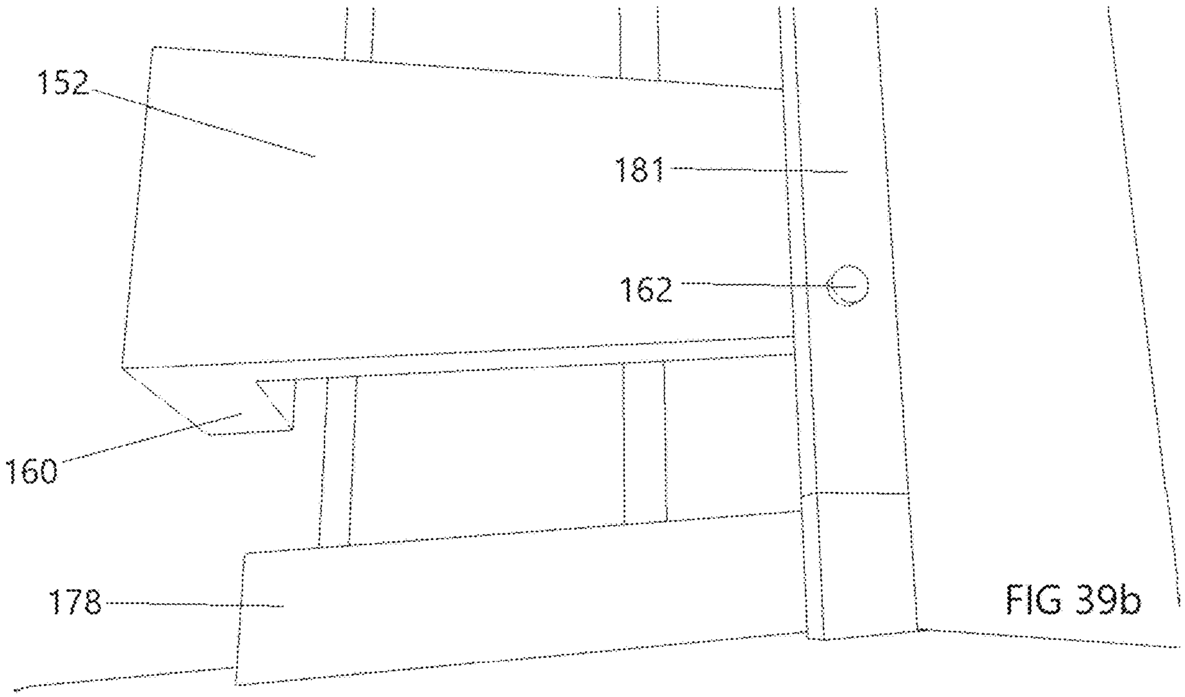
FIG. 39*b* is a detail perspective view of an external reveal overlapping an upstand on the door sill.

FIG. 37 shows the door subframe 166 consisting of a base-tray 167 which collects any condensation or water ingress that could enter the subframe. Any such water is discharged through the outlets 168. The sub frame 166 has a rubber seal 169 to accommodate the sealing of a door frame later. The rubber seal 169 ensures proper air tightness between the door frame and the door subframe 166. The sub frame 166 has a recess 170 at the front to facilitate the fitting of an external passive reveal and a recess 171 on the rear subframe to facilitate the fitting of an internal passive reveal. The door subframe is placed on a rubber pad 172 in the base tray 167 and the door subframe is secured to the base tray by fixing 173. The door sub-frame is fixed to the steel profile in the main steel frame by fixing 174. A steel sill 175 is fitted to the door frame 176. The steel sill and door frame are secured to the sub frame by fixings 177. The steel sill contains an upstand 178 to prevent water ingress from the outside. FIG. 38*a* shows that when the door frame 176 and steel sill 175 are fitted to the subframe, a tongue on the sill 179 sits into the recess 94 on the external wall panel 74. FIG. 38*b* shows a tongue 180 on the lower part of the steel sill 175 which also sits into a recess 94 on the external wall panel 74 which provides a horizontal seal between the underneath of the door sill and the external wall section 37. FIG. 39*a* shows that when the door frame is fitted in the subframe, an external passive reveal 152 is fitted to the subframe. The passive reveal has an engagement portion 158 which sits into recess 170 on the front of the subframe 166 and the reveal has a further engagement portion 159 which sits into the recess 94 on the external wall panel 74 creating a watertight seal. FIG. 39*b* shows the external passive reveal 152 has a further tongue 160 feature which sits down over up stand 178 on the steel sill creating a watertight seal. The external passive reveal 152 is fixed through a ledge 181 on the subframe by fixing 162.

Figure 40:
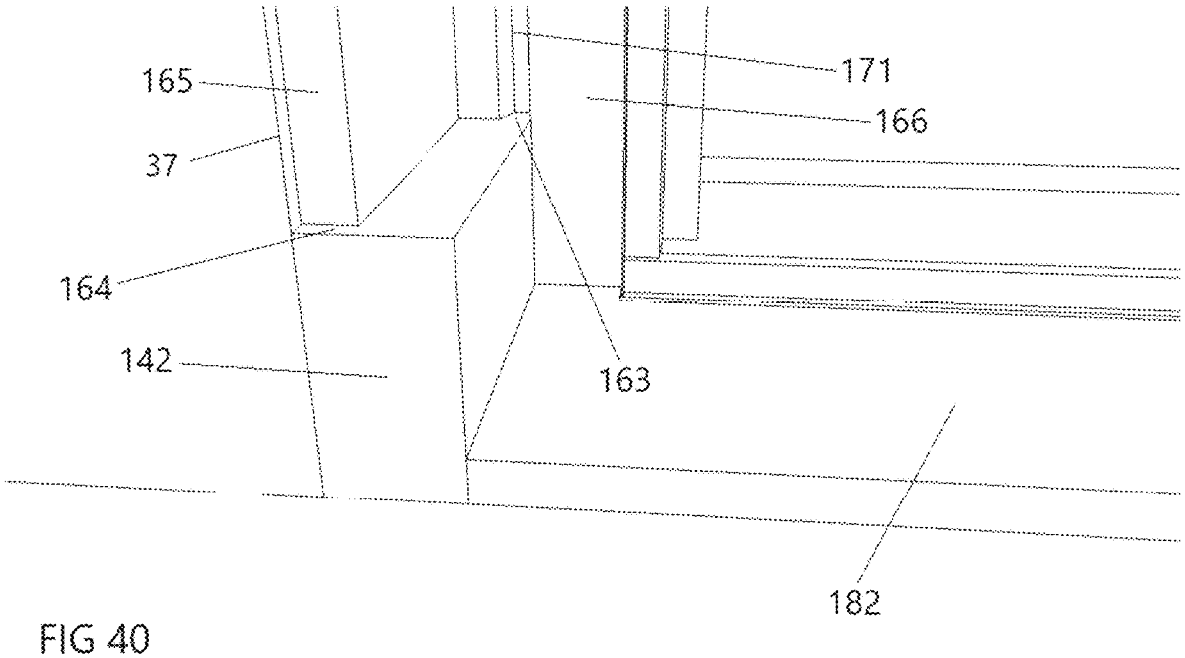
FIG. 40 is a detail perspective view of an internal reveal connecting the door subframe and a thermal wall panel.
Figure 41:
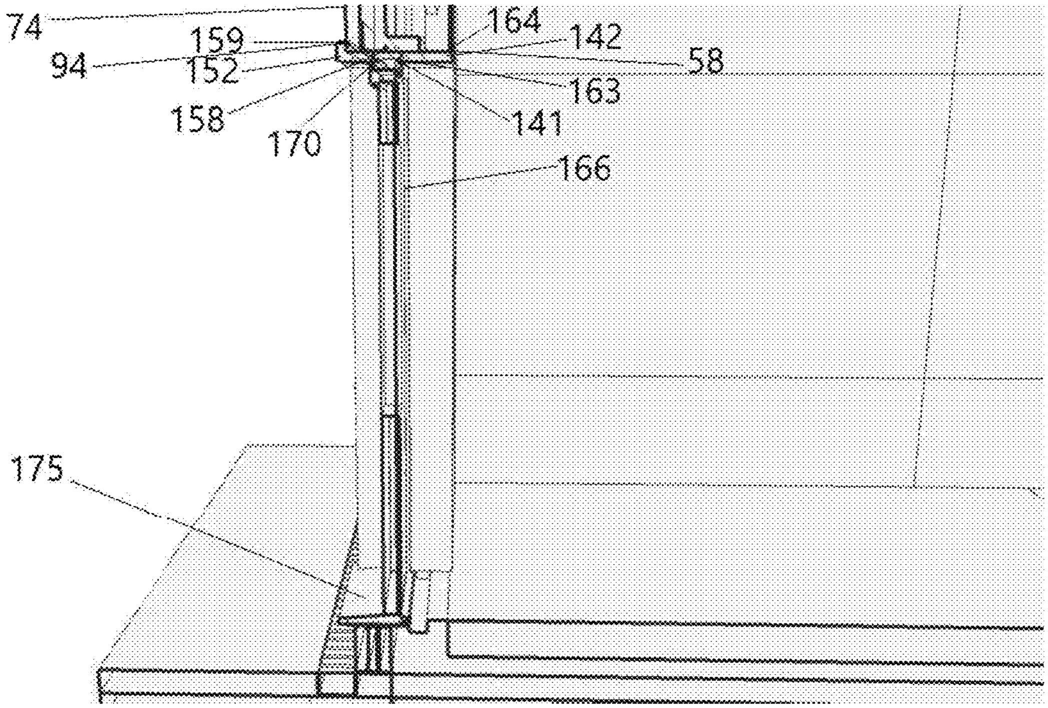
FIG. 41 is a detail perspective view of a door in the external wall section.

FIG. 40 shows an insulated door saddle 182. The internal passive reveal 142 is fitted to the subframe and internal thermal enclosure. A tongue 163 on the internal passive reveal 142 sits into the recess 171 on the subframe 166 and a further overlap 164 on the internal passive reveal 142 sits into the recess on the internal thermal wall panel. The internal passive reveal is fixed to the internal thermal wall panel by polymer adhesive 165 creating an airtight seal. FIG. 41 refers to the door subframe system and shows how the subframe system ensures the airtight thermal enclosure is maintained where doors are fitted. The subframe 166 is installed in the door openings and the fitting of internal reveals 142 around the perimeter of the subframe prevents air leakage from the habitable area of the house. The internal reveals have a tongue 163 that compresses tightly into a recess 141 at the rear of the subframe and the outer part of the reveal has an overlap 164 that sits over a sealed recess 58 on the internal wall panels. The steel sill 175 attached to the main door frame sits into a recess 94 on the external wall panels which prevents water ingress at sill level. As is seen in FIG. 41, the fitting of external reveals 152 to the subframe further prevents water ingress around the openings as the engagement first portion 158 compresses tightly into the recess 170 at the front of the subframe and second engagement portion 159 sits into a recess 94 on the external wall section 74. The subframe 166 contains rubber seals 169 that prevent air-leakage after the door is fitted and the door its self provides a continuation of the thermal enclosure. Advantageously, the window and door subframe system provides a formal process for sealing window and door openings prior to the fitting of the windows and doors. Advantageously, the subframe system contains all the components required to seal the openings and provide a secure framework in which to subsequently fit the windows and doors. The subframe components advantageously include the sills and the internal and external reveals, and their design prevents any water ingress from the outside and prevent air leakage from the inside. The subframe system facilitates the subsequent replacement of new windows and doors without having to damage the external reveals. The subframe system advantageously provides for the easy removal of the external reveals and sills which facilitate the removal of the external walls. One known method to prevent water ingress is the placing of a damp-proof course (DPC) in the cavity around window and door openings which aims is to stop water entering the building. As a further protection a (DPC) is placed under the window and door sills to collect any water that may enter the building. This process is time consuming and prone to inconsistencies as the fitting of the DPC is dependent on a skilled person carrying out the process in a diligent manner. Various other processes and methods are used for preventing water ingress in and around door and window openings, however these processes are dependent on the use of pumped mastic or other such fillers/sealants to seal the various external joints. This process is time consuming and expensive and the proper application of the filler/sealant substance is prone to inconsistencies and is dependent on the skill level of the person carrying out the installation. Furthermore, there is a high risk that the filler/sealant will become loose in the various joints as a result of weathering and natural movement in the actual joints, which would allow water ingress into the building through the unsealed joints.

Figure 42A:
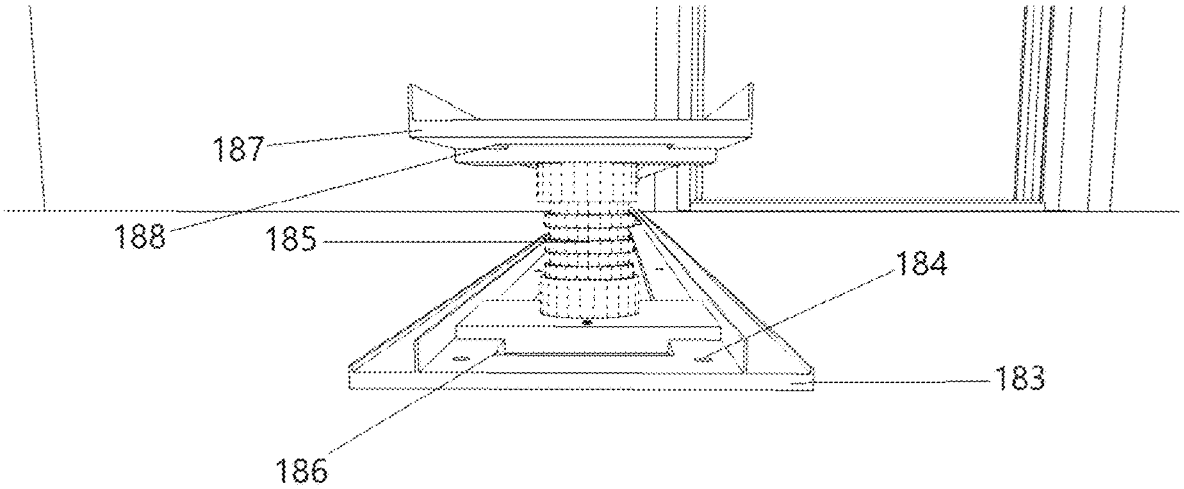
FIG. 42*a* is a detail perspective view of a floor bracket for holding internal walls in place.
Figure 42B:
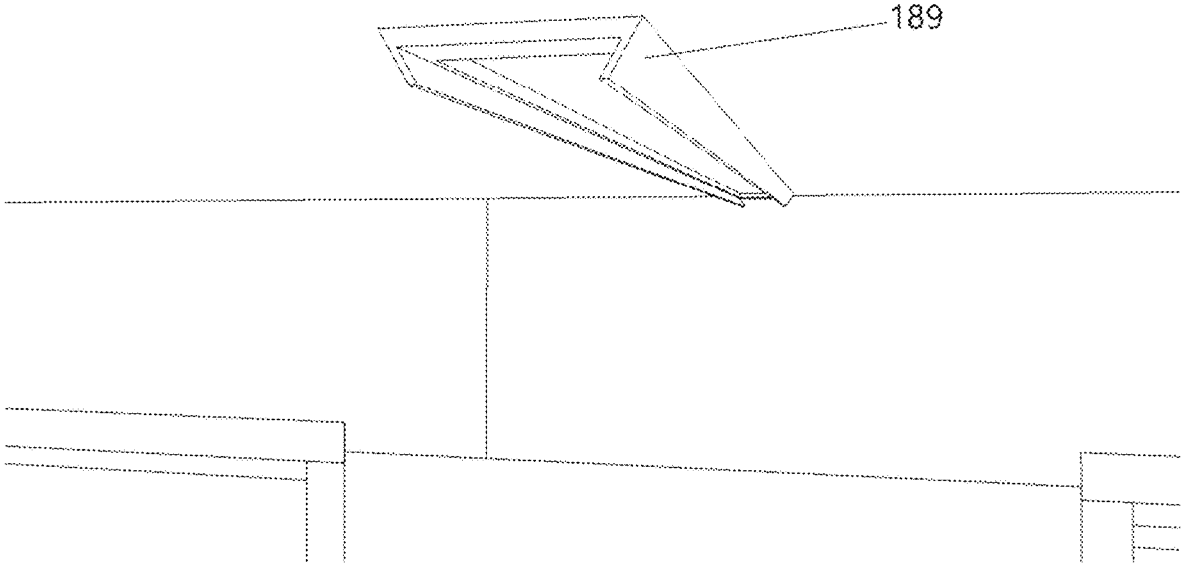
FIG. 42*b* is a detail perspective view of a ceiling bracket for holding internal wall panels in place.
Figure 42C:
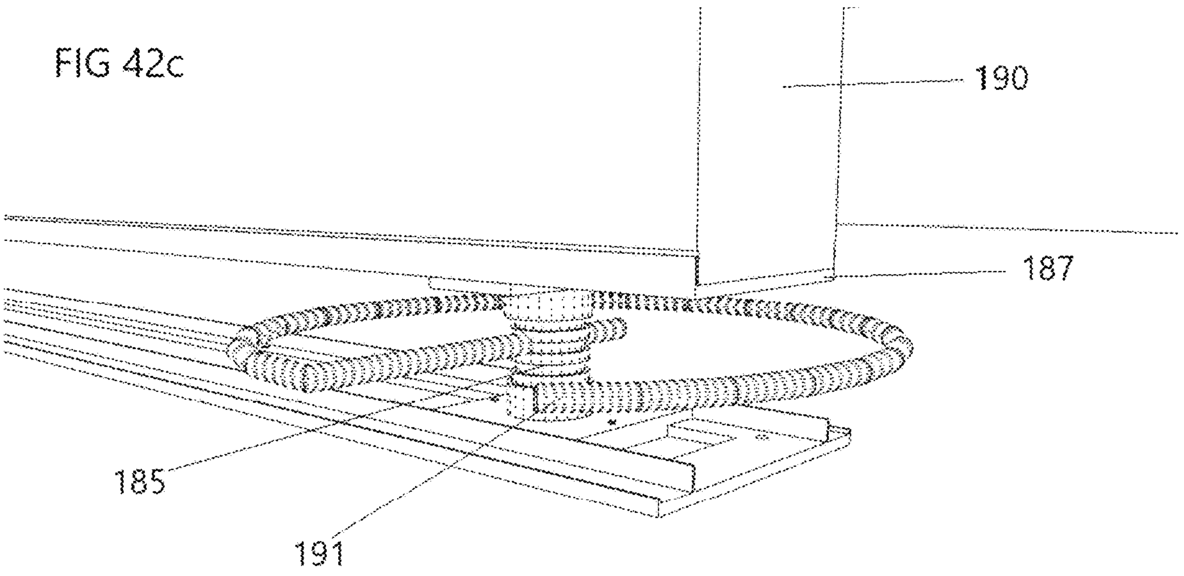
FIG. 42*c* is a perspective view of circular wrench that tightens the internal wall panels in position.
Figure 42D:
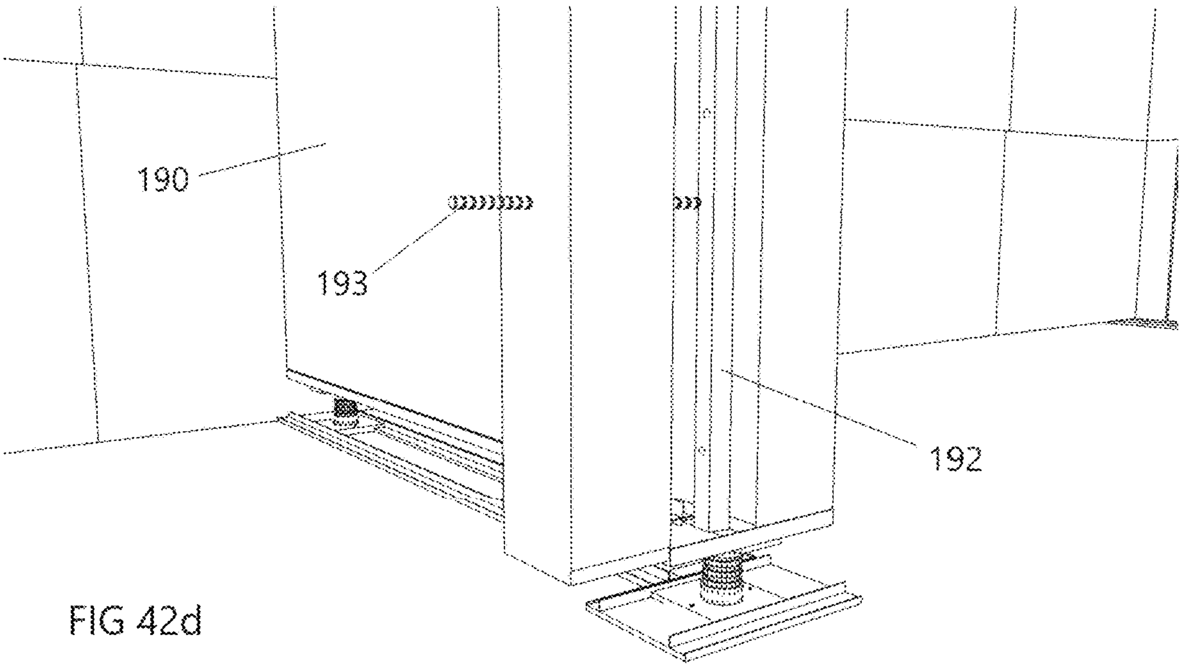
FIG. 42*d* is a perspective view of a rod mechanism that secures the corners of the internal wall panels.
Figure 42E:
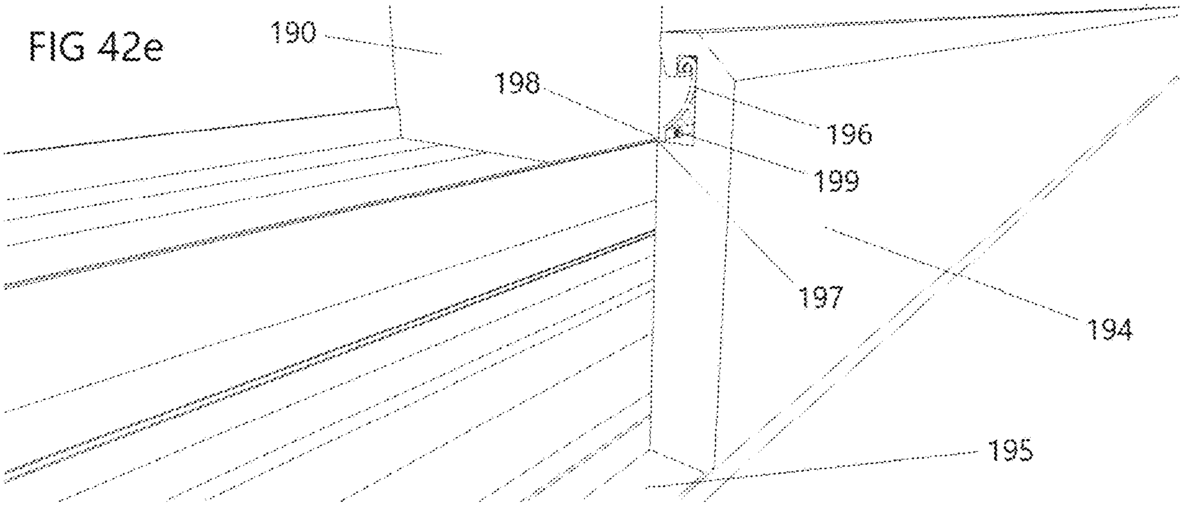
FIG. 42*e* is a detail perspective view of attachment of skirting boards to the internal wall panels.
Figure 42F:
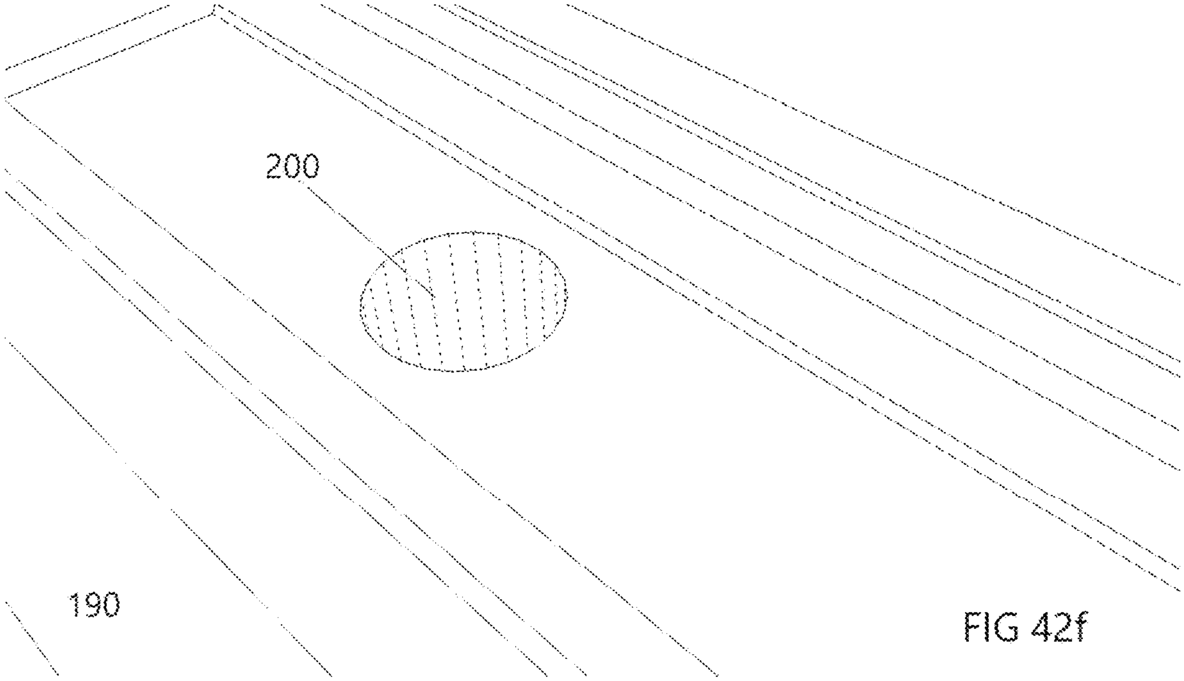
FIG. 42*f* is a perspective view of a service duct in the internal wall panel.

As can be seen in FIGS. 42*a* to 42*f*, the house comprises an internal wall apparatus for a building comprising at least one internal wall panel 190 retainable at an upper end by an associated first internal wall bracket 189 and at a lower end by an associated second internal wall second bracket 183. The second bracket accommodates adjustable components such that they may be selectably raised and/or lowered. The internal wall panel 190 may be raised such that it contacts and is engageable with the first internal wall bracket. The building comprises skirting boards 194 attachable to the internal wall panels 190, the skirting boards 194 comprising an upper recess for engagement with a spring clip 196 attachable to the internal wall panel 190. The skirting board is also slidably engageable with the second bracket 183 of the internal wall panel. The first bracket is a ceiling bracket 189 and the second bracket is a floor bracket 183. The spring clip 196 spring draws the skirting board 194 towards the internal wall panel 190. The internal wall panels 190 come in different widths. In the embodiment of the drawings, the internal wall panels 190 are preferably 100 mm in thickness and are made from any suitable materials known in the art. The internal walls are held in place by the components 183, 185, 187 and ceiling bracket 189. The floor bracket 183 is fitted to the floor and secured by fixing screws 184. An adjustable nut bracket 185 is fitted into a recess 186 in the floor bracket 183 and a wall panel support tray 187 is then fitted on top of the adjustable nut bracket 185 and sits into recess 188 in the wall panel support tray 187. FIG. 42*b* shows a ceiling bracket 189 is then fitted to the ceiling to hold the wall Panels 190. FIG. 42*c* shows the wall panel 190 is then lifted on to the wall panel support tray 187 and the adjustable nut bracket 185 is adjusted upwards by using a circular wrench 191 which raises the wall panel up tight to the ceiling bracket 189. FIG. 42*d* illustrates that, where the wall panels 190 are joined, a locking bracket 192 is fitted to one side of the wall panel and a corresponding recess is made to the panel being joined. In order to ensure a tight joint in the wall panels 190, a threaded rod 193 can be inserted through the panels at strategic locations. FIG. 42*e* shows how the skirting board 194 slides into a recess 195 on the floor bracket. As it slides into this recess 195, the spring clip 196 has a tongue 197 which fits into a recess 198 on the wall panel 190 and the spring clip 196 is secured to the wall panel by fixing 199. This spring clip 196 causes the skirting board to tighten in against the wall panel 190 thereby eliminating the need to have fixings inserted in the skirting board to hold it in place. FIG. 42*f* shows that the wall panels 190 will have pre-drilled holes 200 to accommodate service ducting. Resultantly, services can be installed when the wall panels 190 are being erected. Advantageously the internal wall system will come on site pre-cut and ready for easy assembly. Known systems do not provide such a streamlined system for residential housing where studding and slabbing is still the norm for the creation of internal walls, which is costly and time consuming. The wall panel support tray 187 and the spring clip 196 together provide a secure fixing arrangement for a skirting board without having to use nails, screws or glue. This arrangement also prevents any gaps that may appear between the top of the skirting board and the wall. A further advantage of this fixing arrangement for a skirting board is that this skirting board can be easily removed to provide for the easy removal of the walls and also for the provision of access to services within the wall panels. Known systems have the skirting board secured to the wall by intermittent nailing which can become visible and the top of the skirting board can move away from the wall leaving unsightly gaps.

Figure 43:
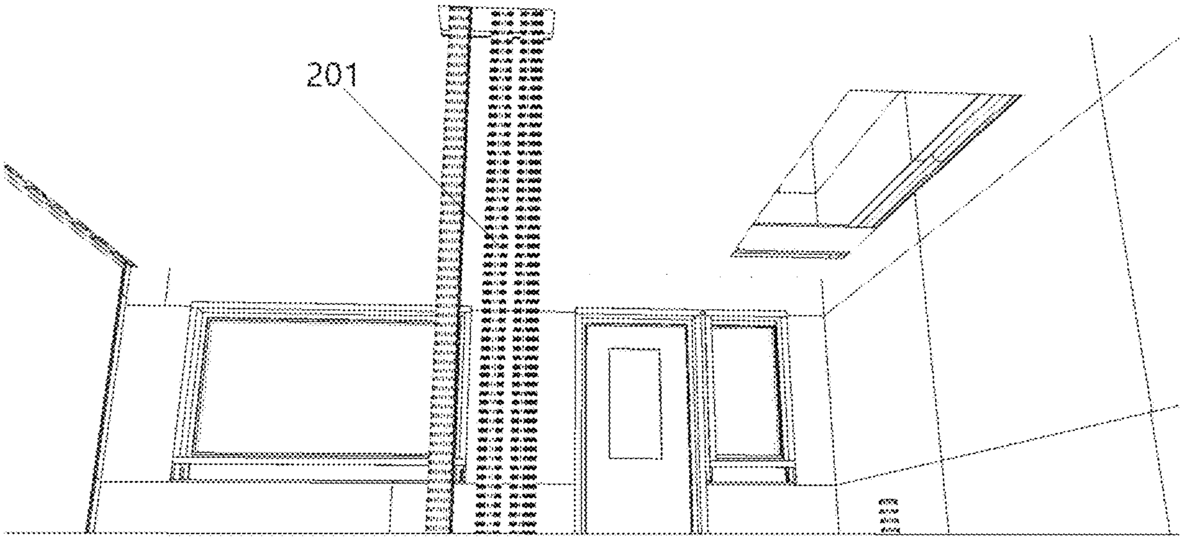
FIG. 43 is a perspective view of service pipework protruding upwards through the building.
Figure 44:
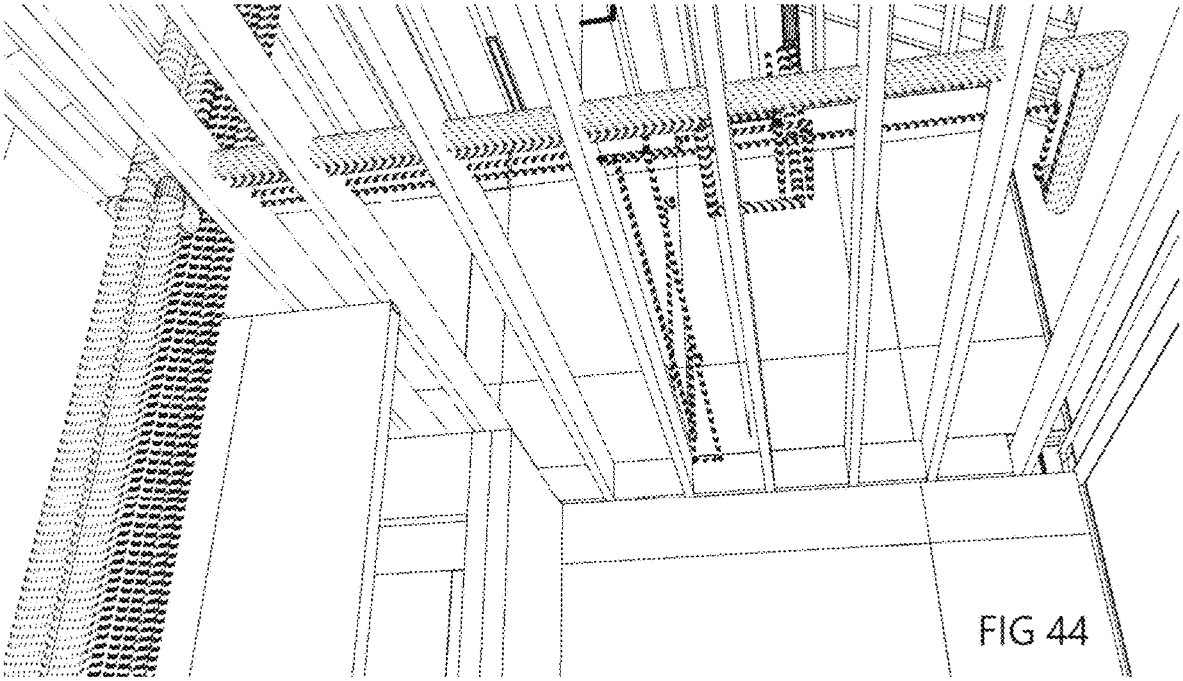
FIG. 44 is a perspective view of services being extended from a central supply to various rooms in the building.
Figure 45A:
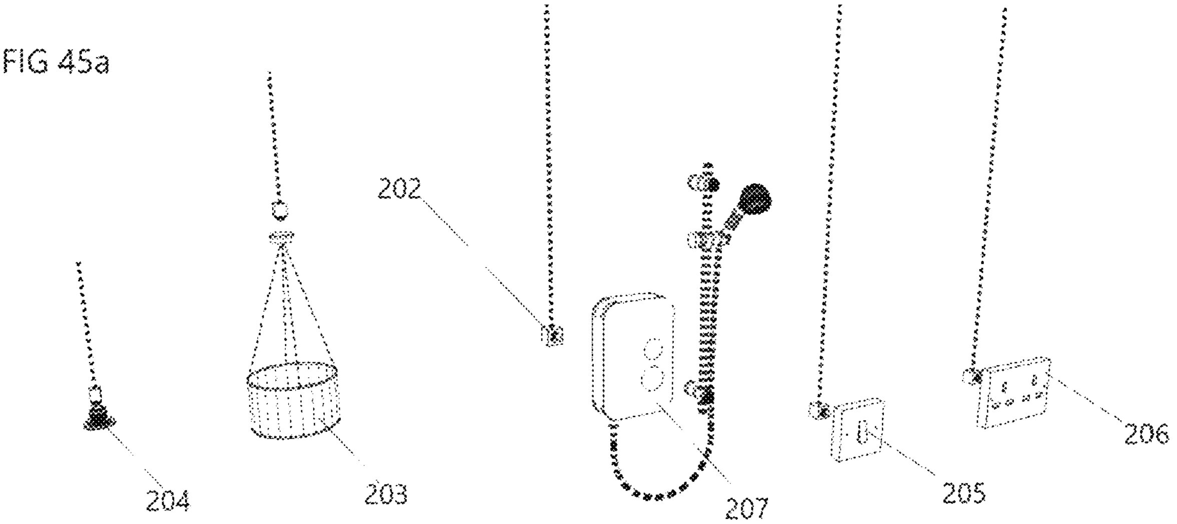
FIG. 45*a* is a perspective view of a plug and port system for connecting electrical appliances within the building.
Figure 45B:
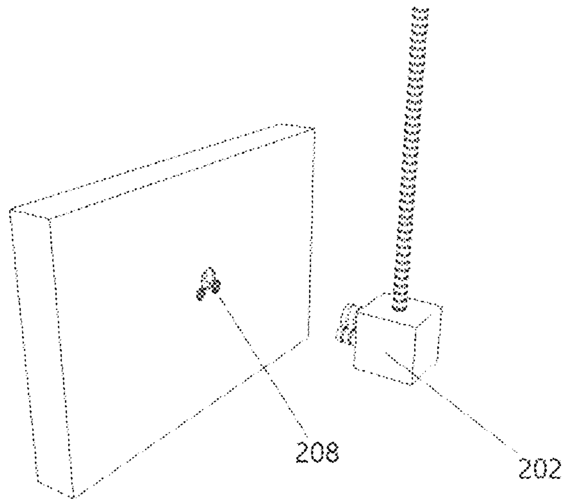
FIG. 45*b* is a perspective view of the plug and port system of FIG. 45*a* terminating at appliances.
Figure 46:
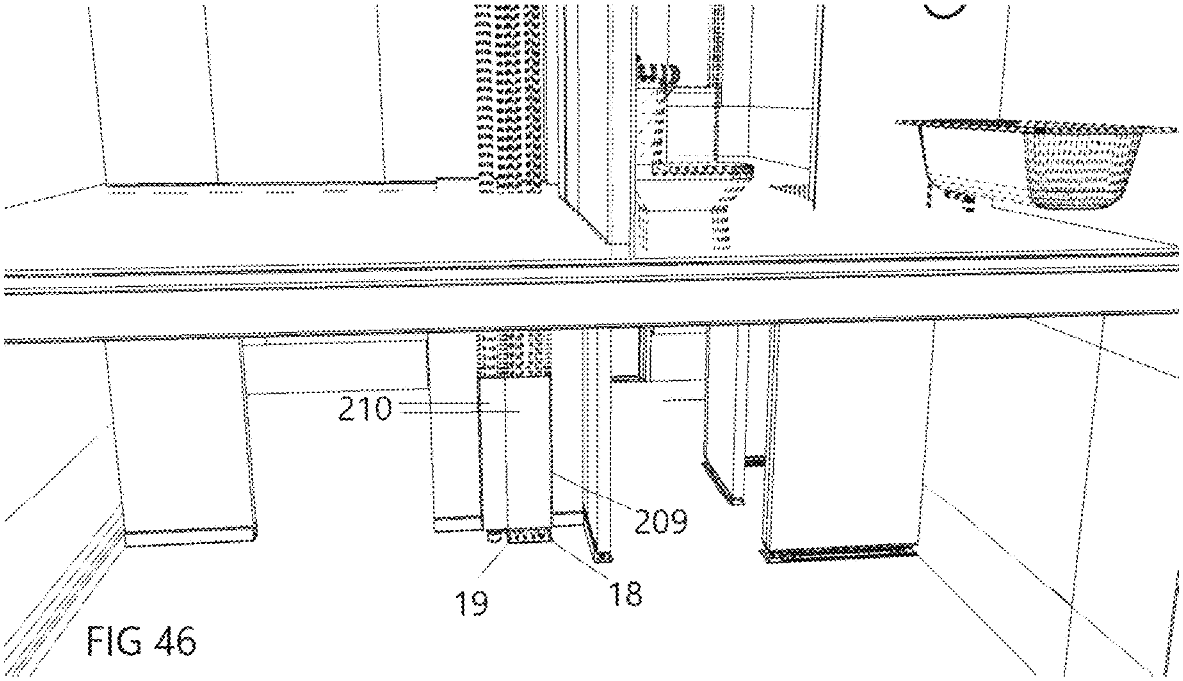
FIG. 46 is a detail perspective view of a ducting system that encases centralised service pipes.

FIG. 43 shows the installation of first fix mechanical and electrical infrastructure. The service pipes and ducting are extended from the superduct 18 at the ground floor up to the second floor of the house in a tightly arranged format 201. FIG. 44 shows that connections can be made at joist level to extend the relevant services to each room of the house. The service ducting for the mechanical services to each room consists of air extract and intake ducting, grey water/foul extracts and supply pipes, along with hot and cold-water supply pipes. FIG. 45*a* shows the electrical network is created by a series of cables that are pre-cut for a particular supply route and have pre-fitted plugs 202 which can be connected to ports in particular electrical components. The plug and port system eliminates the need for hardwiring inter alia ceiling lights 203, spotlights 204, switches 205, sockets 206 and electrical shower 207. FIG. 45*b* shows how each electrical component will have an inbuilt port 208 as an integrated part of the electrical component. The inbuilt port 208 is designed to take a corresponding pre-fitted plug 202 which is attached to the supply cable. The supply cable and pre-fitted plug 202 will terminate in a wall box and the relevant electrical component can be connected by simply inserting the pre-fitted plug 202 into the inbuilt port 208 at the back of the relevant electrical component and thereafter the electrical component can be placed in the wall box and secured by fixing screws. Advantageously this system provides a fast, safe and efficient method for the electrical installation in a building. Known systems typically require an electrician to strip the covering from three strands of wire and to insert and fix these strands to a particular electrical component. Furthermore, the traditional method creates a fire risk in that if the wire is over striped the wire is prone to breakage and may cause an electrical shock or a fire hazard, known as arcing. Additionally, if the stripped wire is overtightened it also becomes prone to breakage which again could cause arcing. FIG. 46 shows that as part of a second fixing of services, a ducting 209 is installed around the collective ducting and service pipes that extends from the ground floor to the second floor. This ducting 209 sits down into the recess 19 on the superduct 18 that was installed in the base. The ducting 209 is designed in a manner that allows panels 210 to be easily removed to provide access to the contained collection of ducts and service pipes. FIG. 47 shows the plant room 211 is positioned over the superduct 18 which was earlier installed in the base of the house. The plant room contains all the control equipment to operate the mechanical and electrical system for the house. The electrical meter cabinet 212 and telecommunications cabinet 213 is situated on the wall of the plant room 211 and a connecting cable is brought through the superduct 18 to a circuit board located in the house. The connecting cable has a pre-fitted plug on each end which connects to an inbuilt port in the meter and in the circuit board. The circuit board has a series of inbuilt ports which facilitate incoming pre-plugged cables. The service pipes in the superduct 18 are all connected to the relevant operating systems in the plantroom. A system test is carried out to ensure that all systems are operating to the required regulatory standards.

Figure 48:
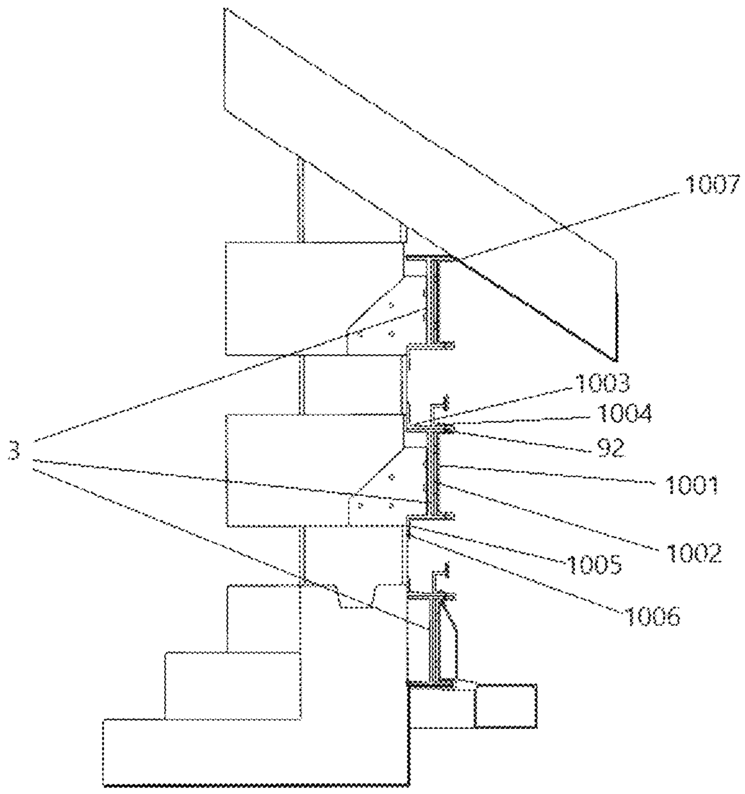
FIG. 48 is a sectional view showing a thermal sleeve located between horizontal beams of the main structural frame structure and the external walls.

In some embodiments, as best shown in FIG. 48, the addition of a Rolled Steel Joist (RSJ) thermal sleeve 1001 is provided to prevent any thermal bridging through the thermal enclosure. An RSJ simply refers to the individual beams which make-up the main steel frame structure 3. Typically, the RSJ thermal sleeve has a thermal foam 1002 fixed to the inside of the sleeve to eliminate residual air movement between the outer face of the RSJ and the inside of the RSJ thermal sleeve. The upper part of the RSJ thermal sleeve has an angled surface 1003 which directs condensation and water droplets to a drip hole 1004 which sits over the drip hole 92 in the RSJ flange. The RSJ thermal sleeve also has a perpendicular sealing strip 1005 at the top and bottom of the RSJ thermal sleeve to allow the sleeve to be fixed to the outer face of the thermal enclosure. The perpendicular sealing strips 1005 have an adhesive component 1006 covered with a protective covering and when the protective covering is stripped away, this creates an airtight seal between the sealing strip and the outer face of the thermal enclosure. A slightly modified RSJ thermal sleeve 1007 may be used at the floor, or directly underneath the roof, where the sleeve only extends to the upper flange of the RSJ.

Figure 49:
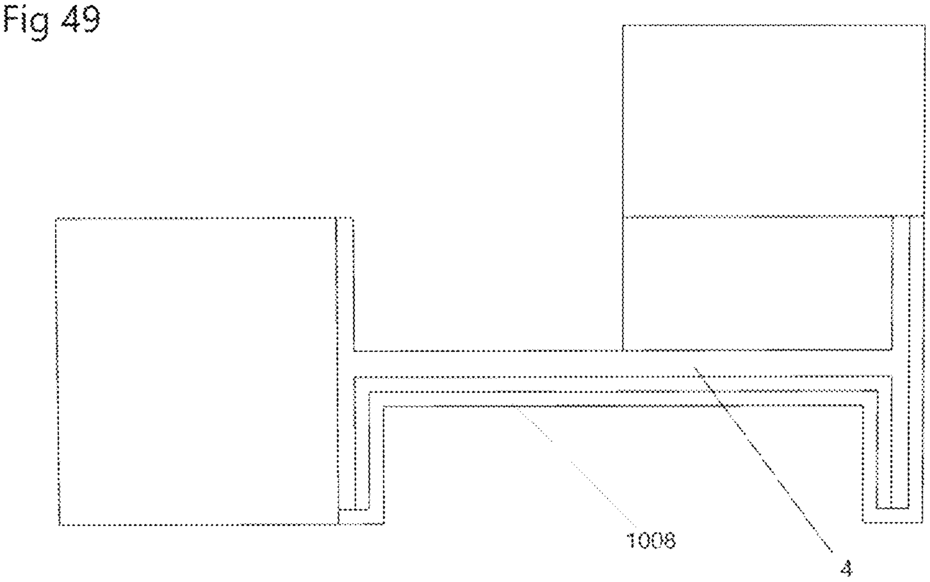
FIG. 49 is a sectional view showing a thermal sleeve located between vertical beams of the main structural frame structure and the external walls.
Figure 50:
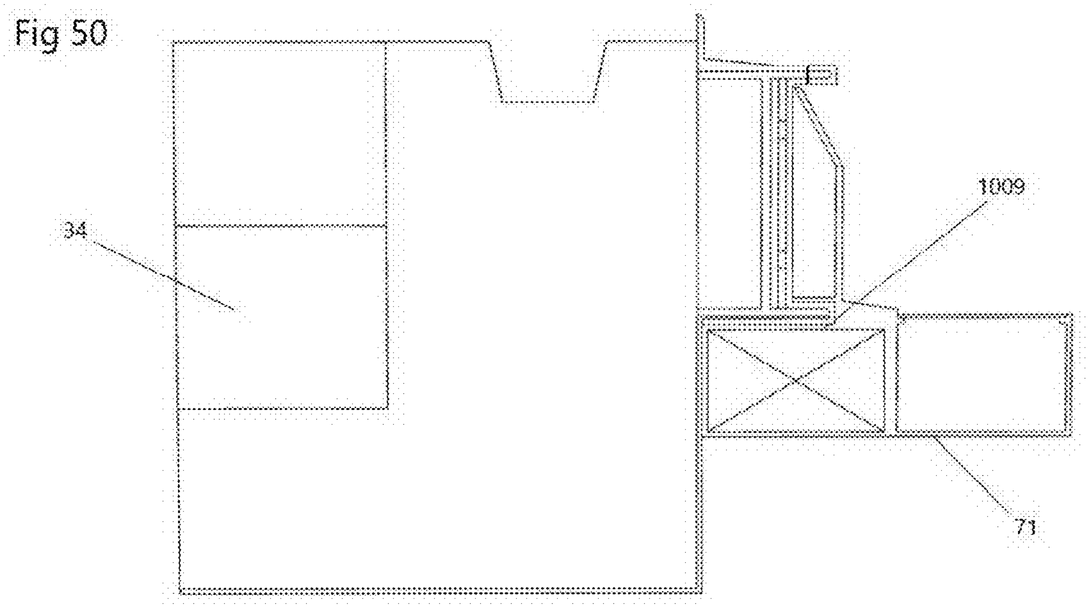
FIG. 50 is a sectional view of an alternative footpath gully tray.
Figure 51:
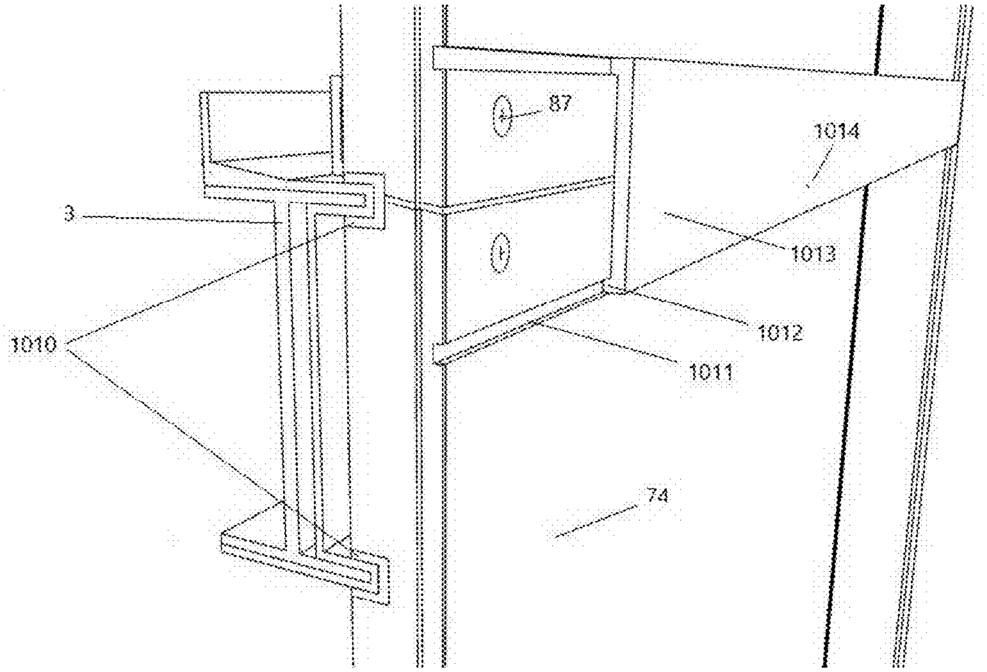
FIG. 51 is a perspective view of a connection between a horizontal beam of the main structural frame structure and an external wall.
Figure 52:
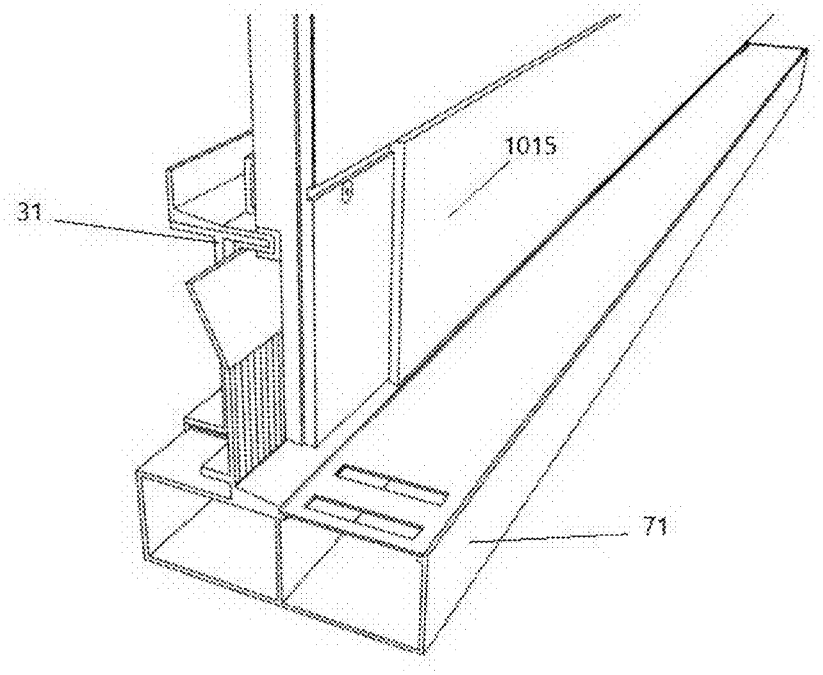
FIG. 52 is a perspective view of a connection between a lower horizontal beam of the main structural frame structure and an external wall.
Figure 53:
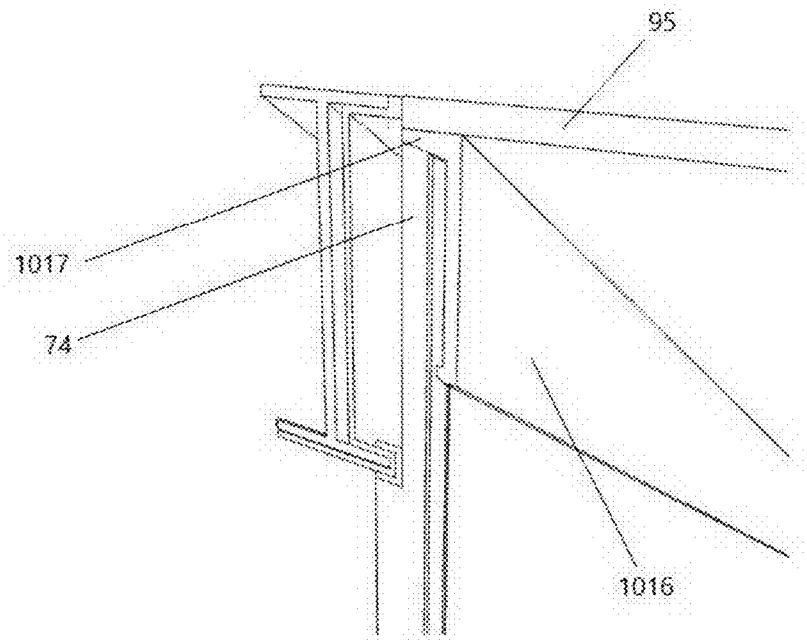
FIG. 53 is a perspective view of a connection between an upper diagonal beam of the main structural frame structure and an external wall and showing the integration of a board panel and a barge system.
Figure 54:
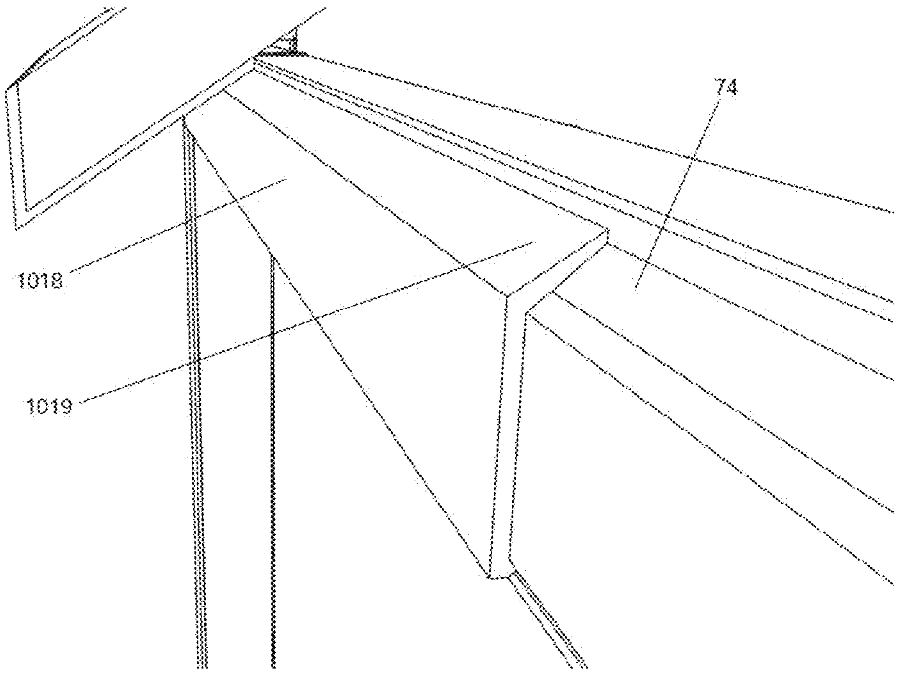
FIG. 54 is a perspective view of a connection between an upper horizontal beam of the main structural frame structure and an external wall and showing the integration of a board panel and soffit.
Figure 55:
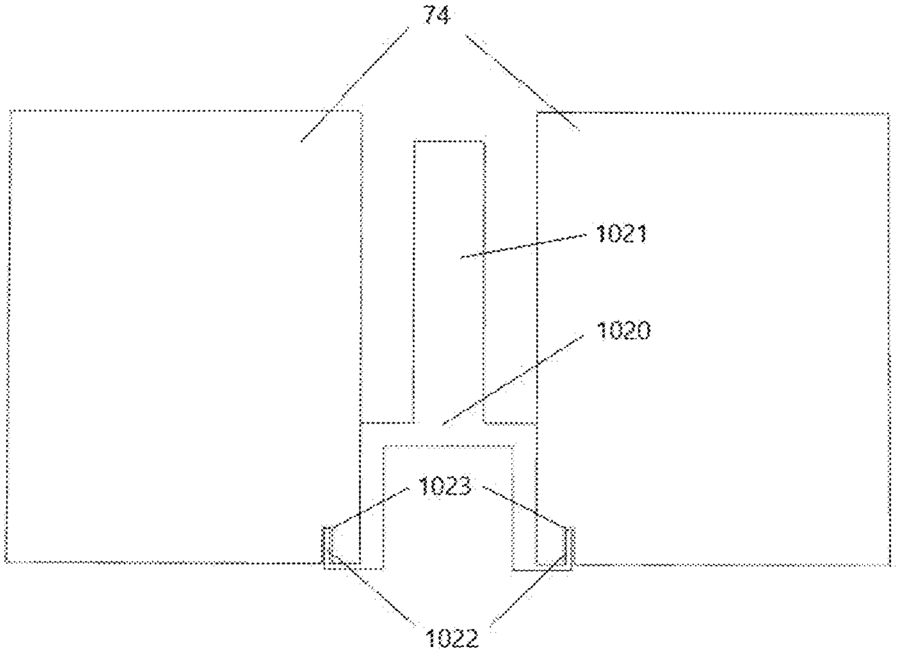
FIG. 55 is a side sectional view of an external wall panel jointing unit.

FIG. 49 shows a similar RSJ thermal sleeve 1008 which is fitted to the vertical RSJ uprights 4. FIG. 50 shows an alternative embodiment of the footpath gully tray 71, the purpose of which is to protect the outer face of the insulated base sections 34. This is achieved by extending a lower clasp 1009 on the footpath gully tray 71 to extend back towards the insulated base sections 34 and this clasp 1009 is continued in a perpendicular manner downwards, which therefore prevents rodents or insects from attacking the radon barrier and insulated base sections. FIG. 51 shows that, in some embodiments, the external wall system 74 comprises an airflow spacer 1010 fitted to the inside of the external wall panel to allow air circulate around a beam of the main steel frame structure 3. The external wall panel comprises a recess 1011 to accommodate a tongue 1012 on a panel band 1013 which, when fitted, covers the thermally efficient nut 87 and the joint between the upper and lower external wall panels. The panel band 1013 is held in position by the use of discrete screws 1014. FIG. 52 shows a panel band 1015 at the lower beam 31 that has similar features as the mid beam as shown in FIG. 51, except that there is no tongue on the lower part of the panel band, as the panel band sits close to the footpath gully tray 71. FIG. 53 illustrates that, in some embodiments, a board panel 1016 is provided at the barge system 95 which comprises the upper tongue 1017 extending over the top of the wall panel 74. The tongue 1017 is angled in a manner that when compressed between the top of the external wall panel and the underneath of the barge system 95, the angled tongue 1017 tightly seals the gap between the top of the external wall panel and a barge soffit thus preventing the risk of water ingress. FIG. 54 shows an embodiment wherein a board panel 1018 at a fascia soffit is provided which comprises the upper tongue 1019 extending over the top of the external wall panel 74. The tongue 1019 is angled in a manner that when compressed between the external wall panel and the underneath of the fascia soffit, the angled tongue 1019 tightly seals the gap between the top of the external wall panel and the fascia soffit thus preventing the risk of water ingress. FIG. 55 shows an external wall panel jointing unit 1020 which may optionally be employed to join the external wall panels 74 at various intervals. The jointing unit 1020 has a rubber nib 1021 to the rear which facilitates any expansion or contraction between the vertical joint where the external wall panels meet. The jointing unit has two tongues 1022 which slot into recesses 1023 close to the vertical edge of each external wall panel, thus creating a waterproof seal.

Figure 56:
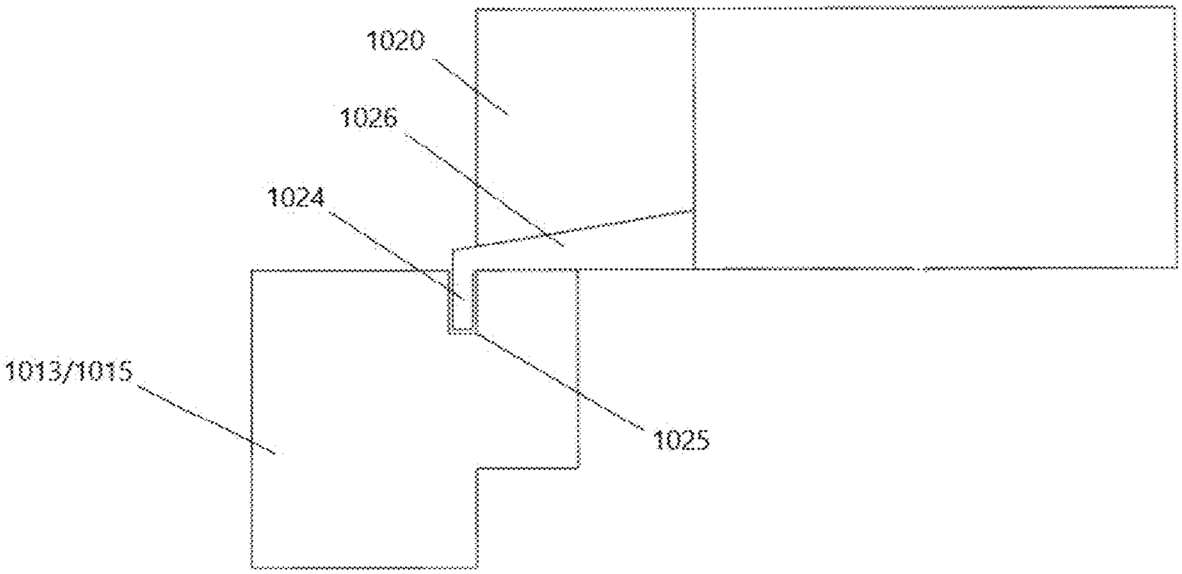
FIG. 56 is a vertical section cut through the wall panel joining unit of FIG. 55.

FIG. 56 shows a vertical section cut through the external wall panel joining unit 1020, which optionally comprises a tongue feature 1024 which sits into a recess 1025 on the upper ledge of the band panels 1013, 1015 and/or the top ledge of the external reveals which continues the waterproof seal at that point. Where the wall panel jointing 1020 unit sits on a panel board or reveal, the inner portion of the wall panel jointing unit has an angled base 1026 to direct water outwards. Advantageously, the panel bands conceal the exposed head of external wall panel thermally efficient nut, which panel boards can be easily removed allowing the external wall system to be demounted to facilitate upgrades, extensions, or inspections and maintenance of the thermal enclosure. The external wall panels and band panels have the capacity to cater for traditional and modern architectural features and finishes.

Figure 57:
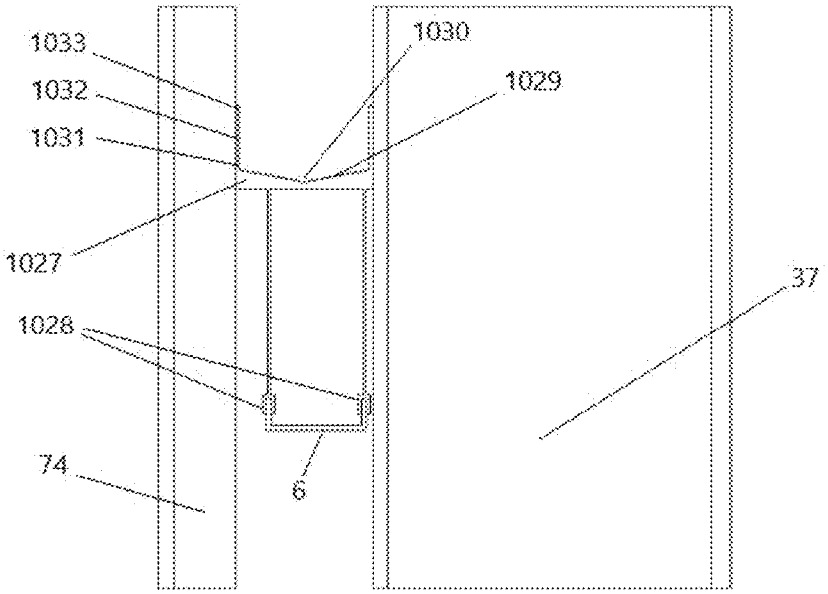
FIG. 57 is a side sectional view of a cavity closer installed in a cavity over window or door opening.

FIG. 57 shows a cavity closer 1027 which is installed in the cavity over window and door openings. The cavity closer has a dual function, firstly, it prevents condensation or water droplets from falling on the top of the window and door subframes and secondly, helps to prevent fire rising up the cavity area around window and door openings, as the tray extends past the openings by a minimum of 300 mm on each side. The cavity closer 1027 has two leg clasps 1028 which sit on the flanges of the steel profiles 6. The top surface of the cavity closer has a funnel like surface 1029 which allows any water droplets of condensation run down to a drain like feature 1030 which will distribute any water droplets of condensation to either side of the cavity closer 1027. The cavity closer has perpendicular sealing strips 1031 to allow the cavity closer to be sealed to the outer surface of the thermal wall panels 37 and the inner surface of the external wall panels 74. The perpendicular sealing strips 1031 have an adhesive component 1032 and when the protective covering 1033 is stripped away, the adhesive component is exposed which creates an airtight seal between the sealing strips and the outer face of the thermal wall panels and the internal face of the external walls.

In some embodiments, an internal surface panel is provided. Typically, the internal surface panel is a fire-retardant internal surface panel which provides the final finish for all internal wall surfaces and ceilings and is designed to facilitate all known internal finishes, for example but not limited to smooth finishes, various claddings and tiles, all of which can be removed later for repair or replacement. The internal surface panel will also accommodate all the internal services in the housing system and further, provides a designated space for acoustic lining. The internal surface panel is manufactured in sections off-site and is assembled on a room by room basis in the actual building. The onsite assembly process involves fixing the internal surface panel to the inner face of the internal wall panels 37, and the underside of the ceiling joists.

It should be noted that the particular embodiments of the features as described in FIGS. 48 to 57 can be utilised individually as optional features or in combination, and can be combined with the features and embodiments as described in relation to FIGS. 1 to 47.

Referring to the figures there is also provided a method of constructing/assembling a house according to the invention. A detailed description of the steps involved, including the sequence thereof, is provided below. Whilst a detailed overview of activities which may be preformed at each step of the process is provided, it should be understood that, dependent on requirements, embodiments of the method are envisaged wherein only some of these activities may be preformed as part thereof.

Step 1: Installing Concrete Pads.

FIG. 1 best illustrates the thermally efficient, airtight house starts Step 1 with clearing the top soil for the footprint of the house and placing concrete pads 1 at the corners of the house, which pads carry a steel frame structure. A concrete pad 2 is also installed at this stage for the purpose of forming a base for a super duct to bring services into the house.

Step 2: Erecting Steel Frame and Joists.

FIG. 2 best illustrates how the main steel frame 3 forms the shell of the house design and consists of a series of vertical uprights 4 which support a ring of horizontal beams 5 at the ground floor level, joist level and roof level of the house. The entire steel frame and any associated accessories, along with floor joists and accessories are delivered to site in one batch. The main steel frame and floor system is erected in one day with the assistance of a mobile crane and suitable qualified operatives. The steel profiles 6 are fitted in the main steel frame 3 in order to form the window and door openings s that facilitate the unique window and door subframes and suitable fixings hold the steel profiles in place. A fire blanket 7 is fixed to the face of the steel profiles to prevent fire from escaping from the window and door sub frames into the cavities. The main steel frame 3 acts as a complete structural support for the entire house shell and the steel frame facilitates a range of brackets and systems that along with the steel frame itself facilitate the efficient assembly and disassembly of the house. The vertical uprights 4 on the corners of the steel frame are bolted 8 to the concrete pads 1 and the vertical uprights 4 below ground level are encased in concrete 9 or other suitable material to seal the uprights from water penetration. Referring to FIG. 3, the assembly process provides that the middle and upper beams on the main steel frame 3 consist of brackets that support a flooring system that will prevent any structural movement in the building. A Special joist bracket 10 is designed to facilitate pre-cut joists 11. This joist bracket comprises of a space 12 between the bracket itself and the end of the pre-cut joists which space is later filled with closed cell expanding foam. As part of the assembly process the joist layout is locked together using a Special locking bracket 13 which is bolted to the joists and an advantage of this locking bracket 13 is that it overlaps 14 on to the support joist. A noggin bracket 15 is fitted which supports a series of noggins 16 that form and define the location of the inner thermal enclosure at the joist levels. The process provides a support bracket 17 which is fitted on both sides of a joist with a notching to facilitate service pipes.

Step 3: Providing for Service Ducting.

FIG. 4 best illustrates how at Step 3 the process provides that a premanufactured superduct 18 is fitted at subsoil level, on a concrete pad 2 which extends from a central point in the floor of the house to a plant room located either inside the house or outside the house. The premanufactured superduct 18 extends upwards at each end to the floor level of the house and the floor level of the plant room. Where the ducting terminates at the floor level of the house a recess 19 is formed in the superduct to facilitate a vertical duct shaft that extends up through the various floors of the house terminating in the attic. The superduct 18 contains all the inward and outward service pipes and ducting required to service the house, excluding foul drainage and grey water which are installed separately. The various service pipes 20 and ducting are installed in the premanufactured superduct 18 which terminate approximately 100 mm above the floor level of the house and plant room. During the manufacture of the superduct, service pipes and ducting are fitted in the superduct and the superduct is filled with closed cell expanding foam 21 which provides insulation around the service pipes. A cover 22 is then placed on the superduct 18. FIG. 5*a* also shows that a ducting support system 23 underneath the ground floor slab for foul and grey water outlets is also installed. FIG. 5*b* Shows a spike 24 with a semi-circular bracket 25 holds the relevant service ducting 26 and these spikes are driven into the ground until the semi-circular bracket reaches the correct level for the ducting. A semi-circular mesh profile 27 slides up the spike until its approx. 50 mm away from the service ducting and a locking nut 28 holds the mesh in the correct location. The hardcore screenings can be later placed up to and around the mesh cage leaving a 50 mm gap from the ducting. The service ducting sits into the correct location and a concrete mix 29 is later poured around the service ducting which passes through the mesh to grip the hardcore stone 30. FIG. 6 shows the horizontal lower beams 31 of the main steel frame act as a structural support for the base of the house, which is installed at Step 3. The assembly process consists of installing hardcore 30 and screenings 32.

Step 4: Installing the Base.

The assembly process provides that a radon barrier 33 is installed on the screenings, preformed insulation sections of approximately 150 mm in thickness are placed on the radon barrier 33 of the base and the circumference of the preformed insulation section has an approximately 230 mm vertical up-stand 34 which has a semi-hexagonal recess 35 which takes a corresponding tongue 36 on the ground floor thermal wall panel 37 which is fitted later in the process. Step 4 of the assembly process further involves placing a layer of approximately 150 mm rigid polystyrene sections of insulation on the radon barrier and in turn a further layer of approximately 150 mm polystyrene insulation is placed on top of that layer in a manner that breaks the joints. Various ground floor systems can be installed at step 4, within the confines of the upstand an example being concrete or timber floors.

Step 5: Installing Footpath Gully Tray.

Prior to the fitting of the walls, FIG. 13*a* shows that a special paint 69 is applied to the outside of the main steel frame to protect the internal thermal enclosure from the risk of thermal bridging. The footpath gully tray 71 slides on to the lower flange of the steel beam and is secured by a spring clip 73. The upper part of the footpath gully tray 79 is level with the continuous gully which provides a guide for the finished footpath. A fire blanket 7 is fixed to the face of the steel profiles to prevent fire from escaping from the window and door sub frames into the cavities.

Step 6: Erecting Scaffolding.

At step 6 the assembly process provides that a scaffolding system is erected around the house.

Step 7: Fitting External Walls.

FIG. 14*a* shows that Step 7 of the process provides for the fitting of the external wall system 74, which may involve the assistance of mobile crane or other such lifting devices. The external wall system can be formed from various materials, but generally the wall panel is 50 mm in thickness and available with a selection of different finishes applied thereto. The inside of the wall panel has a recess 81 which houses a rubber sleeve 82 which fits onto the flanges on the outer steel beams which prevent the risk of thermal bridging through the external wall panels onto the main steel frame. Each external wall panel is fixed to the main steel frame by thermally efficient components.

Accordingly, the lower section of the wall panels are fixed to a series of thermal break brackets 83 on the lower beam of the main steel frame. The thermal break brackets 83 are fitted to the steel frame prior to fitting of the external walls 74. The thermal break brackets 83 consist of a rubber pad 84, which pad serves to prevent any thermal bridging from the outside of the wall system through the thermal break bracket onto the beams on the main steel frame. Additionally, this thermal break bracket 83 consists of a strong thermally efficient nut 85 to prevent any thermal bridging passing through the wall panel fixing bolts 86 and onto the beams on the main steel frame. Further, the top of the external wall panel is fixed to the mid beam by thermally efficient nuts 87. The exact same bracketing system is repeated for the upper storey wall panels. Additionally, rubber seals 88 are placed between the lower and upper external wall panels to avoid friction between the wall panels. FIG. 15 shows the external wall panel 74 has a recess 94 which is formed around the window and door openings to receive a tongue on the external passive reveal which is connected to the specially designed window and door subframe system. The external wall panel 74 may be finished in render, Terylene, slim brick or stone cladding, solar panels or any combination of the above. A basic finish can be applied to the wall panel at construction stage, which allows the finish to be upgraded in the future.

Step 8: Installing Roof Panels.

Figure 8A:
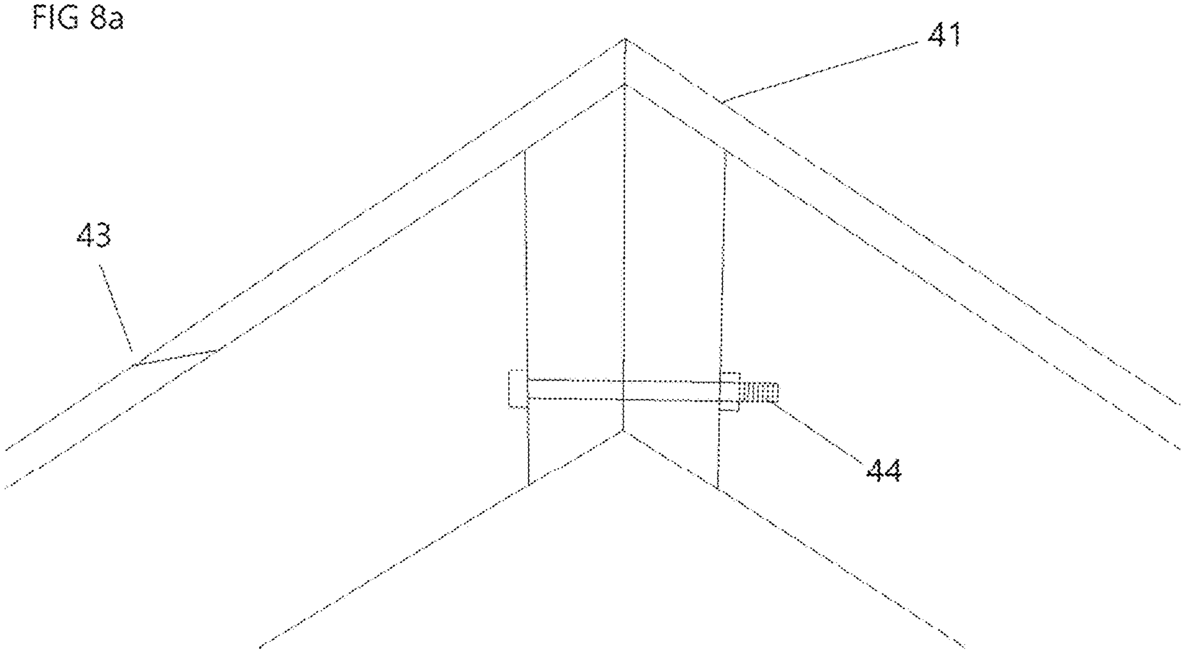
FIG. 8*a* is a cross-sectional view of a roof panel connection at ridge level.
Figure 8B:
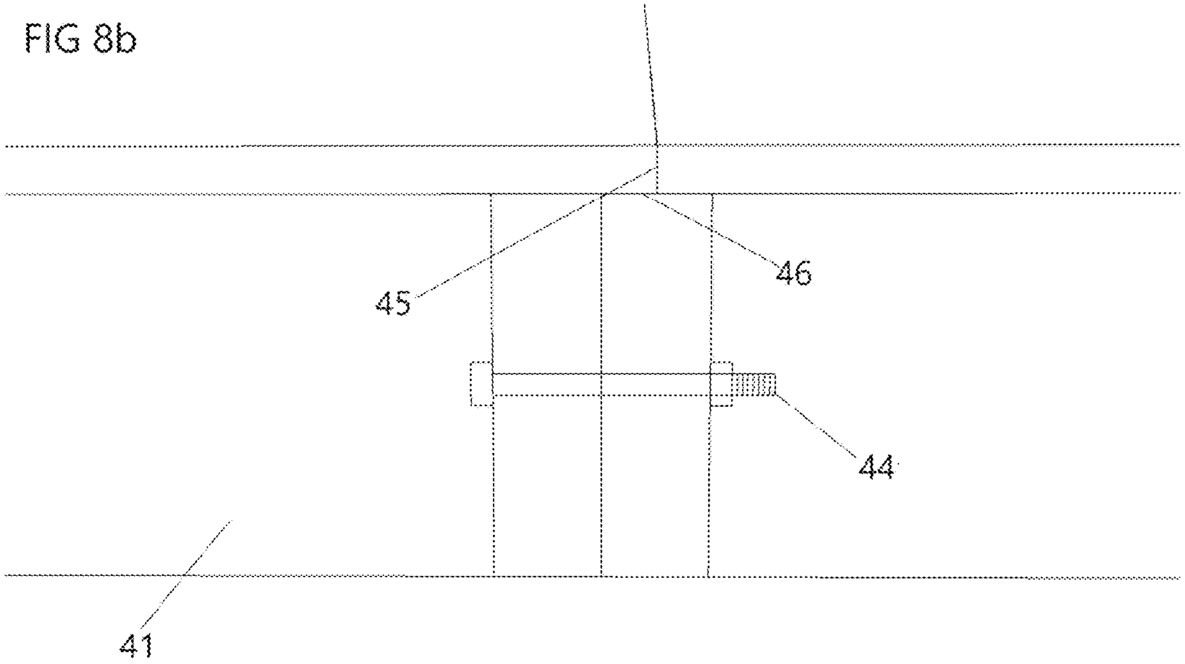
FIG. 8*b* is a cross-sectional view of a roof panel connection.

At Step 8 the assembly process provides that the roof is fitted with the assistance of mobile lifting equipment. FIG. 7 shows the upper beam 38 on the main steel frame facilitates anti-slide roof brackets 39, which are fitted at this point and which act to hold the roof panels 41 in place. The anti-slide roof brackets 39 are designed in a manner that when bolted 40 to the upper beam 38, the roof panels 41 sit into the anti-slide brackets 39, where screws 42 are inserted into the roof panels which ensures that the roof panels cannot slide downwards or rise upwards as a result of wind pressure and snow weight. FIG. 8*a* shows that the roof panels 41 have a bevelled joint 43 to prevent water ingress and the roof panels are secured at ridge level by a horizontal bolt 44. FIG. 8*b* shows an overlapping joint 45 on the side of the roof panel 41 which is sealed with an adhesive compound 46 and when the bolt 44 is tightened the overlapping joint 45 is squeezed tight preventing air leakage and water ingress. FIG. 17*a* shows that an integrated barge system 95 and fascia and soffit system 96 is fitted to the roof panels. A Soffit spacer 97 is fitted to the barge system 95 and fascia and soffit system 96 which can be detached to allow the external walls to be removed. FIG. 17*b* shows the ridge system 98 in place which contains a ventilation outlet 99. A suitable water proof sealant 100, made up from nanotechnology or any such suitable waterproof sealant, is applied to the roof panel, barge and ridge systems to prevent water ingress.

Step 9: Installing Integrated Roof System.

At Step 9 the assembly process provides that an integrated roof covering system is installed on the roof panels. FIG. 18 shows the barge bracket 101 is designed to fit tightly along the inside of the barge and is fixed to the roof panel and the barge by fixing screw 102. FIG. 19 shows a main connecting bracket 103 which bracket facilitates further brackets that hold the various roof sections in place. Connecting bracket 103 is secured to the roof panel by fixing screws 102. A Solar panel bracket 104 slides up and down the connecting bracket 103 and is used to fix the solar panels. The solar panel bracket 104 bracket comprises a rubber 105 which acts as a cushion for the Solar Panels. A grip plate 106 is applied to the solar panel and a fixing bolt 107 is pushed through the grip plate 106 and bolted into the solar panel bracket 104 until the solar panel is adequately secured. The same arrangement takes place on the opposite side of the solar panel. The grip plates should be applied at approximately 300 mm centres on each side of the solar panel. FIG. 20 shows that in order to create space between the top of a solar panel and the bottom of the next solar panel, a spacer bracket 108 is used and this bracket has rubber mat 109 which act as a cushion for the Solar panels. The Spacer Bracket 108 is fixed to both solar panel brackets 104 by fixing screws 110 on both sides. The solar panel is held in place by placing the grip plate 106 on the solar panel and bolted via bolt 107 to bracket 108 until sufficient tension is achieved to make the joint between the solar panels watertight. FIG. 21 shows that when any other roof components are put alongside a Solar Panel a further bracket is used and this roof finish bracket 111 slides up and down the rail on the connecting bracket 103. A rubber seal 112 can be fitted on the top edge of the roof finish bracket 111 in order to provide a seal for slate or tile finishes. FIG. 22 shows a tile support bracket 113 which is supported by a short rail bracket 114 which is secured to the roof panel by fixing 102. The tile support bracket 113 is used to carry the timber battens for tiles and this tile support bracket 113 slides up and down the short rail bracket 114. The tile battens 115 are fixed to the tile support bracket 113 by fixings 116. FIG. 23 shows a slate support bracket 117 which is supported by a tall rail bracket 118 which is secured to the roof panel by fixing 102. The slate support bracket 117 is used to carry the timber battens for slates and the slate support bracket 117 slides up and down the tall rail bracket 118. The slate battens 119 are fixed to the slate support bracket 117 by fixings 116. FIG. 24 shows a ply support bracket 117 which is supported by a tall rail bracket 118 which is secured to the roof panel by fixing 102. The ply support bracket 117 is used to carry the plywood base 120 for standing seam and living roof and the ply support bracket

117 also slides up and down the tall rail bracket 118. The plywood base 120 can be fixed to the ply support bracket 117 by fixings 116. FIG. 25*a* shows the tile batten is secured to the roof finish bracket by fixing screw 121. FIG. 25*b* shows the slate batten is secured to the roof finish bracket by fixing screw 122. FIG. 25*c* shows the plywood base for living and standing seem roofs are secure by fixing screw 123. FIG. 26 shows a seal flashing 124 is provided to seal the connection between various roof finishes and the top of solar panels and this flashing is secured by fixings 125. FIG. 27 shows a fascia flashing 126 is fitted at the lower portion of the roof and facia board. The fascia flashing contains a perforated cavity 127 to allow any condensation to run into the gutter. The fascia flashing 126 contains an outlet 128 which allows water to flow from the network of roofing brackets into the gutter. The fascia flashing 126 is fixed to the facia board fixings 129. FIG. 28 shows a ridge flashing 130 which is fixed to the ridge by fixing 131 and the ridge flashing contains an air vent 132 which allows air circulation through the roof system. FIG. 29*a* shows a barge flashing 133 contains an overlap 134 which slots into the ridge flashing 130. FIG. 29*b* shows the barge flashing 133 drops over the front fascia flashing 126 providing a waterproof seal. FIG. 30 shows that the finished roof sections can be released by removing a locking bolt 135 on the connecting bracket 103 were a remotely operated compact motor unit 136 allows any particular roof finish section to slide down the connecting brackets.

Step 10: Installing Window and Door Subframes.

The assembly process provides that at step 10, the window and door subframe system are installed which links the external wall system to the internal wall system. FIG. 31 shows that the window subframe 137 consists of a base-tray 138 which collect any condensation or water ingress that could enter the sub frame and any such water is discharged through the outlets 139. The rear part of the sub frame 140 has a recess 141 to facilitate an internal passive reveal 142 and this sub frame sits on a rubber pad 143 in the base tray and the rear part of the sub frame is fixed to the base tray by bolts 144. The rear part of the subframe contains a rubber seal 145 where the window 146 is fitted, and this rubber seal prevent air leakage between the window and sub-frame. The rear part of the sub frame has a rubber pad 147 fixed to its face by adhesive to prevent thermal bridging passing through the assembled subframe. A passive sill 148 comprising of rigid polystyrene coated with various finishes is fitted to the base tray. The passive sill contains an upstand 149 which runs perpendicular at each end of the sill to prevent water ingress from the outside of the building. The front part of the sub frame 150 has one horizontal and two vertical recesses 151 to facilitate a tongue on the external passive reveal 152. The front part of the sub frame 150 is then fitted to the rear sub frame 140 and the bottom profile 153 on the front sub frame overlaps the upstand 149 on the passive sill 148 and therefore creates a watertight seal. The front part of the subframe 150 is fixed to the rear subframe 140 by screws 154 which are inserted into the recess 151 on the front subframe 150. FIG. 32*a* shows the assembled window subframe is then placed in the window openings and a tongue 155 on the passive sill 148 sits into the recess 94 on the external wall panel 74 which provides a vertical seal between the passive sill and the external wall panel. FIG. 32*b* shows a tongue 156 on the lower part of the sill 148 which also sits into a recess 94 on the external wall panel 74 which provides a horizontal seal between the passive sill and the external wall panel. FIG. 33 shows the window subframe is fixed to the steel frame profile by a fixing 157. When the window subframe is fixed in the opening in the external wall section, an external passive reveal 152 is fitted to the front subframe.

The external passive reveal 152 has a first engagement portion 158 which sits into the recess 151 on the front subframe 150 and the passive reveal 152 has a second engagement portion 159 which sits into the recess 94 on the external wall panel 74 creating a watertight seal. FIG. 34 shows the external passive reveal 152 has a further tongue feature 160 which sits down over the upstand 149 on the passive sill thus creating a watertight seal. The external passive reveal 152 is fixed through a ledge 161 on the subframe by fixing 162. FIG. 37 best illustrates the installation of the door subframe 166 which consists of a base-tray 167 which collects any condensation or water ingress that could enter the sub frame and any such water is discharged through the outlets 168. The subframe 166 has a rubber seal 169 to accommodate the sealing of a door frame later, which seal ensures proper air tightness between the door frame and the door sub-frame. The subframe 166 has a recess 170 at the front to facilitate the fitting of an external passive reveal 152 and a recess on the rear 171 to facilitate the fitting of an internal passive reveal 142. The door sub-frame is placed on a rubber pad 172 in the base tray 167 and the door subframe is secured to the base tray by fixing 173. The door sub-frame is fixed to the steel profile in the main steel frame by fixing 174. A steel sill 175 is fitted to the door frame 176. The steel sill and door frame are secured to the sub frame by fixings 177. The steel sill contains an upstand 178 to prevent water ingress from the outside. FIG. 38*a* shows that when the door frame 176 and sill 175 are fitted to the subframe, a tongue on the sill 179 sits into the recess 94 on the external wall panel 74. FIG. 38*b* shows a tongue 180 on the lower part of the steel sill 175 which also sits into a recess 94 on the external wall panel 74 which provides a horizontal seal between the door sill and the external wall panel. FIG. 39*a* shows that when the door frame and subframe are fitted in the opening of the external wall sections, an external passive reveal 152 is fitted to the sub frame. The passive reveal has a first engagement portion 158 which sits into recess 170 on the front of the subframe 150 and the reveal has a second engagement portion 159 which sits into the recess 94 on the external wall panel 74 creating a watertight seal. FIG. 39*b* shows the external passive reveal 152 has a further tongue 160 feature which sits down over upstand 178 on the steel sill creating a watertight seal. The external passive reveal 152 system is fixed through a ledge 181 on the subframe by fixing 162.

Step 11: Applying External Wall Finishes.

The assembly process provides that at Step 11 the external wall finishes are completed.

Step 12: Installing Gutters and Down Pipes.

The process provides that at Step 12 the gutters and downpipes are installed.

Step 13: Installing Footpaths.

The assembly process provides that at Step 13 the footpaths are poured/laid.

Step 14: Installing Internal Floors and Marking Out of Internal Walls.

At Step 14 the assembly process provides that ply board is fitted on the first and second floors of the house and the internal walls are marked out.

Step 15: Fitting Cavity Mats and Internal Thermal Wall Panels.

Figure 9A:
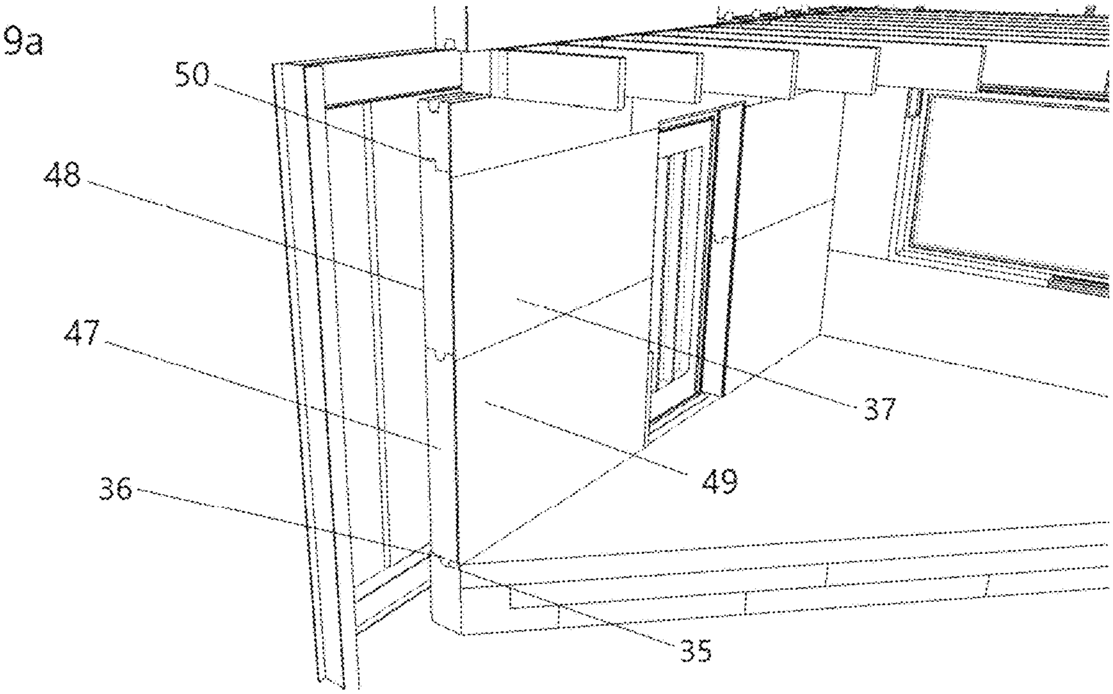
FIG. 9*a* is a perspective cut-away view of the lower part of the airtight thermal enclosure according to the invention.
Figure 9B:
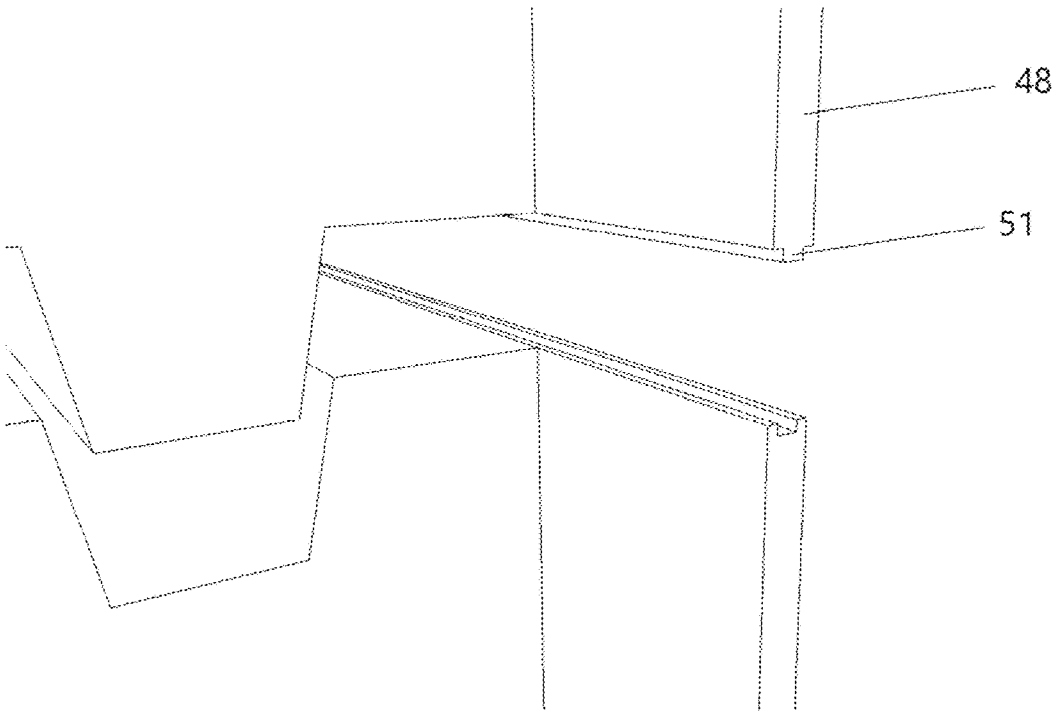
FIG. 9*b* is a detail perspective view of the jointing system of an outer layer of the thermal wall panels.
Figure 9C:
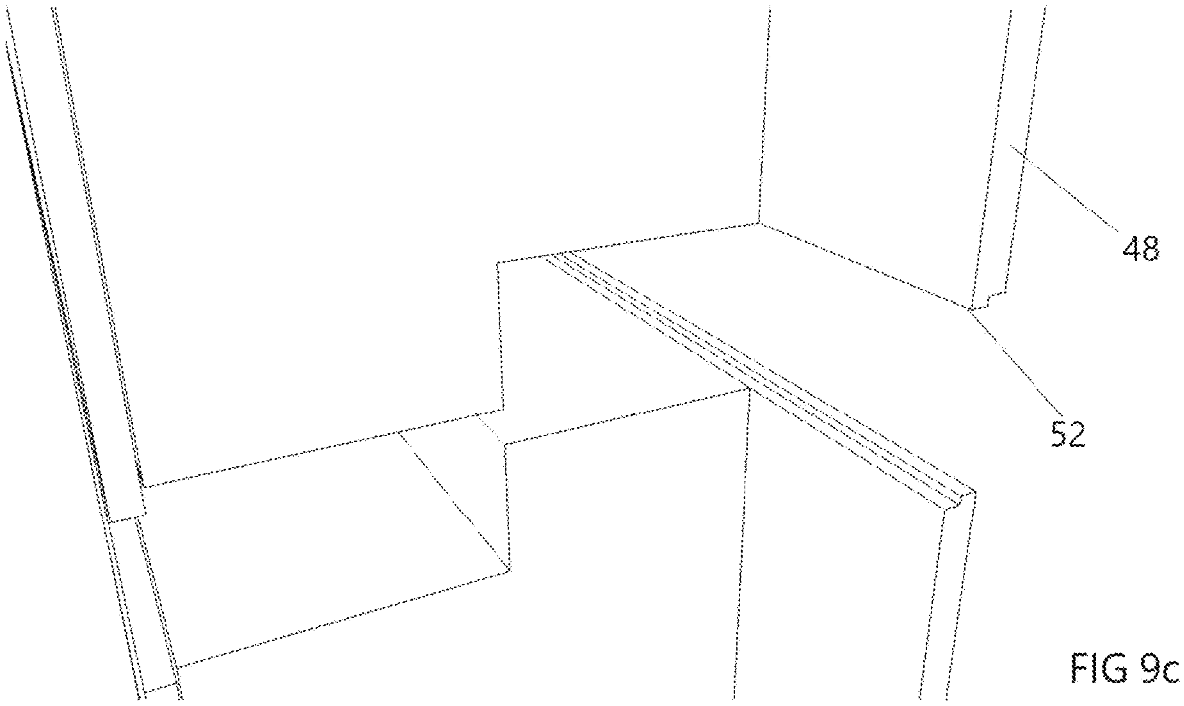
FIG. 9*c* is a detail perspective view of the jointing system of an outer layer of the thermal wall panels.
Figure 9D:
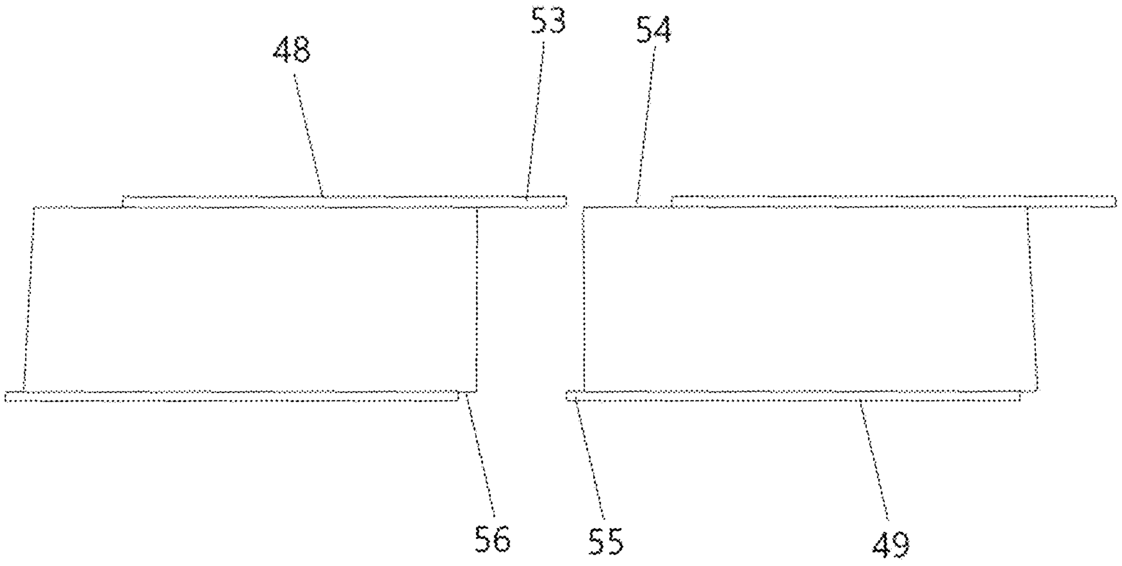
FIG. 9*d* is a cross-sectional view of vertical joints on outer and inner layers of the thermal wall panels.
Figure 9E:
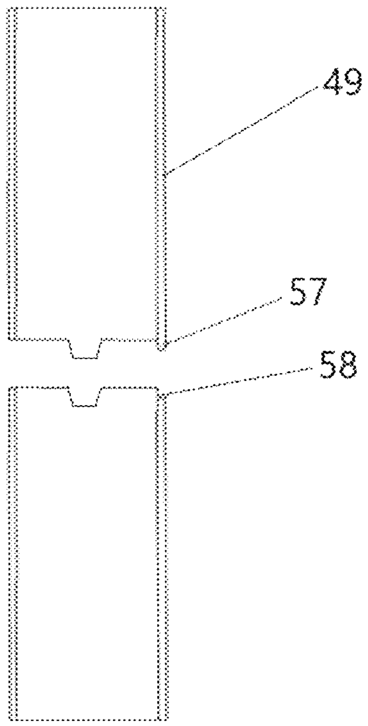
FIG. 9*e* is a cross-sectional view of horizontal joint on inner layers of the thermal wall panels.

FIG. 14*b* shows that the assembly process at Step 15 provides that an angled rubber mat 70 is placed on the upper inner flange of the horizontal steel beams. The angled rubber mat 70 collects any light condensation, or any possible wind driven water ingress that might emerge in the cavity and the angled mat diverts this condensation to a channel 89 adjacent to the edge of the mat. The lower edge of the angled mat 90 and the rubber sleeve 82 sitting on the opposite flange 91 creates a channel 89 which is used to collect any light condensation or any possible wind driven water ingress that might emerge in the cavity. The horizontal beams have 20 mm drip holes 92 at 1 m intervals along the centre line of the channel 89 which allow any light condensation to drip down on to the angled flange 75 on the footpath gully tray 71. The main steel frame acts as a ventilated cavity between the internal thermal enclosure and the external wall system advantageously creating an air circulation area, which greatly reduces the risk of condensation/damp and the air circulation is provided through vents 93 in the external wall panel 74. FIG. 9*a* shows how the internal thermal enclosure is formed by a series of interlocking thermal wall panels 37. The thermal wall panels are made of rigid Ultra High Density (UHD) polystyrene/polyisocyanurate 47 with Oriental Strand Board 48 on the outside and a magnesium board 49 on the inside which provides one-hour fire protection. A wall is created by installing 3 layers of thermal wall panels 37. The lower layer of thermal wall panels contains a protrusion 36 on the bottom which sits into a corresponding semi-hexagonal recess 35 on the preformed upstand of the base insulation. This joint when sealed provides a continuous thermal loop at this point and also prevents air leakage. The second layer of wall panels when installed are secured with a similar protrusion and recess joint, or what can be generally referred to as a tongue and groove joint. The third layer of thermal wall panels have a joggled or halving joint 50 to allow the panel slide in under the ceiling joist. FIG. 9*b* shows the OSB board 48 on the outside of the wall panel also has a horizontal tongued and grooved joint 51. FIG. 9*c* shows the OSB board 48 on the outside of the wall panel also has a horizontal joggled or halving joint 52. FIG. 9*d* shows the OSB 48 is vertically overlapped 53 by 100 mm to meet a corresponding recess 54 on the adjacent wall panel. The magnesium board 49 is vertically overlapped 55 by 20 mm to meet a corresponding recess 56 on the adjacent wall panel. FIG. 9*e* shows the horizontal overlap on the magnesium board 49 where overlap 57 meets a corresponding recess 58 on the adjacent wall panel. The magnesium board is further recessed around the window and door openings to facilitate an overlap on the internal reveal. This same process of fitting the thermal wall panels is repeated on the first floor and gable ends in the case of a two-storey dwelling. FIG. 35 shows an internal passive reveal 142 that is fitted to the rear part of the window subframe 140. A tongue 163 on the internal passive reveal 142 sits into the recess 141 on the rear window subframe and a further overlap on the reveal 164 sits into the recess on the thermal wall panels 37. The corners of the internal reveal are mitred in a manner that when sealed with polymer adhesive 165 assists in preventing air leakage from the house. The internal reveal system is fixed to the wall panel by polymer adhesive 165 creating an airtight seal. FIG. 40 shows how an insulated door saddle 182 is fitted. An internal passive reveal 142 is fitted to the door subframe and internal thermal enclosure and a tongue 163 on the internal passive reveal 142 sits into the recess 171 on the subframe 166 and a further overlap 164 on the internal passive reveal 142 sits into the recess on the internal thermal wall panel 37. The internal passive reveal is fixed to the internal thermal wall panel by polymer adhesive 165 creating an airtight seal.

Step 16: Completing First Fix Mechanical and Electrical.

FIG. 43 shows that Step 16 of the process involves the first fix mechanical and electrical. The service pipes and ducting are extended from the ground floor up to the second floor of the house in a tightly arranged format 201. FIG. 44 shows that connections can be made at joist level to extend the relevant services to each room of the house. The ducting for the mechanical services to each room consists of air extract and intake ducting's, grey water extract and supply pipes, along with hot and cold-water supply pipes. The electrical network is created by a series of cables that are pre-cut for a particular supply route and have pre-fitted plugs which will be connected to ports on various electrical components.

Step 17: Installing Closed Cell Expanding Foam and Rockwool.

Step 17 involves the use of liquid injected Icynene® expanding foam insulation, or similar suitable insulation, to complete the airtight thermal enclosure. FIG. 10 shows that a void 59 exists above the ground floor thermal wall panels 37 at joist level where the thermal enclosure must be extended up through the joists to meet the bottom of the upper thermal wall panel 37. The thermal enclosure is maintained and formed at joist level. This void area is filled with closed cell expanding foam 21 which is pumped in through an access point 60 and fills the void space 59 including space 12 and forms the thermal enclosure at this point. FIG. 11 shows how the closed cell expanding foam is used to form the thermal enclosure in the attic space above joist level. To avoid a thermal bridge through the rafters of the roof panel the closed cell expanding foam must extend past the exposed face of the rafter's in order to form a continues layer of air tight insulation. To assist this process a special rail 61 is fitted to the underneath of the roof panel rafter 62 which provides the finish line 63 for the pump in closed cell insulation 21. The special rail 61 also provides a channel 65 in which a fixing screw 66 can be used to fix a wall/ceiling panel 67 that can be fitted later if an attic conversion is commenced. A rubber 68 is placed on the top of the roof panel rafter 62 in order to prevent thermal bridging through the roof panel rafter. The use of closed cell expanding foam at joist level and in the attic, space ensures a continuous thermal loop around the habitable area of the house.

Step 18: Fitting Ceilings.

At Step 18 of the assembly process the ceilings are fitted and access points are pre-bored to expose various service pipes, ducting, and wires.

Step 19: Installing Internal Wall Panels and Associated Features.

FIG. 42*a* shows that at Step 19 of the assembly process the internal walls are installed. The internal wall panels are provided in different widths and are preferably 100 mm in thickness and can be made from any suitable material known in the art. The internal walls are held in place by a floor bracket and ceiling bracket. The floor bracket 183 is fitted to the floor and secured by fixing screws 184. Where the floor bracket is fitted, an adjustable nut bracket 185 is fitted into a recess 186 in the floor bracket 183 and a wall panel support tray 187 is then fitted on top of the adjustable nut bracket 185 and sits into recess 188 in the wall panel support tray 187. FIG. 42*b* shows a ceiling bracket 189 is then fitted to the ceiling to hold the wall Panels. FIG. 42*c* shows the wall panel 190 is then lifted on to the wall panel support tray 187 and the adjustable nut bracket 185 is adjusted upwards by using a circular wrench 191 which rises the wall panel up tight to the ceiling. FIG. 42*d* shows that where the wall panels are joined a locking bracket 192 is fitted to one side of the wall panel and a corresponding recess is made to the panel being joined. In order to ensure a tight joint in the wall panels, a threaded rod 193 is inserted through the panels at strategic locations. FIG. 42*e* shows how a skirting board 194 slides into a recess 195 on the floor bracket. As it slides into this recess 195 a spring clip 196 has a tongue 197 which fits into a recess 198 on the wall panel 190 and the spring clip is secured to the wall panel by fixing 199. This spring clip 196 causes the skirting board to tighten in against the wall panel thereby eliminating the need to have fixings inserted in the skirting board to hold it in place. FIG. 42*f* shows that the wall panels 190 have pre-drilled holes 200 to accommodate service ducting, where services can be installed when the wall panels are being erected. The internal wall system will come on site pre-cut and ready for easy assembly.

Step 20: Second Fix Mechanical and Electrical

Step 20 of the assembly process involves the completion of the second fix mechanical and electrical. The second fix mechanical involves the installation of all sanitary wear, mechanical ventilation heat recovery system etc. The second fix electrical involves the installation of the light switches, sockets, kitchen appliances, control panels etc. FIG. 45*a* shows the electrical network is created by a series of cables that are pre-cut for a particular supply route and have pre-fitted plugs 202 which can be connected to ports in particular electrical components. The plug and port system eliminates the need for hardwiring inter alia ceiling lights 203, spotlights 204, switches 205, sockets 206 and electrical shower 207. FIG. 45*b* shows how each electrical component will have an inbuilt port 208 as an integrated part of the electrical component. The inbuilt port 208 is designed to take a corresponding pre-fitted plug 202 which is attached to the supply cable. The supply cable and plug will terminate in a wall box and the relevant electrical component can be connected by simply inserting the plug into the port at the back of the relevant electrical component and thereafter the electrical component can be placed in the wall box and secured by fixing screws. FIG. 46 shows that as part of the second fixing, a ducting 209 is installed around the collective service pipes that extends from the ground floor to the second floor. This ducting 209 sits down into the recess 19 on the superduct 18 that was installed in the base. The ducting 209 is designed in a manner that allows panels 210 to be easily removed to provide access to this bundle of service pipes. FIG. 47 shows the plant room 211 is positioned over the superduct 18 which was earlier installed in the base of the house. The plant room contains all the control equipment to operate the mechanical system for the house. The electrical meter cabinet 212 and telecommunications cabinet 213 are situated on the wall of the plant room 211 and a connecting cable is brought through the superduct 18 to a circuit board located in the house. The connecting cable is pre-cut and has a push in connection on the meter with a similar push in connection at the circuit board. The service pipes in the superduct 18 are all connected to the relevant operating systems in the plantroom. A system test is carried out to ensure that all services are operating to the required regulatory standards.

Whilst the above describes an exemplary construction/assembly process, changes to the sequence thereof or other adaptations are envisaged which would still fall within the scope of the invention. For example an alternative process to the above could be that in Step 4 concrete can be used instead of hardcore and screenings to form a raft foundation. The raft foundation would comprise of various layers of steel that would be connected to the steel cages contained in the concrete pads. Another alternative example could be where steps 14-20 could commence in tandem with step 10. Step 7 and step 8 could be reversed where the roof is fitted prior to the external walls. Step 8 could be completed on its own then step 7 followed by step 9. Likewise, step 11 could be completed before steps 9 and 10. Likewise steps 12 and 13 could be carried out at any stage in the assembly process. Step 15 could be taken after step 6. Likewise step 19 could take place before or immediately after step 16. Step 18 could be taken before step 17. These are just some examples of adaptations of the construction/assembly process which would be contemplated by the skilled person and still fall within the scope of the invention described herein, however any such adaptations which would be easily contemplated by the skilled person would likewise fall within this scope.

The invention is not limited to the embodiment(s) described herein but can be amended or modified without departing from the scope of the present invention.

The invention claimed is:

1. A building structure comprising a main structural support portion, a base portion, and roof, wall, and window/door arrangements which are directly or indirectly attachable to the main structural support and are configured, in use, to combine to form a thermally insulative barrier between the interior of the building and the external atmosphere, the barrier also acting to at least partially inhibit travel of air therebetween, wherein the building structure comprises window/door arrangements comprising a subframe mountable in an external wall section of the building, and an external reveal portion having a first engagement portion in engagement with the subframe and a second engagement portion in engagement with the external wall section of the building structure and the external reveal portion forms an airtight and/or thermally insulative connection between the subframe and the external wall section, wherein the subframe of the window/door arrangements comprises a rear part and a front part, the rear part of the subframe having a recess to facilitate an internal reveal portion.

2. The building structure of claim 1, wherein the thermally insulative and airtight barrier is a continuous and/or unbroken thermally insulative and airtight enclosure which may be intentionally broken to provide for ventilation, services, or the like.

3. The building structure of claim 1, further comprising a mechanical means of removal of condensation build-up within and/or on the structure of the building.

4. The building structure of claim 1, wherein external wall sections, roof portions and window/door portions are removably attachable to each other or to the main structural support portion allowing for inspection of the internal thermal enclosure and other components of the building, or modification/upgrading thereof, without interfering with the structural stability of the building.

5. The building structure of claim 4, wherein the external wall sections, roof portions and window/door portions are removably attachable to each other or to the main structural support portion in a manner which causes no damage to the external wall sections, roof portions and window/door portions such that they may be reattached to each other or to the main structural support portion.

6. The building structure of claim 5 further comprising insulated base sections having vertical upstand portions formed for engagement with a portion of the external wall sections, the vertical upstand portions comprising a recess formed therein.

7. The building structure of claim 6, wherein the lowermost portion of the external wall sections comprises a protrusion thereon formed for insertion into the recess of the vertical upstand portions.

8. The building structure of claim 7, wherein a tongue on the steel sill is receivable into the recess on the external wall panel, and a tongue on the lower part of the steel sill is receivable into the recess on the external wall panel which provides a seal between the underneath of the steel sill and the external wall section.

9. The building structure of claim 4, wherein the external wall sections comprise grooves in the inner facing surfaces thereof formed for receiving at least one flange of the main structural support portion.

10. The building structure of claim 1, wherein at least the electrical meter cabinet and telecommunications cabinet are centralised in a dedicated plant room locatable inside or outside the building.

11. The building structure of claim 1, wherein the building structure comprises one or more concrete support pads upon which the main structural support portion is supported.

12. The building structure of claim 1, comprising a ducting support means comprising a ground engaging spike which is insertable into the ground at a first end and a ducting support bracket at or about a second end, the ducting support means further comprising a mesh profile movably mountable to the ground engaging spike.

13. The building structure of claim 12, wherein the ducting support bracket is movably mountable to the ground engaging spike and the ducting support means comprises means for securing the mesh profile and/or the ducting support bracket at a chosen location on the ground engaging spike.

14. The building structure of claim 13, wherein, the mesh profile is a semi-circular mesh profile.

15. The building structure of claim 1, wherein the main structural support portion is a main steel frame which comprises a plurality of vertical uprights held in a predefined spaced apart relationship by a plurality of horizontal beams.

16. The building structure of claim 15, wherein the building structure comprises at least one condensation management means comprising means for encouraging condensation from internally of the building, or a cavity thereof, to externally of the building, the condensation management means comprising at least one condensation urging feature for urging condensation from the main steel structure or a component thereof, or from a surface of the walls of the building, towards an outlet.

17. The building structure of claim 16, further comprising a condensation channeling means locatable between the urging means and the outlet, the condensation channeling means comprising channel features formed therein for channeling the condensation towards the outlet.

18. The building structure of claim 17, wherein the channel features and an internal surface of the external wall of the building cooperate to form enclosed channels running from condensation urging feature to the outlet.

19. The building structure according to claim 16, wherein one or more flanges of the main structural support portion comprise apertures therein for allowing condensation to pass therethrough such that it may be encouraged by the condensation management means towards the outlet.

20. The building structure of claim 1, wherein roof panels are fixable to the main structural support portion via roof panel brackets, the roof panel brackets comprising a flange configured to support the roof panels in a manner which prevents spreading of the roof and/or downwards slippage of the roof panels.

21. The building structure of claim 20, wherein the roof panels comprise roofing element attachment means for attaching roofing elements thereto, the roofing element attachment means comprising roofing element brackets formed for attachment of various roofing elements such as but not limited to roofing tiles, slates, metallic roofing systems, green roof systems, and/or solar panels.

22. The building structure of claim 21, wherein the roofing bracket elements comprise a main connecting bracket attachable to the roof panels and a secondary bracket attachable to the main connecting bracket, the secondary bracket being formed for engagement with a roofing element.

23. The building structure of claim 21, wherein roofing elements may be slidably engageable with, and selectably fixable to, the roofing element brackets.

24. The building structure of claim 1, wherein the building structure comprises a soffit feature and a soffit spacing means is provided between the external walls of the building and the soffit feature, the soffit spacing means being removable such that the external walls may be removed without disturbance of the roof and/or the soffit feature.

25. The building structure of claim 1, wherein the first engagement portion of the external reveal portion forms a compression fit with the subframe and the second engagement portion of the external reveal portion forms a compression fit with the external wall section.

26. The building structure of claim 1, wherein the window arrangements further comprise internal reveal portions which extend internally of the subframe, the internal reveal portions comprising a quadrangular frame extending internally of the subframe.

27. The building structure of claim 26, wherein the internal reveal portions comprise mitred lower corners having correspondingly formed interlocking engagement features.

28. The building structure of claim 1, wherein the window/door arrangements further comprise a base-tray which collects any condensation or water ingress that could potentially enter the subframe of the window/door arrangements and any such water is discharged through outlets formed in the base tray.

29. The building structure of claim 28, wherein a passive sill is fitted to the base tray and contains an upstand which runs perpendicular at each end of the sill to prevent water ingress from the outside of the building.

30. The building structure of claim 29, wherein the passive sill comprises an upstand and wherein the front part of the subframe comprises a bottom profile, and the front part of the sub frame is attached to the rear part of the subframe, and the bottom profile on the front part of the subframe overlaps the upstand on the passive sill and therefore creates a watertight seal.

31. The building structure of claim 29 wherein, when the subframe is received in a window/door opening, a tongue on the passive sill is received by a recess formed in an external wall panel in which the window/door opening is formed, which provides a vertical seal between the passive sill and the external wall panel, and a tongue on the lower part of the passive sill is received into the recess formed in the external wall panel which provides a horizontal seal between the underside of the passive sill and the external wall panel.

32. The building structure of claim 1, wherein the front part of the subframe has one horizontal and two vertical recesses to facilitate engagement with the first engagement portion of the external reveal portion.

33. The building structure of claim 32 wherein, when the subframe is received in the window/door opening, the external reveal portion is fitted to the front part of the subframe, the first engagement portion of the external reveal portion being receivable into the recess formed in the front part of the subframe and the second engagement portion of the external reveal portion being receivable into the recess formed in the external wall panel creating a watertight seal therebetween, the external reveal portion having a further tongue feature which sits down over the upstand on the passive sill thus creating a watertight seal therebetween.

34. The building structure of claim 1, wherein the internal reveal portion is fitted to the rear part of the subframe, the internal reveal portion having a tongue which is received into the recess on the rear part of the subframe, and a further overlap portion on the internal reveal portion is received into a recess formed in an internal wall panel in which a window opening is formed.

35. The building structure of claim 1 wherein, where the window/door arrangement is a door arrangement, the door arrangement comprises a door frame, wherein a steel sill is fitted to the door frame, the steel sill and door frame are securable to the sub frame by fixings, and the steel sill comprises an upstand to prevent water ingress from the outside.

* * * * *